US008452023B2

(12) United States Patent
Petit et al.

(10) Patent No.: US 8,452,023 B2
(45) Date of Patent: May 28, 2013

(54) WIND SUPPRESSION/REPLACEMENT COMPONENT FOR USE WITH ELECTRONIC SYSTEMS

(75) Inventors: Nicolas Petit, Mountain View, CA (US); Gregory Burnett, Dodge Center, MN (US); Michael Goertz, Redwood City, CA (US)

(73) Assignee: AliphCom, San Francisco, CA (US)

( * ) Notice: Subject to any disclaimer, the term of this patent is extended or adjusted under 35 U.S.C. 154(b) by 288 days.

(21) Appl. No.: 12/772,963

(22) Filed: May 3, 2010

(65) Prior Publication Data

US 2010/0280824 A1 Nov. 4, 2010

Related U.S. Application Data

(63) Continuation-in-part of application No. 12/139,333, filed on Jun. 13, 2008, which is a continuation-in-part of application No. 12/606,140, filed on Oct. 26, 2009, which is a continuation-in-part of application No. 11/805,987, filed on May 25, 2007, now abandoned, which is a continuation-in-part of application No. 12/243,718, filed on Oct. 1, 2008, now Pat. No. 8,130,984.

(60) Provisional application No. 61/174,606, filed on May 1, 2009.

(51) Int. Cl.
*G10K 11/16* (2006.01)
*G10L 15/20* (2006.01)

(52) U.S. Cl.
USPC .......................................... 381/71.8; 704/233

(58) Field of Classification Search
USPC ............... 381/70, 71.1, 71.8, 71.14, 73.1, 91, 381/92, 93, 94.1–94.7, 122; 704/233; 700/94
See application file for complete search history.

(56) References Cited

U.S. PATENT DOCUMENTS

| | | | | |
|---|---|---|---|---|
| 8,019,091 | B2 * | 9/2011 | Burnett et al. | 381/71.8 |
| 2004/0133421 | A1 * | 7/2004 | Burnett et al. | 704/215 |
| 2007/0058822 | A1 * | 3/2007 | Ozawa | 381/94.1 |
| 2008/0201138 | A1 * | 8/2008 | Visser et al. | 704/227 |

* cited by examiner

*Primary Examiner* — Fan Tsang
*Assistant Examiner* — Eugene Zhao
(74) *Attorney, Agent, or Firm* — Kokka & Backus, PC

(57) ABSTRACT

Systems and methods to reduce the negative impact of wind on an electronic system include use of a first detector that receives a first signal and a second detector that receives a second signal. A voice activity detector (VAD) coupled to the first detector generates a VAD signal when the first signal corresponds to voiced speech. A wind detector coupled to the second detector correlates signals received at the second detector and derives from the correlation wind metrics that characterize wind noise that is acoustic disturbance corresponding to at least one of air flow and air pressure in the second detector. The wind detector controls a configuration of the second detector according to the wind metrics. The wind detector uses the wind metrics to dynamically control mixing of the first signal and the second signal to generate an output signal for transmission.

42 Claims, 52 Drawing Sheets

Linear response of V2 to a speech source at 0.10 meters

Linear response of V2 to a noise source at 1 meters

Linear response of V1 to a speech source at 0.10 meters

Linear response of V1 to a noise source at 1 meters

Linear response of V1 to a speech source at 0.1 meters

Section A-A

WIND SUPPRESSION/REPLACEMENT COMPONENT FOR USE WITH ELECTRONIC SYSTEMS

RELATED APPLICATIONS

This application claims the benefit of U.S. Patent Application No. 61/174,606, filed May 1, 2009.

This application is a continuation in part of U.S. patent application Ser. No. 12/139,333, filed Jun. 13, 2008.

This application is a continuation in part of U.S. patent application Ser. No. 12/606,140, filed Oct. 26, 2009.

This application is a continuation in part of U.S. patent application Ser. No. 11/805,987, filed May 25, 2007.

This application is a continuation in part of U.S. patent application Ser. No. 12/243,718, filed Oct. 1, 2008.

TECHNICAL FIELD

The disclosure herein relates generally to noise suppression. In particular, this disclosure relates to noise suppression systems, devices, and methods for use in acoustic applications.

BACKGROUND

The ability to correctly identify voiced and unvoiced speech is critical to many speech applications including speech recognition, speaker verification, noise suppression, and many others. In a typical acoustic application, speech from a human speaker is captured and transmitted to a receiver in a different location. In the speaker's environment there may exist one or more noise sources that pollute the speech signal, the signal of interest, with unwanted acoustic noise. This makes it difficult or impossible for the receiver, whether human or machine, to understand the user's speech. Typical methods for classifying voiced and unvoiced speech have relied mainly on the acoustic content of single microphone data, which is plagued by problems with noise and the corresponding uncertainties in signal content. This is especially problematic with the proliferation of portable communication devices like mobile telephones. There are methods known in the art for suppressing the noise present in the speech signals, but these generally require a robust method of determining when speech is being produced.

INCORPORATION BY REFERENCE

Each patent, patent application, and/or publication mentioned in this specification is herein incorporated by reference in its entirety to the same extent as if each individual patent, patent application, and/or publication was specifically and individually indicated to be incorporated by reference.

DETAILED DESCRIPTION

Figure 1:
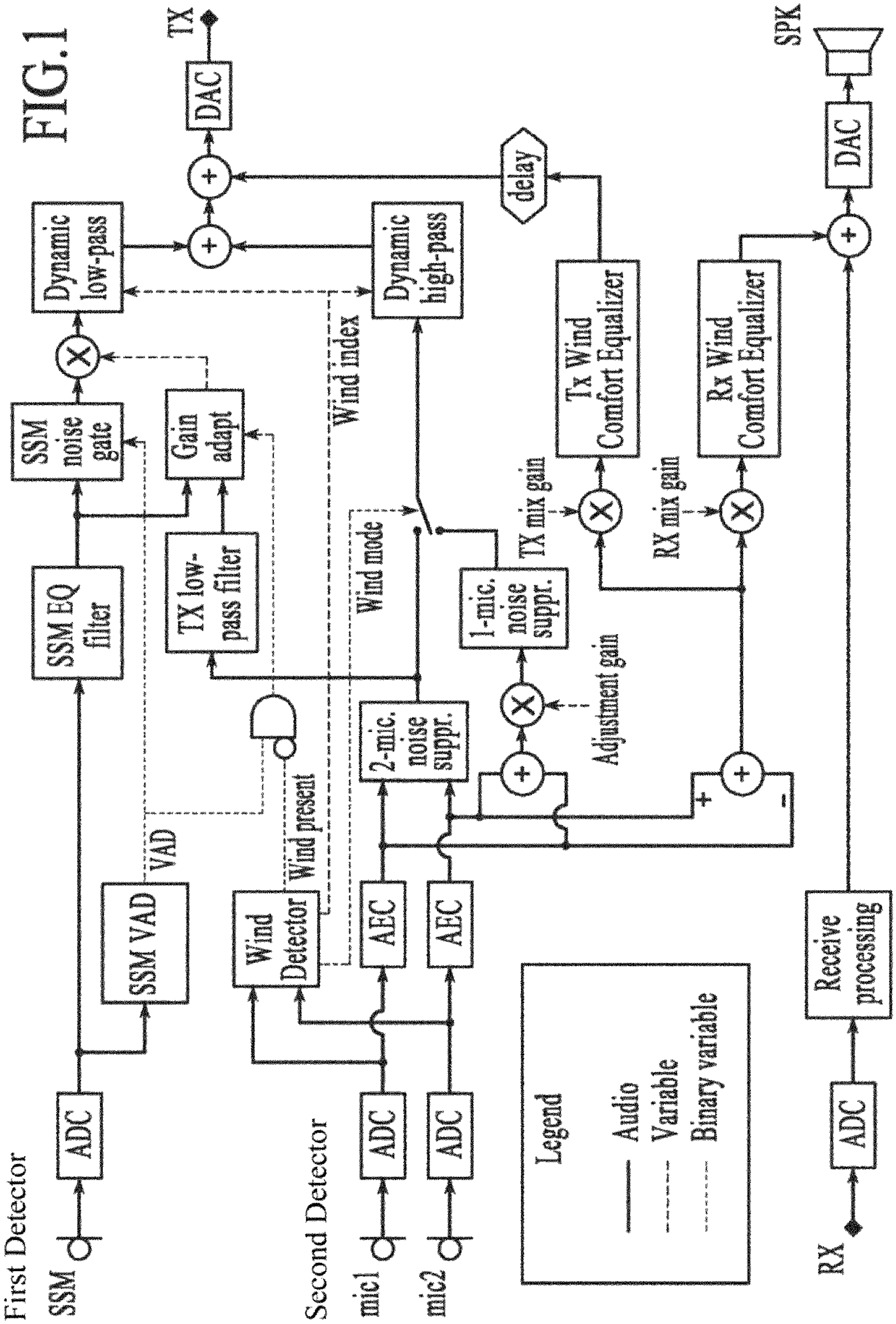
FIG. 1 is a block diagram of the communications system, under an embodiment.

Systems and methods to reduce the negative impact of wind on a communications headset are described below. The communications headset example used is the Jawbone Prime Bluetooth headset, produced by AliphCom in San Francisco, Calif. This headset uses two omnidirectional microphones to form two virtual microphones using the system described below (see section "Dual Omnidirectional Microphone Array (DOMA)" below) as well as a third vibration sensor to detect human speech inside the cheek on the face of the user. Although the cheek location is preferred, any sensor that is capable of detecting vibrations reliably (such as an accelerometer or radiovibration detector (see section "Detecting Voiced and Unvoiced Speech Using Both Acoustic and Nonacoustic Sensors" below) can be used as well. Any italicized text herein generally refers to the name of a variable in an algorithm described herein.

In the following description, numerous specific details are introduced to provide a thorough understanding of, and enabling description for, embodiments. One skilled in the relevant art, however, will recognize that these embodiments can be practiced without one or more of the specific details, or with other components, systems, etc. In other instances, well-known structures or operations are not shown, or are not described in detail, to avoid obscuring aspects of the disclosed embodiments.

Unless specifically stated, the following acronyms and terms are defined as follows.

The term ADC represents analog to digital converter.

The term AEC represents acoustic echo cancellation.

The term DAC represents digital to analog converter.

The term EQ represents equalization, generally in terms of frequency.

Microphone is a physical acoustic sensing element.

Normalized Least Mean Square (NLMS) adaptive filter is a common adaptive filter used to determine correlation between the microphone signals. Any similar adaptive filter may be used.

The term $O_1$ represents the first physical omnidirectional microphone

The term $O_2$ represents the second physical omnidirectional microphone

Skin Surface Microphone (SSM) is a microphone adapted to detect human speech on the surface of the skin (see section "Acoustic Vibration Sensor" below). Any similar sensor that is capable of detecting speech vibrations in the skin of the user yet immune to wind noise can be substituted.

The term VAD represents Voice Activity Detection, and may be used as the name of an algorithm or as a signal, depending on the context.

Virtual microphone is a microphone signal comprised of combinations of physical microphone signals.

Wind is the movement of air.

Wind comfort noise is wind or wind-like noise that is included in either the transmitted or received signal to alert the user and the person to whom they are speaking to the presence of wind without unduly affecting the communication intelligibility.

Wind noise is unwanted acoustic disturbances from air pressure and/or air flow in the microphone signal of interest.

In the following description, numerous specific details are introduced to provide a thorough understanding of, and enabling description for, embodiments. One skilled in the relevant art, however, will recognize that these embodiments can be practiced without one or more of the specific details, or with other components, systems, etc. In other instances, well-known structures or operations are not shown, or are not described in detail, to avoid obscuring aspects of the disclosed embodiments.

Generally, the enclosed wind solution takes advantage of the SSM transducer's high resistance to wind noise and acoustic noise and its relatively acceptable speech fidelity below 1 kHz in windy conditions. FIG. 1 is a block diagram of the communications system, under an embodiment.

The system of an embodiment generally comprises five system components including, but not limited to, wind detection, SSM equalization, wind mode audio, dynamic mixing, and comfort wind. Each of these system components is described in detail below.

The detection of wind presence and intensity in either or both microphones is used to achieve good wind mitigation. The wind detection algorithm takes advantage of the fact that the wind noises in each of the microphones are uncorrelated. Indeed, since wind physically displaces air molecules when it flows, it independently moves the diaphragm of each microphone in a non-correlated fashion. Even acoustic wind noise (caused by turbulence near the microphone) is not highly correlated. Thus, the effect on the microphone from wind is chaotic and non-linear. It is true that the intensities of wind in each microphone are slightly correlated, but their waveforms cannot be easily represented by linear transfer functions even if the microphones are only a few millimeters apart.

Figure 2:
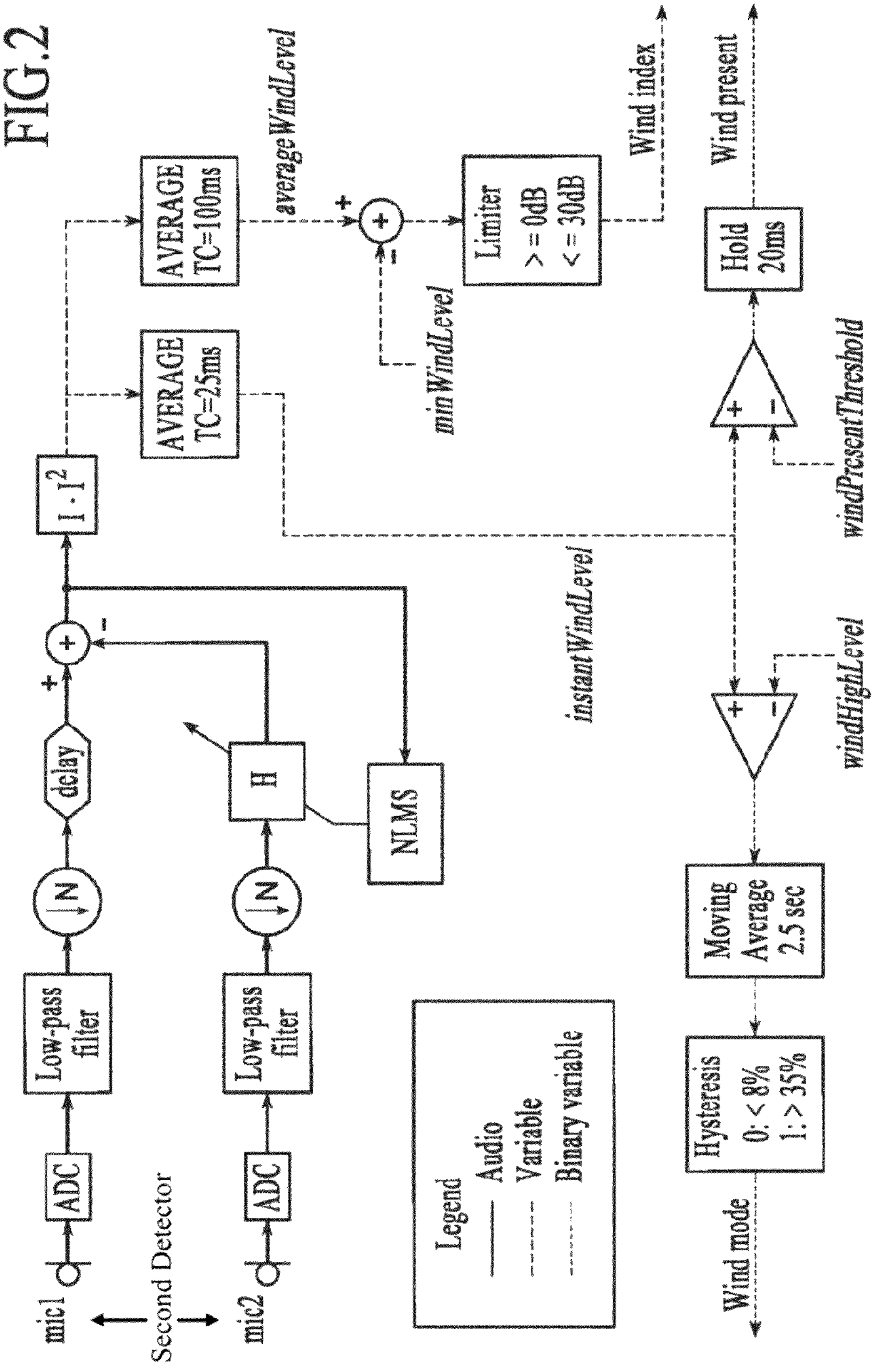
FIG. 2 is a block diagram of a wind detector, under an embodiment.

Consequently a linear adaptive filter can be used to monitor the degree of correlation (or lack thereof) between the two microphone signals by measuring the energy of the adaptive filter error from which a metric of wind intensity can be derived. A Normalized Least Mean Square (NLMS) or similar adaptive filter is used to carry out this task. FIG. 2 is a block diagram of a wind detector, under an embodiment.

More specifically, the system of an embodiment includes a first detector that receives a first signal and a second detector that receives a second signal. A voice activity detector (VAD) is coupled to the first detector. The VAD generates a VAD signal when the first signal corresponds to voiced speech. The system includes a wind detector coupled to the second detector. The wind detector correlates signals received at the second detector and derives or generates from the correlation wind metrics that characterize wind noise that is acoustic disturbance corresponding to at least one of air flow and air pressure in the second detector. The wind metrics are used as control signals as described in detail herein. For example, the wind detector controls a configuration of the second detector according to the wind metrics, by using the wind metrics to dynamically control mixing of the first signal and the second signal to generate an output signal for transmission.

The wind detector comprises an adaptive filter coupled to the second detector. The wind detector correlates signals by calculating energy of an adaptive filter error of the adaptive filter. The error is large when the signals are uncorrelated, which is the case for wind noise. Normal acoustic speech and noise are highly correlated between the microphones, which are typically 10-40 mm apart from one another. The wind detector of an embodiment comprises a first exponential averaging filter and a second exponential averaging filter coupled to the adaptive filter. The wind detector applies the energy to the first exponential averaging filter and the second exponential averaging filter. The system of an embodiment comprises a gain controller coupled to the first detector and the wind detector.

Figure 3:
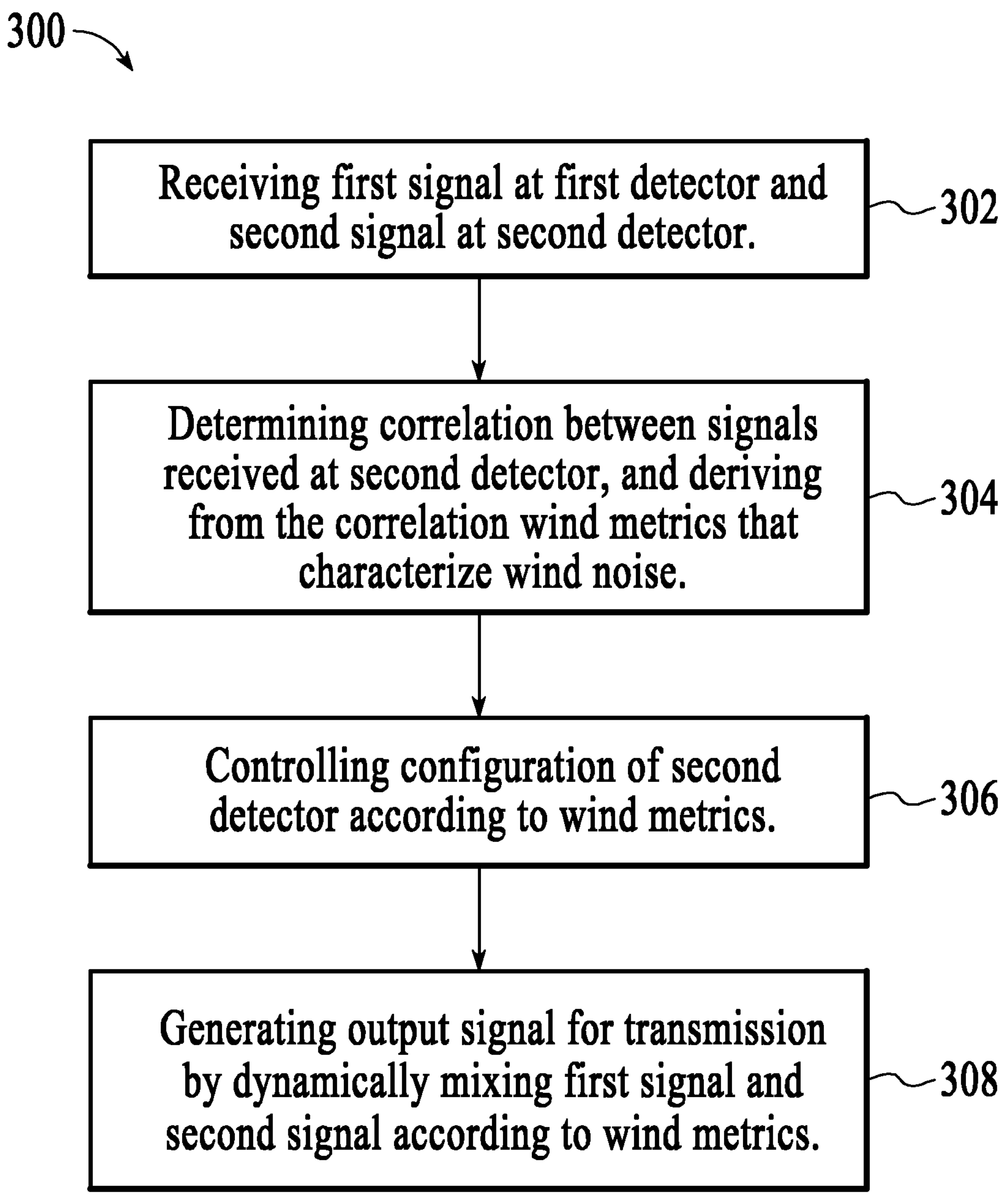
FIG. 3 is a flow diagram for controlling processing of received signals that include wind noise, under an embodiment.

FIG. 3 is a flow diagram for controlling processing of received signals that include wind noise 300, under an embodiment. The signal processing receives a first signal at a first detector and a second signal at a second detector 302. A correlation is determined between signals received at the second detector, and wind metrics are derived from the correlation that characterize wind noise that is acoustic disturbance corresponding to at least one of air flow and air pressure in the second detector 304. An embodiment controls configuration of the second detector according to the wind metrics 306. An embodiment generates an output signal for transmission by dynamically mixing the first signal and the second signal according to the wind metrics 308.

In the description below, many variable values are presented. The algorithm of an embodiment does not require that the variables take on exactly the values presented, and some variation is allowable such that the embodiments are not restricted to the values presented herein.

Figure 4:
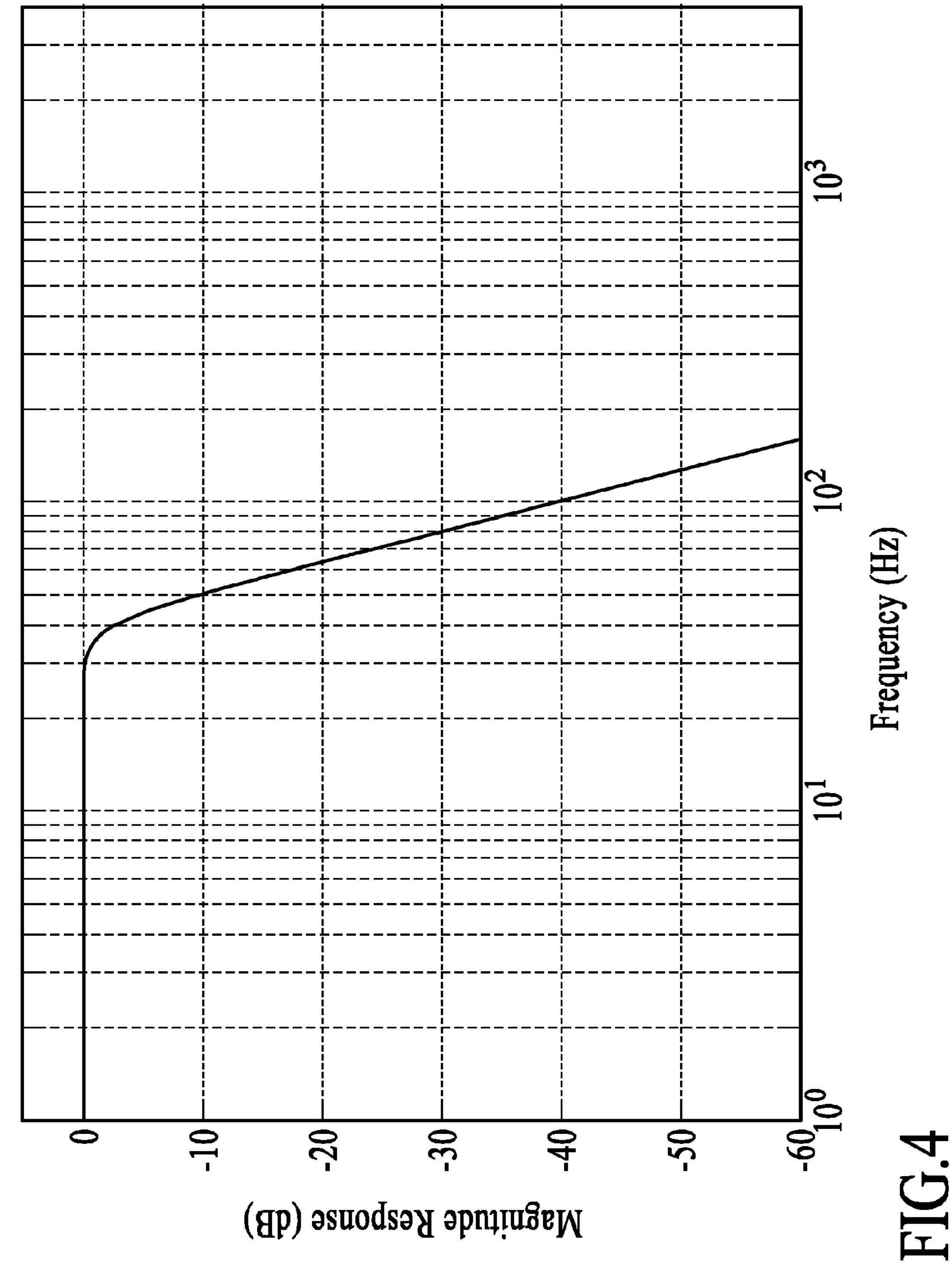
FIG. 4 is a low-pass wind detection filter response, under an embodiment.

Prior to NLMS adaptive filtering, a fifth order low-pass Butterworth filter with a cutoff frequency of 40 Hz is used on both microphone signals. FIG. 4 is a low-pass wind detection filter response, under an embodiment. This region is normally dominated by wind (and not acoustic) noise, making detection more accurate and robust.

The filtered signals are then decimated by a factor of 21 to limit the LMS computational workload and provide faster adaptation with fewer adaptive taps on the "whiter" decimated signals. Note that the reference LMS signal (in this case low-passed and decimated $O_1$) is delayed prior to calculating the error to allow causal models of sound from all angles of incidence on the microphone array. For this LMS filter, a delay of 2 (decimated) samples and 7 adaptive LMS taps are used.

The energy of the LMS residual is then calculated. It is sent to two smoothing exponential averaging filters $E_1(z)$ and $E_2(z)$:

$$E_1(z) = \left(\frac{1-\alpha_1}{1-\alpha_1 z^{-1}}\right)$$

$$E_2(z) = \left(\frac{1-\alpha_2}{1-\alpha_2 z^{-1}}\right)$$

where $\alpha_1$=0.895 and $\alpha_2$=0.97375 so that the time constant of E1 using an 8 kHz sampling rate decimated by 21 is 25 msec and E2 is 100 msec. The time constants can be varied somewhat, but E1 should react significantly faster than E2. The output of E1 yields a variable called instantWindLevel and the output of E2 variable currentWindLevel. For the sake of clarity, these variables will be valued in dBFS; that is measured in decibels relative to a full scale residual input (0 dB).

A first output variable windIndex of this module is obtained by subtracting the minWindLevel threshold (−86 dBFS in this enablement) from currentWindLevel and limiting its values to the 0-30 dB range. This variable is used later as a metric of the wind level compared to a minimum level under which wind is considered to have negligible impact on noise suppression, intelligibility, and listening experience.

Another output variable windPresent (binary) is obtained by comparing instantWindLevel to a windPresentThreshold (e.g., −74 dBFS) constant threshold yielding a binary variable equal to 1 when the variable exceeds the threshold. The binary variable is then followed by a hold block that maintains a binary output of 1 for 20 msec whenever the input is 1. This variable is used by other components of the system to suspend activities that would otherwise be negatively affected in the presence of wind.

A final binary variable windMode is produced by comparing instantWindLevel to windHighLevel, a constant threshold of −69 dBFS in this enablement over which wind is deemed to have high impact on intelligibility and comfort. The resulting binary output is then filtered by a 2.5 second moving average filter whose output effectively indicates the portion of time that was windy during the last 2.5 seconds. When windMode=0, this percentage is compared against a 35% threshold. If exceeded, windMode is switched to 1. When windMode=1, this percentage is compared against an 8% threshold. If under, windMode is switched to 0. This hysteresis approach prevents windMode from rapidly switching states and is used in lieu of windPresent in scenarios where such fast changes are undesirable.

Turning to the SSM equalization component of an embodiment, in order to substitute SSM audio for microphone audio in the transmitted audio spectrum, the SSM level and its frequency response should be adjusted to match the transmit audio in the absence of wind as closely as possible. The SSM or similar signal captured at the skin is filtered in order to match as closely as possible speech captured by the primary microphone (O1) in the absence of wind or noise. Unfortunately, this technique cannot be used to extract high-fidelity speech for several reasons. One reason is that SSM audio has too little speech content beyond 1 kHz, where it is near or under the sensor's noise floor. Another reason is that there is not a unique transfer function mapping SSM to O1 responses for all phonemes; the transform is specific to each phoneme. Yet another reason is that the SSM response to speech is affected by facial features near the SSM pickup location, specifically the layer of soft tissues separating SSM from cheekbone. As a result, mic-to-SSM response (even for stationary speech production) varies across users.

For these reasons, the optimal SSM-microphone speech response transform can only be approximated. In this implementation, it is achieved in two consecutive stages: a one-size-fit-all static equalization filter and an adaptive gain control stage (AGC) to match the RMS of regular speech.

Figure 5:
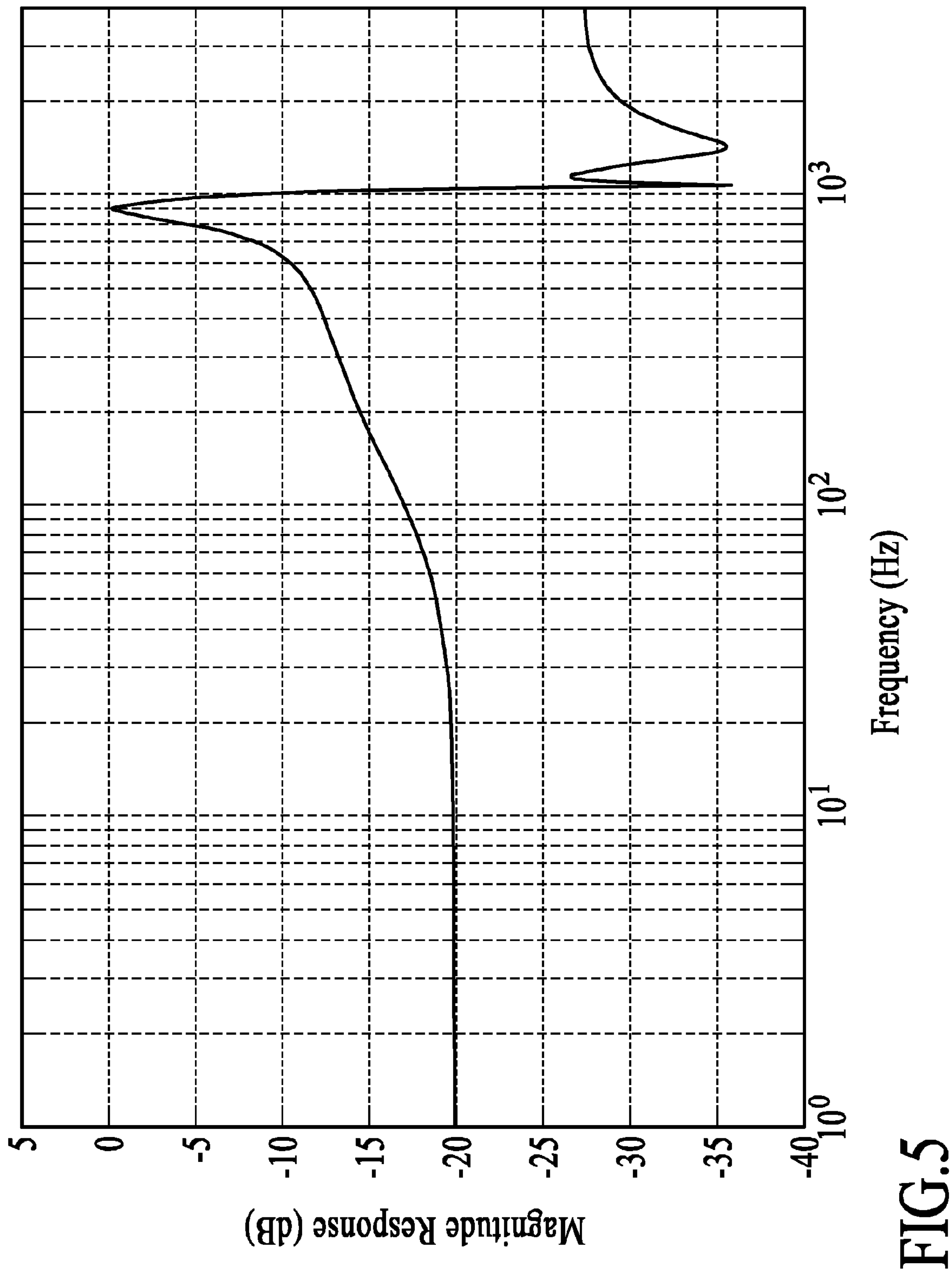
FIG. 5 is the magnitude response of the SSM equalization filter, under an embodiment.

FIG. 5 is the magnitude response of the SSM equalization filter, under an embodiment. It is implemented as a cascade of 3 biquad IIR filters, but is not so limited. The filter attempts to match the responses up to about 1 kHz where the SSM speech response becomes too small. The region beyond 1 kHz is treated as a stop-band and filtered out to avoid amplifying what is mostly acoustic noise and sensor self-noise.

The subsequent AGC stage adjusts its gain to match the root mean square (RMS) of the equalized SSM signal to the RMS of the noise-suppressed speech from 0 to 1 kHz. The gain adjustment only occurs when two conditions are met. The first condition is no wind present, as indicated by windPresent. The second condition involves speech activity. A conservative VAD is used indicating speech activity with high level of confidence at the expense of potentially many false negatives. The idea is that the AGC gain should not be adapted when speech is not occurring. Also, short-lived VAD pulses of less than 60 ms are rejected from this binary VAD waveform. Furthermore to increase robustness, the AGC gain is limited to a +/−25 dB range.

Finally the conservative, pulse-rejected VAD used above is also used to noise gate the SSM audio before mixing. This eliminates the static noise that would otherwise be perceived when no speech is present in the SSM. This noise gate reduces noise during no-speech sections by 15 dB.

The omnidirectional microphone array used in Jawbone Prime (DOMA) (see section "Dual Omnidirectional Microphone Array (DOMA)" below) provides relatively good noise suppression performance. Unfortunately, due to the combination of omnidirectional microphones to form virtual microphones, it is more sensitive to wind than a single omnidirectional microphone. Therefore, in sustained wind conditions it can be preferable to switch to a microphone array configuration that presents better wind immunity even at the expense of lower noise suppression performance.

If the wind detector reports sufficient sustained wind, the wind detector's windMode variable turns on. At this time, the benefit of further reducing the wind in the microphones outweighs the noise reduction advantage offered by the microphone array. In wind mode, the DOMA array is therefore turned off and the noise suppression algorithm bypassed. However, instead of using audio from a single microphone, a simple way to further reduce the wind-to-speech ratio is to add the signals from both omnidirectional microphones together. While the resulting speech content increases by 6 dB, the wind RMS is only increased by about 3 dB as wind signals in O1 and O2 are uncorrelated. Note that O1 audio is delayed by a fractional delay that accounts for the travel time of speech from O1 to O2 plus any ADC sampling time difference between O2 and O1 audio channels. Naturally, the resulting signal needs to be scaled by a correction gain factor to match the speech response outside wind mode.

A problem with this technique is the absence of any noise suppression. To mitigate this performance drop, a basic single-microphone noise suppression algorithm such as spectral subtraction is used to attenuate stationary noise in 16 frequency bands evenly distributed across the spectrum (0-4 kHz). These algorithms work by selectively attenuating bands where speech-to-noise (and -wind) ratio is lower than 12 dB. The maximum attenuation used here is 8 dB when the SNR is lower than 3 dB.

Regarding the dynamic mixing component of an embodiment, there is an optimal mix of low-passed SSM and high-passed microphone audio (DOMA or Wind Mode Audio) that can be achieved for each level of wind intensity. As the wind continuously changes, the mixer adjusts (dynamic) filters' responses to obtain the desired mix. Now that SSM and microphone audio signals have been processed in previous stages, they must be combined in a seamless fashion for varying amount of wind. The technique used here relies on the observation that the microphones' responses to wind drops as the frequency increases. In fact, the wind detector windIndex variable provides a rough but reliable metric of the amount of wind at any time from which an estimate of the wind frequency response can be derived. Another important characteristic of the wind frequency response curve is that it tends to decrease with frequency at a constant rate through the spectrum and for varying level of winds until the wind response eventually reaches the noise floor. Note however that this is true only when wind is moderate enough such as not to saturate the microphone(s) and/or ADC converter(s).

In very low or no-wind conditions (windIndex=0 dB), no SSM mixing is required. In very high wind conditions (windIndex=30 dB), only equalized SSM audio is used for frequencies up to 1 kHz. In-between these two extremes, a set of two dynamic filters is used to high-pass the microphone signal (either DOMA/noise-suppressed or wind mode output) and low-pass the equalized SSM audio.

Figure 6:
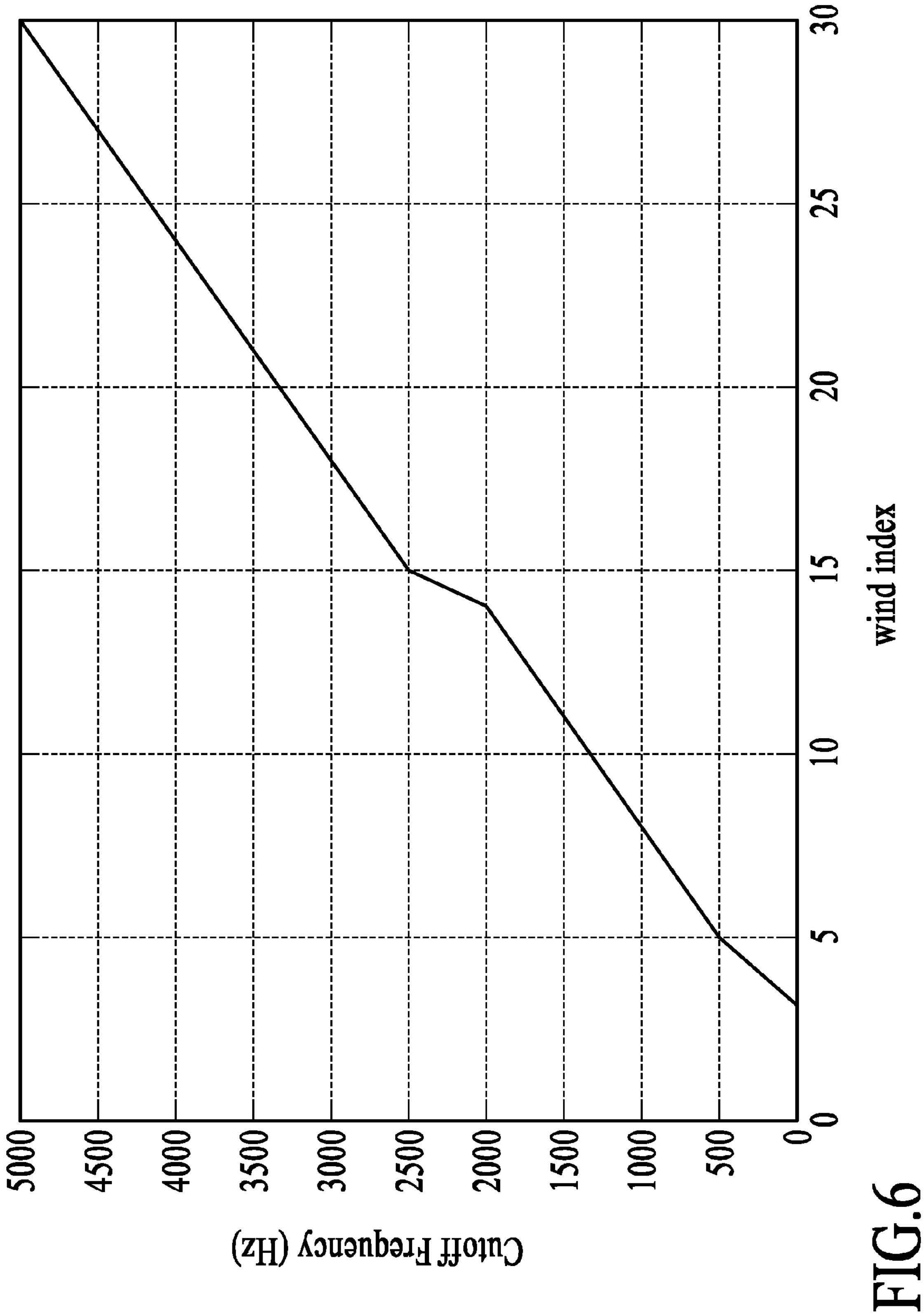
FIG. 6 is an example look-up table mapping wind index to cutoff frequency, under an embodiment.

For Jawbone Prime, advantage is taken of the fact that noise-suppressed or wind mode audio is available in 16-band frequency analysis format to implement the low- and high-pass filters as sub-band equalizers characterized by one real weight per sub-band. A look-up table is used to find the starting band index B corresponding to the −70 dB stop-band of the filter used to low-pass the SSM. FIG. 6 is an example look-up table mapping wind index to cutoff frequency, under an embodiment. This index is then used to retrieve the gain $G_{LP}$ used to multiply each of the bands, for example:

| SSM band index | $G_{LP}$ |
|---|---|
| ≦B − 4 | 0 dB |
| B − 4 | −5 dB |
| B − 3 | −12 dB |
| B − 2 | −22 dB |
| B − 1 | −35 dB |
| ≧B | −70 dB |

Figure 7:
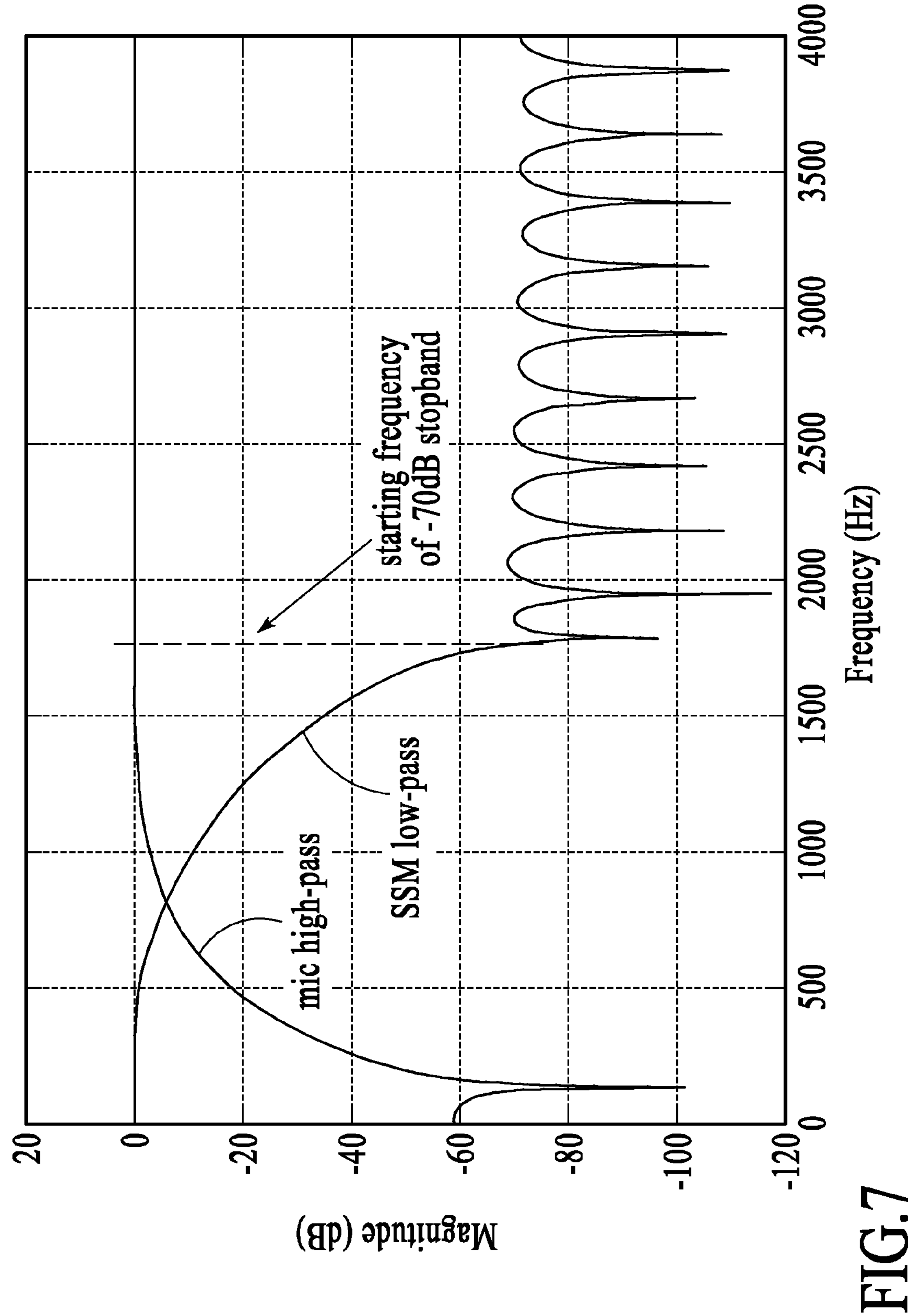
FIG. 7 is a filter response of a low-pass and corresponding high-pass filter used in mixing SSM and microphone audio, under an embodiment.

The high-pass equalizer weights $G_{HP}$ used for the microphone audio are obtained by calculating $$G_{HP} = 20 * \log_{10}\left(1 - 10^{\frac{G_{LP}}{20}}\right)$$

for each band. For a full-band implementation, a 32-tap linear-phase low-pass FIR filter can be stored in memory and retrieved for each of the 31 wind indexes and the corresponding high-pass filter can be derived by subtracting 1 from the central tap. FIG. 7 is a filter response of a low-pass and corresponding high-pass filter used in mixing SSM and microphone audio for windIndex=12 dB, under an embodiment.

Regarding the comfort wind noise component of an embodiment, a limited amount of wind noise is added to both receive and transmit audio to increase both near- and far-end users' awareness to wind impact on the conversation with little negative effect on intelligibility and listening comfort. A complementary approach to wind reduction is to get the near-end user to take a pro-active role in limiting wind exposure. By adding a limited amount of wind noise to the receive audio in the form of a side tone, the user will tend to subconsciously change his position relative to the wind to minimize the feedback in the speaker.

Generation of the comfort wind noise of an embodiment begins by subtracting O2 from O1. This reduces much of the non-wind components of the signal. This difference is modulated by a gain that combines two factors. The first factor is a static gain to guarantee an appropriate level of wind feedback in the speaker. The second factor is a gating factor derived from the binary windPresent variable going through a binary pulse-rejection block rejecting positive pulses shorter than 20 ms followed by a hold block with a hold duration of 10 ms. Upon modulation of the signal, a filter is applied that limits the amount of low-frequency wind reaching the headset receiver (whose low-frequency response is poor given its small size) and to scale down the higher frequency content of wind that can be responsible for uncomfortable noise in high wind. The resulting signal is designed to sound like a rumble characteristic of wind heard through speakers without over-driving the receiver.

Figure 8:
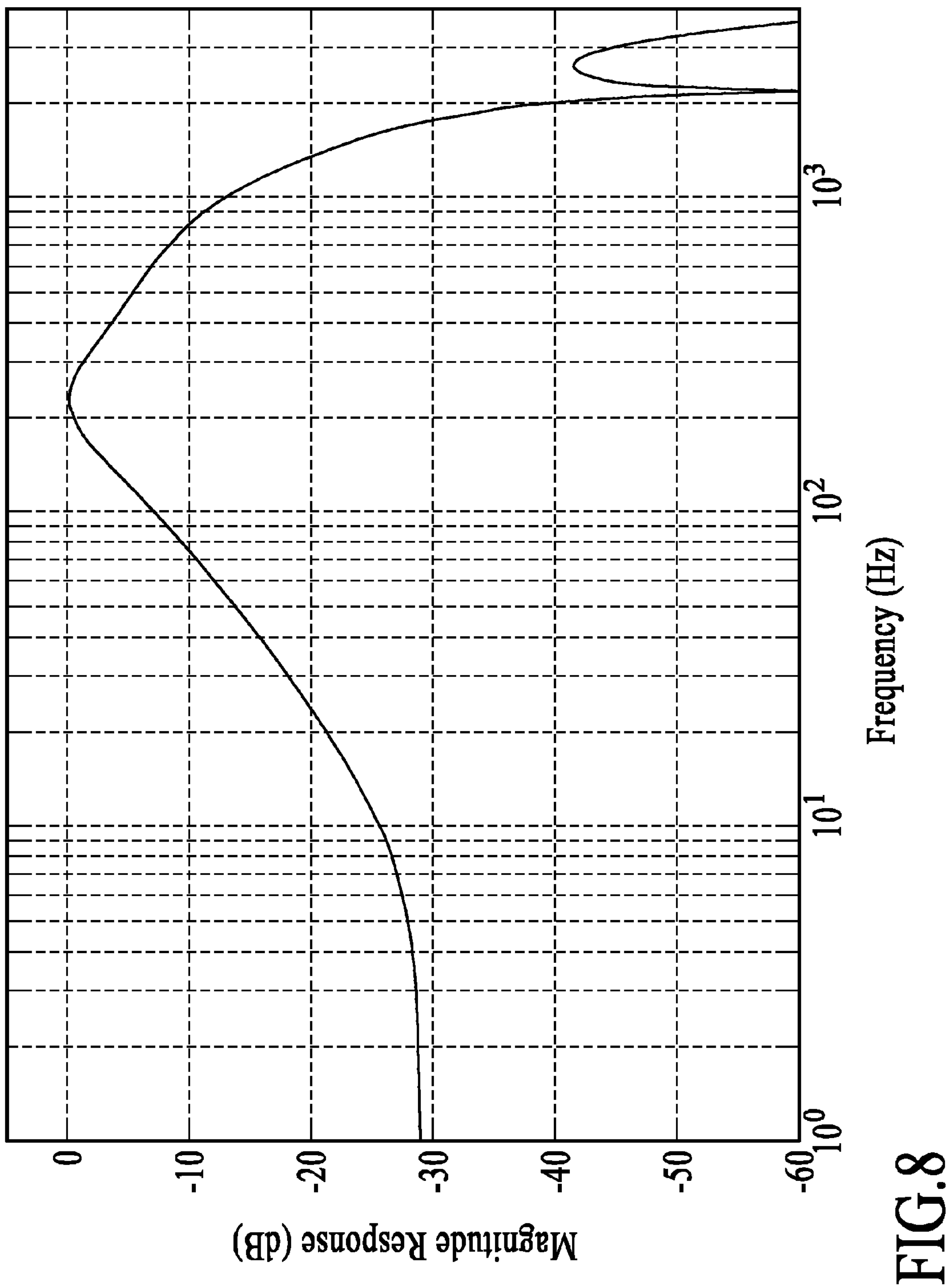
FIG. 8 is a magnitude response of a filter used to produce receive wind comfort noise, under an embodiment.

FIG. 8 is a magnitude response of a filter used to produce receive wind comfort noise, under an embodiment. Note that this filter was designed based on the specific characteristics of the microphones and speaker used in Jawbone Prime and there may be some changes required for different implementations. The important part is to add enough wind noise to be audible to the headset user but not enough to disrupt the conversation.

Figure 9:
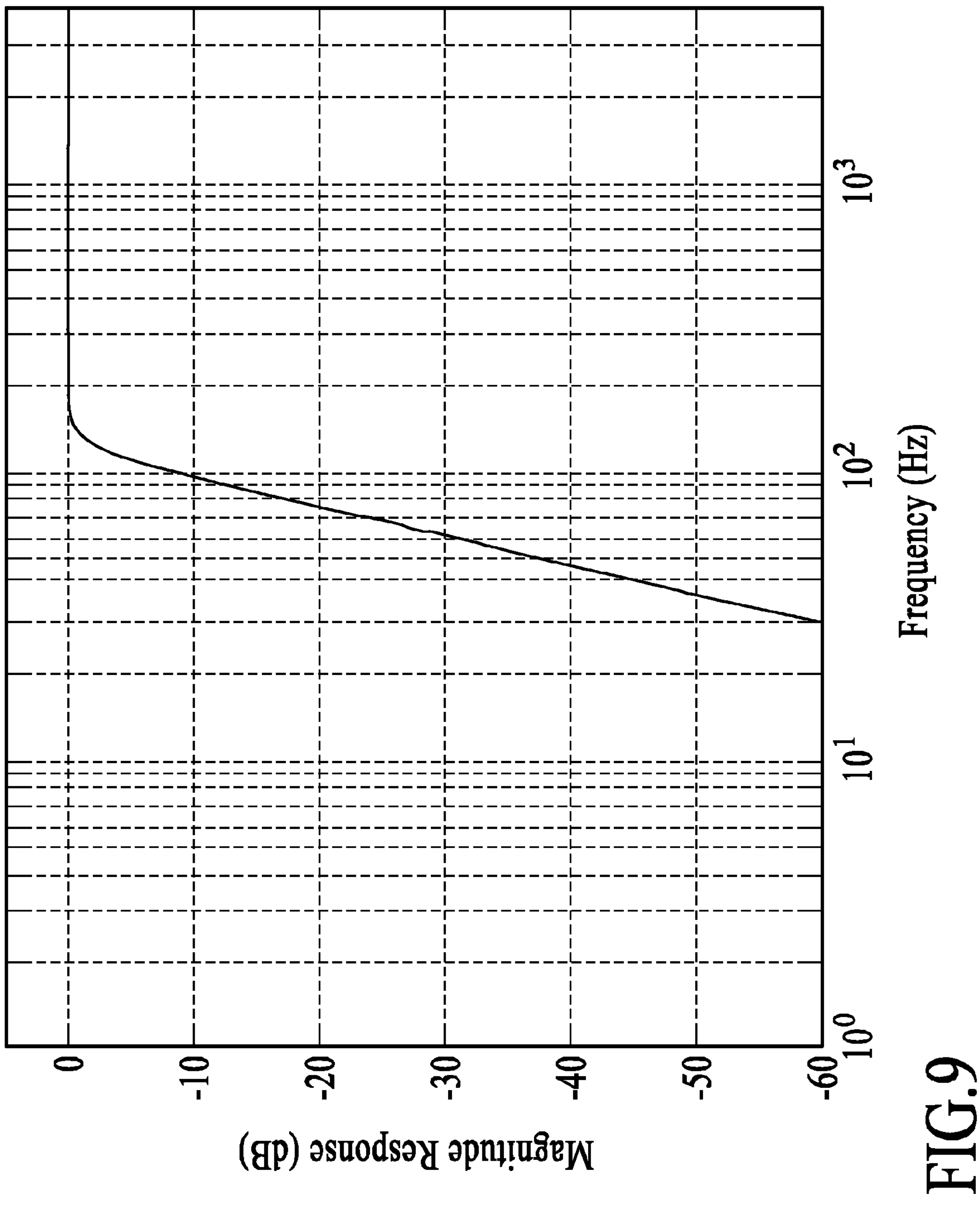
FIG. 9 is a magnitude response of a filter used to produce transmit wind comfort noise, under an embodiment.

Likewise, transmit comfort wind noise is added to the transmitted audio to alert the far-end user that wind is present, providing an explanation for the difference in speech response due to SSM mixing and/or degradation of noise suppression performance. However, due to differences in Bluetooth transmission and phone/network responses, a number of changes are made. A first change is the use of a different static gain to ensure appropriate level of wind feedback on the other end of the line; this gain is set experimentally. Another change is the use of a different filter, where FIG. 9 is a magnitude response of a filter used to produce transmit wind comfort noise, under an embodiment. In addition, the resulting signal is delayed so as to be synchronous with the processed transmit audio it is added to before transmission.

Figure 10:
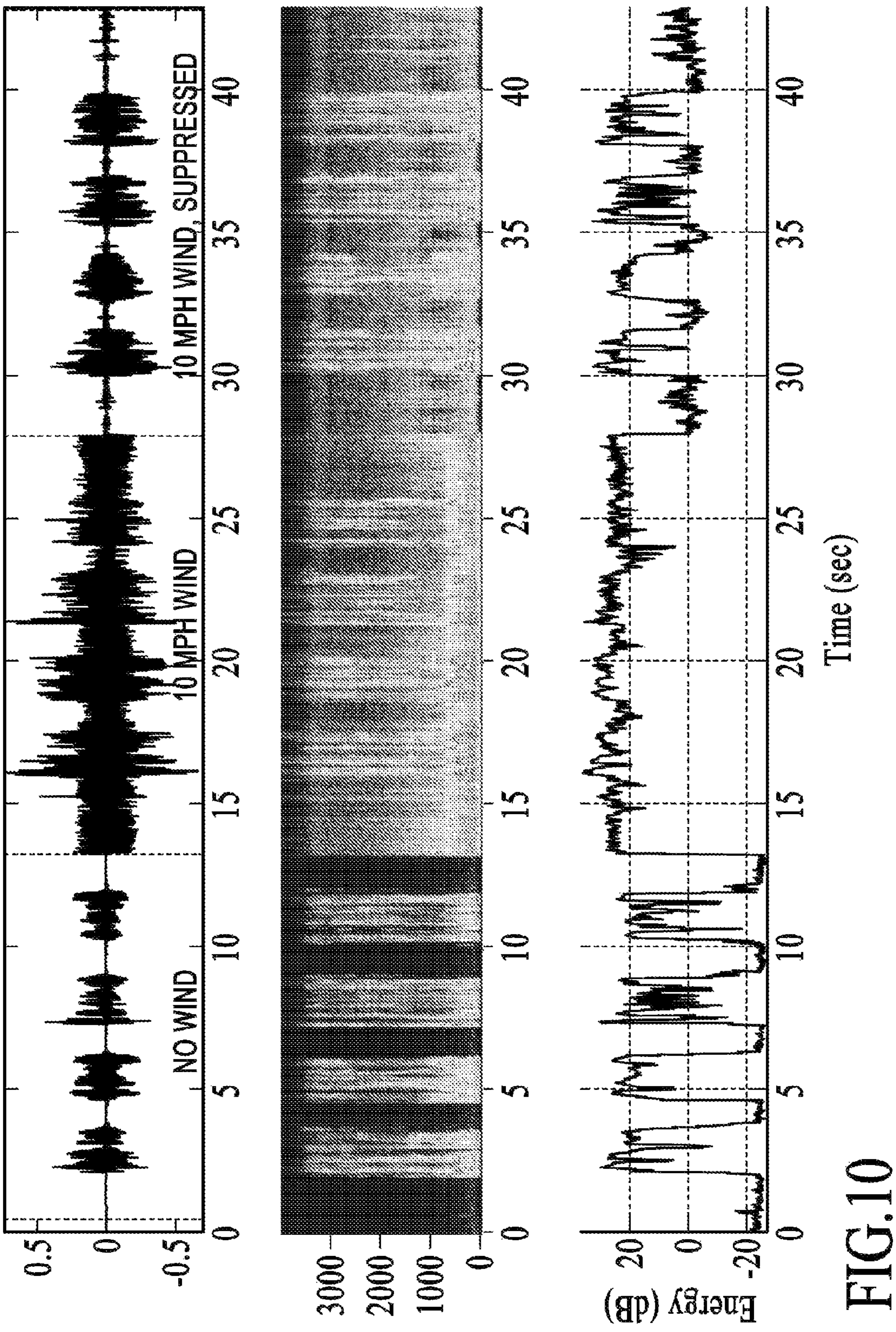
FIG. 10 is an example plot comparing the speech response of a system with no wind, with 10 mph wind, and with 10 mph wind and wind suppression, under an embodiment.

As an example of performance obtained under an embodiment, FIG. 10 shows a plot of a male English speaker speaking in silence (left), in a moderate wind (10 mph, center), and in the same wind with the wind suppression algorithm active (right), under an embodiment. The top is the time series, the middle the spectrogram, and the bottom the energy vs. time. Clearly the wind overwhelms the vast majority of the speech, significantly disrupting the quality and intelligibility. The wind suppression algorithm significantly reduces the wind noise and restores the speech quality and intelligibility.

Systems and methods of wind noise detection, suppression, and speech replacement using data from a vibration sensor have been presented. The embodiments described herein take advantage of the vibration sensor's wind immunity and acoustic noise resistance to not only remove wind noise, but restore a significant amount of speech presence and intelligibility. The method of wind suppression involves an adaptive, filtered combination of vibration sensor signal, combined omnidirectional signal, and normal virtual microphone noise suppressed signal. This allows for achievement of significant wind reduction with limited speech distortion despite the severe impact of wind on the microphone signals.

Dual Omnidirectioinal Microphone Array (DOMA)

A dual omnidirectional microphone array (DOMA) that provides improved noise suppression is described herein. Compared to conventional arrays and algorithms, which seek to reduce noise by nulling out noise sources, the array of an embodiment is used to form two distinct virtual directional microphones which are configured to have very similar noise responses and very dissimilar speech responses. The only null formed by the DOMA is one used to remove the speech of the user from $V_2$. The two virtual microphones of an embodiment can be paired with an adaptive filter algorithm and/or VAD algorithm to significantly reduce the noise without distorting the speech, significantly improving the SNR of the desired speech over conventional noise suppression systems. The embodiments described herein are stable in operation, flexible with respect to virtual microphone pattern choice, and have proven to be robust with respect to speech source-to-array distance and orientation as well as temperature and calibration techniques.

In the following description, numerous specific details are introduced to provide a thorough understanding of, and enabling description for, embodiments of the DOMA. One skilled in the relevant art, however, will recognize that these embodiments can be practiced without one or more of the specific details, or with other components, systems, etc. In other instances, well-known structures or operations are not shown, or are not described in detail, to avoid obscuring aspects of the disclosed embodiments.

Unless otherwise specified, the following terms have the corresponding meanings in addition to any meaning or understanding they may convey to one skilled in the art.

The term "bleedthrough" means the undesired presence of noise during speech.

The term "denoising" means removing unwanted noise from Mid., and also refers to the amount of reduction of noise energy in a signal in decibels (dB).

The term "devoicing" means removing/distorting the desired speech from Mic1.

The term "directional microphone (DM)" means a physical directional microphone that is vented on both sides of the sensing diaphragm.

The term "Mic1 (M1)" means a general designation for an adaptive noise suppression system microphone that usually contains more speech than noise.

The term "Mic2 (M2)" means a general designation for an adaptive noise suppression system microphone that usually contains more noise than speech.

The term "noise" means unwanted environmental acoustic noise.

The term "null" means a zero or minima in the spatial response of a physical or virtual directional microphone.

The term "$O_1$" means a first physical omnidirectional microphone used to form a microphone array.

The term "$O_2$" means a second physical omnidirectional microphone used to form a microphone array.

The term "speech" means desired speech of the user.

The term "Skin Surface Microphone (SSM)" is a microphone used in an earpiece (e.g., the Jawbone earpiece available from Aliph of San Francisco, Calif.) to detect speech vibrations on the user's skin.

The term "$V_1$" means the virtual directional "speech" microphone, which has no nulls.

The term "$V_2$" means the virtual directional "noise" microphone, which has a null for the user's speech.

The term "Voice Activity Detection (VAD) signal" means a signal indicating when user speech is detected.

The term "virtual microphones (VM)" or "virtual directional microphones" means a microphone constructed using two or more omnidirectional microphones and associated signal processing.

Figure 11:
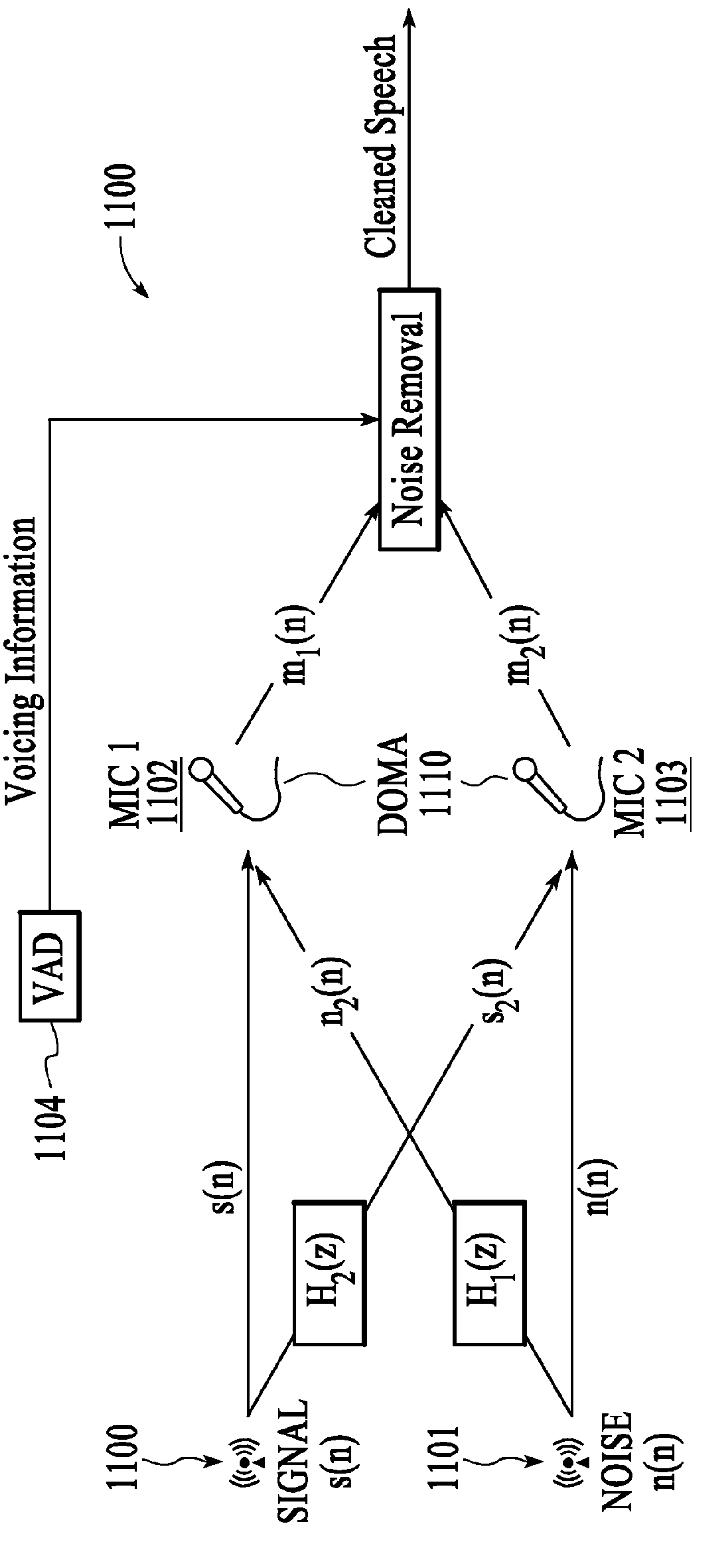
FIG. 11 is a two-microphone adaptive noise suppression system, under an embodiment.

FIG. 11 is a two-microphone adaptive noise suppression system 1100, under an embodiment. The two-microphone system 1100 including the combination of physical microphones MIC 1 and MIC 2 along with the processing or circuitry components to which the microphones couple (described in detail below, but not shown in this figure) is referred to herein as the dual omnidirectional microphone array (DOMA) 1110, but the embodiment is not so limited. Referring to FIG. 11, in analyzing the single noise source 1101 and the direct path to the microphones, the total acoustic information coming into MIC 1 (1102, which can be an physical or virtual microphone) is denoted by $m_1(n)$. The total acoustic information coming into MIC 2 (1103, which can also be an physical or virtual microphone) is similarly labeled $m_2(n)$. In the z (digital frequency) domain, these are represented as $M_1(z)$ and $M_2(z)$. Then, $$M_1(z)=S(z)+N_2(z)$$

$$M_2(z)=N(z)+S_2(z)$$

with $$N_2(z)=N(z)H_1(z)$$

$$S_2(z)=S(z)H_2(z)$$

so that $$M_1(z)=S(z)+N(z)H_1(z)$$

$$M_2(z)=N(z)+S(z)H_2(z). \quad \text{Eq. 1}$$

This is the general case for all two microphone systems. Equation 1 has four unknowns and only two known relationships and therefore cannot be solved explicitly.

However, there is another way to solve for some of the unknowns in Equation 1. The analysis starts with an examination of the case where the speech is not being generated, that is, where a signal from the VAD subsystem 1104 (optional) equals zero. In this case, s(n)=S(z)=0, and Equation 1 reduces to $$M_{1N}(z)=N(z)H_1(z)$$

$$M_{2N}(Z)=N(z),$$

where the N subscript on the M variables indicate that only noise is being received. This leads to $$M_{1N}(z)=M_{2N}(z)H_1(z) \quad \text{Eq. 2}$$

$$H_1(z)=\frac{M_{1N}(z)}{M_{2N}(z)}.$$

The function $H_1(z)$ can be calculated using any of the available system identification algorithms and the microphone outputs when the system is certain that only noise is being received. The calculation can be done adaptively, so that the system can react to changes in the noise.

A solution is now available for $H_1(z)$, one of the unknowns in Equation 1. The final unknown, $H_2(z)$, can be determined by using the instances where speech is being produced and the VAD equals one. When this is occurring, but the recent (perhaps less than 1 second) history of the microphones indicate low levels of noise, it can be assumed that n(s)=N(z)~0. Then Equation 1 reduces to $$M_{1S}(z)=S(z)$$

$$M_{2S}(z)=S(z)H_2(z),$$

which in turn leads to $$M_{2S}(z)=M_{1S}(z)H_2(z)$$

$$H_2(z)=\frac{M_{2S}(z)}{M_{1S}(z)},$$

which is the inverse of the $H_1(z)$ calculation. However, it is noted that different inputs are being used (now only the speech is occurring whereas before only the noise was occurring). While calculating $H_2(z)$, the values calculated for $H_1(z)$ are held constant (and vice versa) and it is assumed that the noise level is not high enough to cause errors in the $H_2(z)$ calculation.

After calculating $H_1(z)$ and $H_2(z)$, they are used to remove the noise from the signal. If Equation 1 is rewritten as $$S(z)=M_1(z)-N(z)H_1(z)$$

$$N(z)=M_2(z)-S(z)H_2(z)$$

$$S(z)=M_1(z)[M_2(z)-S(z)H_2(z)]H_1(z)$$

$$S(z)[1-H_2(z)H_1(z)]=M_1(z)-M_2(z)H_1(z),$$

then N(z) may be substituted as shown to solve for S(z) as $$S(z)=\frac{M_1(z)-M_2(z)H_1(z)}{1-H_1(z)H_2(z)}. \quad \text{Eq. 3}$$

If the transfer functions $H_1(z)$ and $H_2(z)$ can be described with sufficient accuracy, then the noise can be completely removed and the original signal recovered. This remains true without respect to the amplitude or spectral characteristics of the noise. If there is very little or no leakage from the speech source into $M_2$, then $H_2(z)\approx 0$ and Equation 3 reduces to $$S(z)\approx M_1(z)-M_2(z)H_1(z). \quad \text{Eq. 4}$$

Equation 4 is much simpler to implement and is very stable, assuming $H_1(z)$ is stable. However, if significant speech energy is in $M_2(z)$, devoicing can occur. In order to construct a well-performing system and use Equation 4, consideration is given to the following conditions:

R1. Availability of a perfect (or at least very good) VAD in noisy conditions

R2. Sufficiently accurate $H_1(z)$

R3. Very small (ideally zero) $H_2(z)$.

R4. During speech production, $H_1(z)$ cannot change substantially.

R5. During noise, $H_2(z)$ cannot change substantially.

Condition R1 is easy to satisfy if the SNR of the desired speech to the unwanted noise is high enough. "Enough" means different things depending on the method of VAD generation. If a VAD vibration sensor is used, as in Burnett U.S. Pat. No. 7,256,048, accurate VAD in very low SNRs (−10 dB or less) is possible. Acoustic-only methods using information from $O_1$ and $O_2$ can also return accurate VADs, but are limited to SNRs of ~3 dB or greater for adequate performance.

Condition R5 is normally simple to satisfy because for most applications the microphones will not change position with respect to the user's mouth very often or rapidly. In those applications where it may happen (such as hands-free conferencing systems) it can be satisfied by configuring Mic2 so that $H_2(z)\approx 0$.

Satisfying conditions R2, R3, and R4 are more difficult but are possible given the right combination of $V_1$ and $V_2$. Methods are examined below that have proven to be effective in satisfying the above, resulting in excellent noise suppression performance and minimal speech removal and distortion in an embodiment.

The DOMA, in various embodiments, can be used with the Pathfinder system as the adaptive filter system or noise removal. The Pathfinder system, available from AliphCom, San Francisco, Calif., is described in detail in other patents and patent applications referenced herein. Alternatively, any adaptive filter or noise removal algorithm can be used with the DOMA in one or more various alternative embodiments or configurations.

When the DOMA is used with the Pathfinder system, the Pathfinder system generally provides adaptive noise cancellation by combining the two microphone signals (e.g., Mic1, Mic2) by filtering and summing in the time domain. The adaptive filter generally uses the signal received from a first microphone of the DOMA to remove noise from the speech received from at least one other microphone of the DOMA, which relies on a slowly varying linear transfer function between the two microphones for sources of noise. Following processing of the two channels of the DOMA, an output signal is generated in which the noise content is attenuated with respect to the speech content, as described in detail below.

Figure 12:
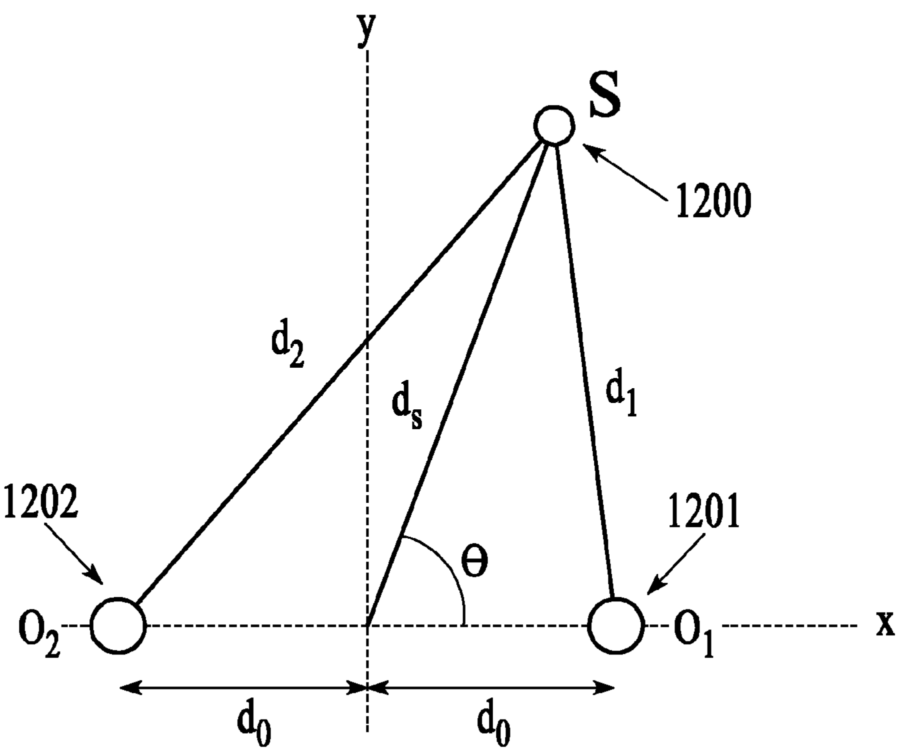
FIG. 12 is an array and speech source (S) configuration, under an embodiment. The microphones are separated by a distance approximately equal to $2d_0$, and the speech source is located a distance $d_s$ away from the midpoint of the array at an angle θ. The system is axially symmetric so only $d_s$ and θ need be specified.
Figure 13:
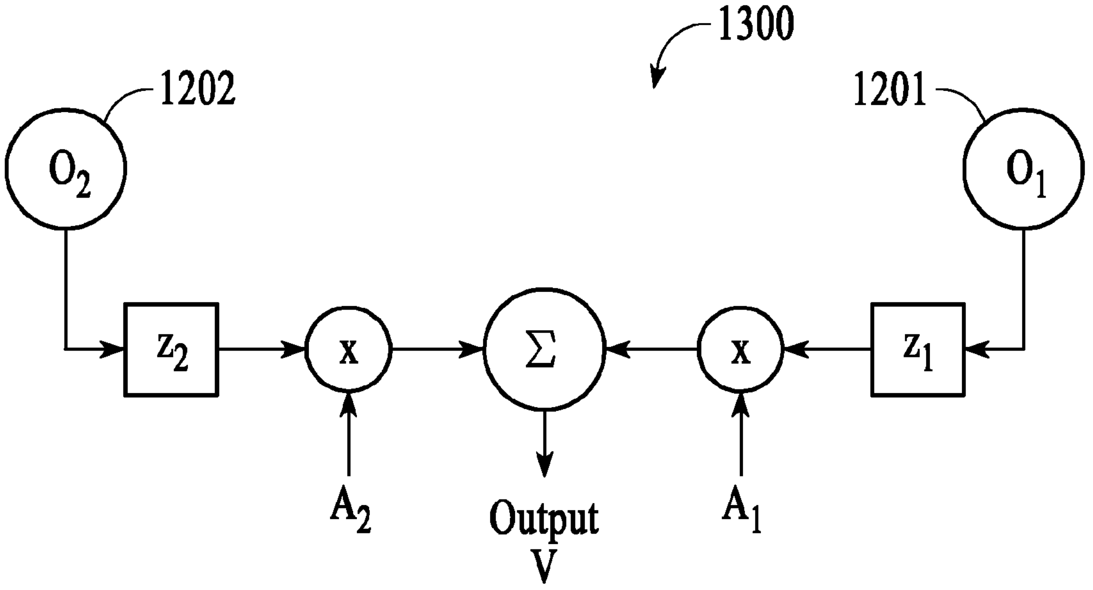
FIG. 13 is a block diagram for a first order gradient microphone using two omnidirectional elements $O_1$ and $O_2$, under an embodiment.

FIG. 12 is a generalized two-microphone array (DOMA) including an array 1201/1202 and speech source S configuration, under an embodiment. FIG. 13 is a system 1300 for generating or producing a first order gradient microphone V using two omnidirectional elements $O_1$ and $O_2$, under an embodiment. The array of an embodiment includes two physical microphones 1201 and 1202 (e.g., omnidirectional microphones) placed a distance $2d_0$ apart and a speech source 1200 is located a distance $d_s$ away at an angle of θ. This array is axially symmetric (at least in free space), so no other angle is needed. The output from each microphone 1201 and 1202 can be delayed ($z_1$ and $z_2$), multiplied by a gain ($A_1$ and $A_2$), and then summed with the other as demonstrated in FIG. 13. The output of the array is or forms at least one virtual microphone, as described in detail below. This operation can be over any frequency range desired. By varying the magnitude and sign of the delays and gains, a wide variety of virtual microphones (VMs), also referred to herein as virtual directional microphones, can be realized. There are other methods known to those skilled in the art for constructing VMs but this is a common one and will be used in the enablement below.

Figure 14:
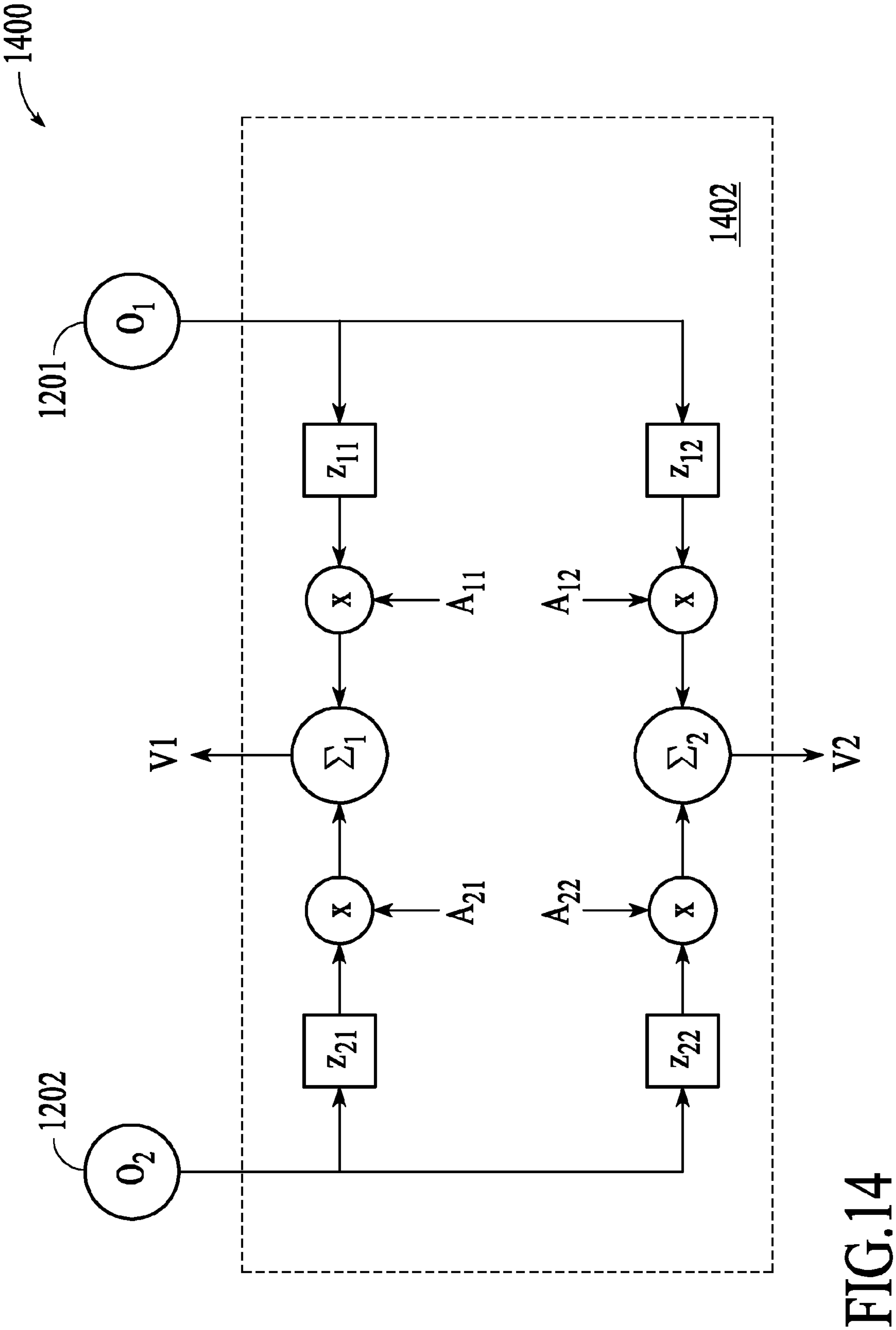
FIG. 14 is a block diagram for a DOMA including two physical microphones configured to form two virtual microphones $V_1$ and $V_2$, under an embodiment.

As an example, FIG. 14 is a block diagram for a DOMA 1400 including two physical microphones configured to form two virtual microphones $V_1$ and $V_2$, under an embodiment. The DOMA includes two first order gradient microphones $V_1$ and $V_2$ formed using the outputs of two microphones or elements $O_1$ and $O_2$ (1201 and 1202), under an embodiment. The DOMA of an embodiment includes two physical microphones 1201 and 1202 that are omnidirectional microphones, as described above with reference to FIGS. 12 and 13. The output from each microphone is coupled to a processing component 1402, or circuitry, and the processing component outputs signals representing or corresponding to the virtual microphones $V_1$ and $V_2$.

In this example system 1400, the output of physical microphone 1201 is coupled to processing component 1402 that includes a first processing path that includes application of a first delay $z_{11}$ and a first gain $A_{11}$ and a second processing path that includes application of a second delay $z_{12}$ and a second gain $A_{12}$. The output of physical microphone 1202 is coupled to a third processing path of the processing component 1402 that includes application of a third delay $z_{21}$ and a third gain $A_{21}$ and a fourth processing path that includes application of a fourth delay $z_{22}$ and a fourth gain $A_{22}$. The output of the first and third processing paths is summed to form virtual microphone $V_1$, and the output of the second and fourth processing paths is summed to form virtual microphone $V_2$.

Figure 15:
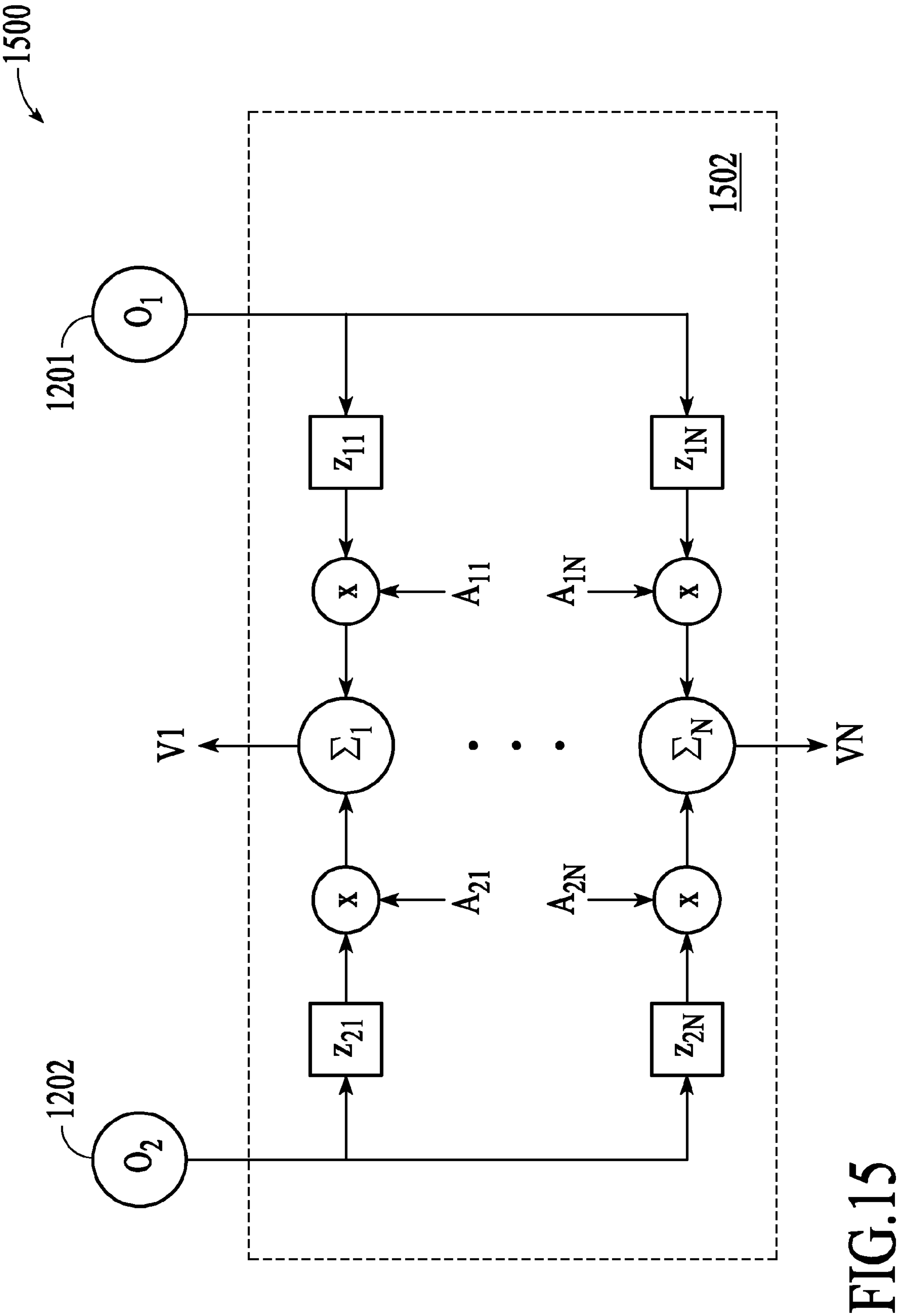
FIG. 15 is a block diagram for a DOMA including two physical microphones configured to form N virtual microphones $V_1$ through $V_N$, where N is any number greater than one, under an embodiment.

As described in detail below, varying the magnitude and sign of the delays and gains of the processing paths leads to a wide variety of virtual microphones (VMs), also referred to herein as virtual directional microphones, can be realized. While the processing component 1402 described in this example includes four processing paths generating two virtual microphones or microphone signals, the embodiment is not so limited. For example, FIG. 15 is a block diagram for a DOMA 1500 including two physical microphones configured to form N virtual microphones $V_1$ through $V_N$, where N is any number greater than one, under an embodiment. Thus, the DOMA can include a processing component 1502 having any number of processing paths as appropriate to form a number N of virtual microphones.

The DOMA of an embodiment can be coupled or connected to one or more remote devices. In a system configuration, the DOMA outputs signals to the remote devices. The remote devices include, but are not limited to, at least one of cellular telephones, satellite telephones, portable telephones, wireline telephones, Internet telephones, wireless transceivers, wireless communication radios, personal digital assistants (PDAs), personal computers (PCs), headset devices, head-worn devices, and earpieces.

Furthermore, the DOMA of an embodiment can be a component or subsystem integrated with a host device. In this system configuration, the DOMA outputs signals to components or subsystems of the host device. The host device includes, but is not limited to, at least one of cellular telephones, satellite telephones, portable telephones, wireline telephones, Internet telephones, wireless transceivers, wireless communication radios, personal digital assistants (PDAs), personal computers (PCs), headset devices, head-worn devices, and earpieces.

Figure 16:
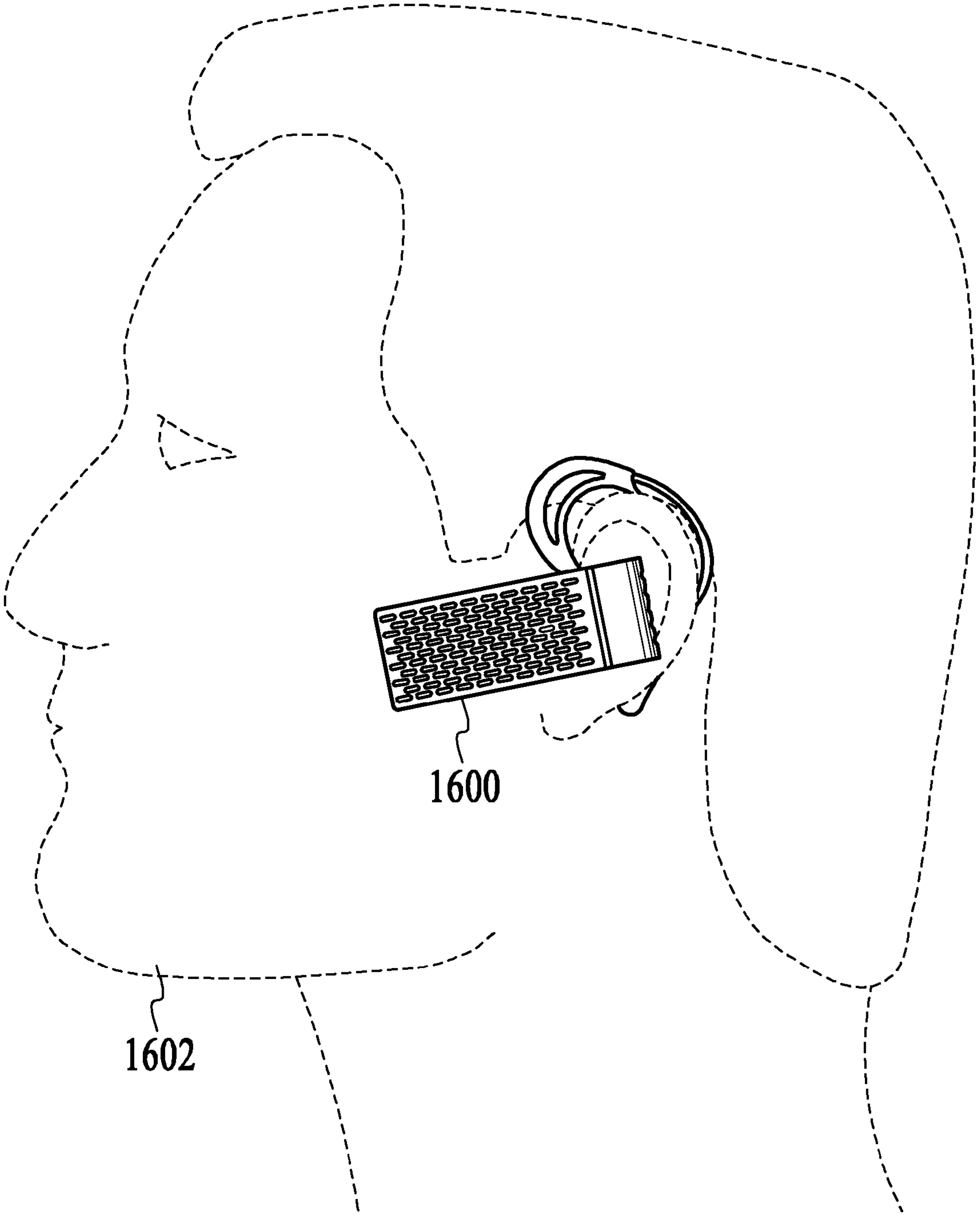
FIG. 16 is an example of a headset or head-worn device that includes the DOMA, as described herein, under an embodiment.

As an example, FIG. 16 is an example of a headset or head-worn device 1600 that includes the DOMA, as described herein, under an embodiment. The headset 1600 of an embodiment includes a housing having two areas or receptacles (not shown) that receive and hold two microphones (e.g., $O_1$ and $O_2$). The headset 1600 is generally a device that can be worn by a speaker 1602, for example, a headset or earpiece that positions or holds the microphones in the vicinity of the speaker's mouth. The headset 1600 of an embodiment places a first physical microphone (e.g., physical microphone $O_1$) in a vicinity of a speaker's lips. A second physical microphone (e.g., physical microphone $O_2$) is placed a distance behind the first physical microphone. The distance of an embodiment is in a range of a few centimeters behind the first physical microphone or as described herein (e.g., described with reference to FIGS. 11-15). The DOMA is symmetric and is used in the same configuration or manner as a single close-talk microphone, but is not so limited.

Figure 17:
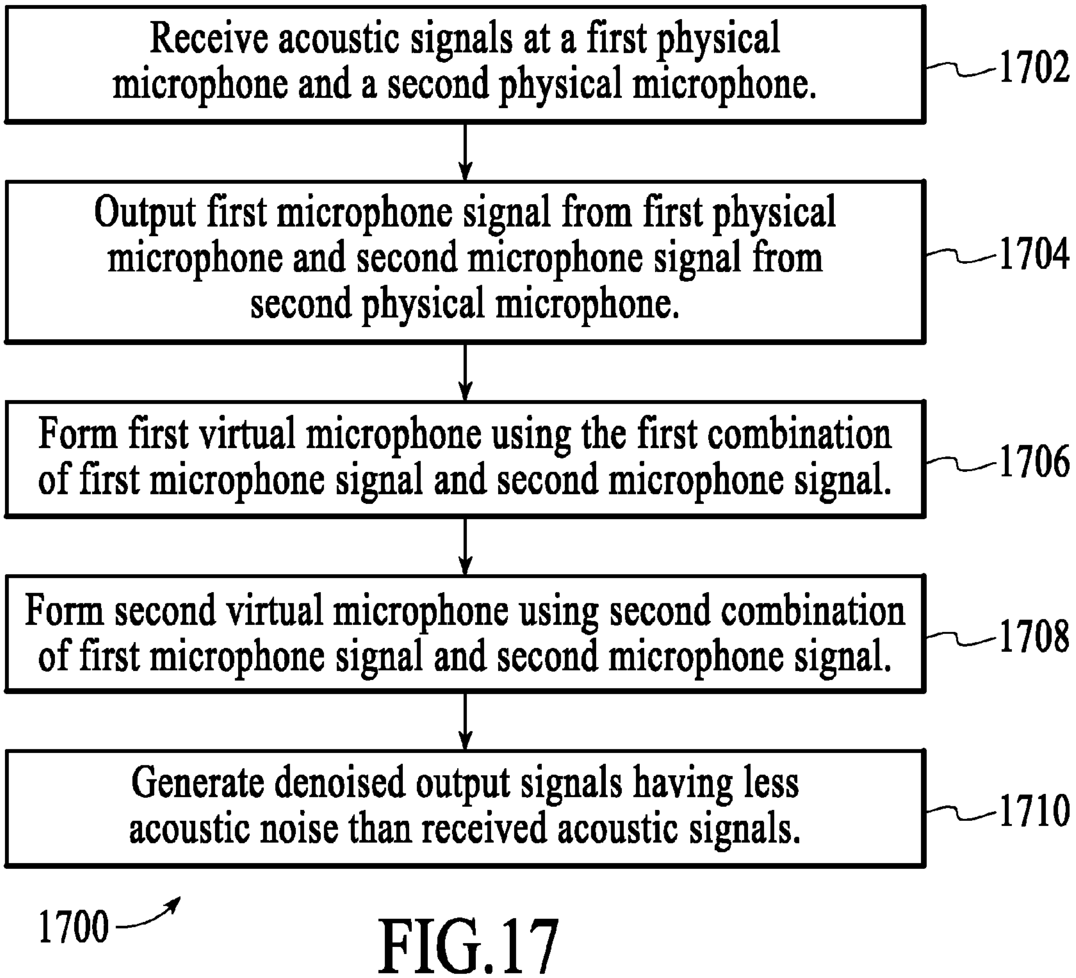
FIG. 17 is a flow diagram for denoising acoustic signals using the DOMA, under an embodiment.

FIG. 17 is a flow diagram for denoising 1700 acoustic signals using the DOMA, under an embodiment. The denoising 1700 begins by receiving 1702 acoustic signals at a first physical microphone and a second physical microphone. In response to the acoustic signals, a first microphone signal is output from the first physical microphone and a second microphone signal is output from the second physical microphone 1704. A first virtual microphone is formed 1706 by generating a first combination of the first microphone signal and the second microphone signal. A second virtual microphone is formed 1708 by generating a second combination of the first microphone signal and the second microphone signal, and the second combination is different from the first combination. The first virtual microphone and the second virtual microphone are distinct virtual directional microphones with substantially similar responses to noise and substantially dissimilar responses to speech. The denoising 1700 generates 1710 output signals by combining signals from the first virtual microphone and the second virtual microphone, and the output signals include less acoustic noise than the acoustic signals.

Figure 18:
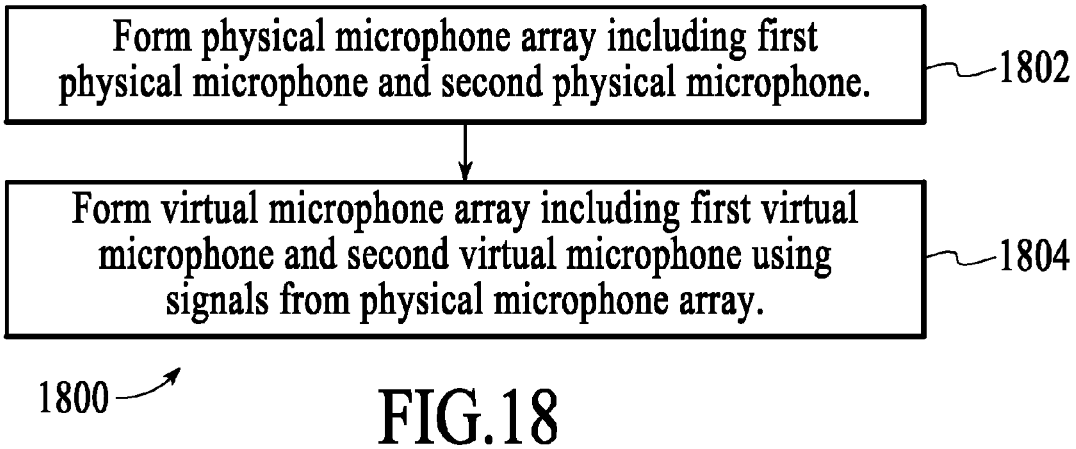
FIG. 18 is a flow diagram for forming the DOMA, under an embodiment.

FIG. 18 is a flow diagram for forming 1800 the DOMA, under an embodiment. Formation 1800 of the DOMA includes forming 1802 a physical microphone array including a first physical microphone and a second physical microphone. The first physical microphone outputs a first microphone signal and the second physical microphone outputs a second microphone signal. A virtual microphone array is formed 1804 comprising a first virtual microphone and a second virtual microphone. The first virtual microphone comprises a first combination of the first microphone signal and the second microphone signal. The second virtual microphone comprises a second combination of the first microphone signal and the second microphone signal, and the second combination is different from the first combination. The virtual microphone array including a single null oriented in a direction toward a source of speech of a human speaker.

The construction of VMs for the adaptive noise suppression system of an embodiment includes substantially similar noise response in $V_1$ and $V_2$. Substantially similar noise response as used herein means that $H_1(z)$ is simple to model and will not change much during speech, satisfying conditions R2 and R4 described above and allowing strong denoising and minimized bleedthrough.

The construction of VMs for the adaptive noise suppression system of an embodiment includes relatively small speech response for $V_2$. The relatively small speech response for $V_2$ means that $H_2(z) \approx 0$, which will satisfy conditions R3 and R5 described above.

The construction of VMs for the adaptive noise suppression system of an embodiment further includes sufficient speech response for $V_1$ so that the cleaned speech will have significantly higher SNR than the original speech captured by $O_1$.

The description that follows assumes that the responses of the omnidirectional microphones $O_1$ and $O_2$ to an identical acoustic source have been normalized so that they have exactly the same response (amplitude and phase) to that source. This can be accomplished using standard microphone array methods (such as frequency-based calibration) well known to those versed in the art.

Referring to the condition that construction of VMs for the adaptive noise suppression system of an embodiment includes relatively small speech response for $V_2$, it is seen that for discrete systems $V_2(z)$ can be represented as:

$$V_2(z) = O_2(z) - z^{-\gamma}\beta O_1(z)$$

where $$\beta = \frac{d_1}{d_2}$$

$$\gamma = \frac{d_2 - d_1}{c} \cdot f_s \text{ (samples)}$$

$$d_1 = \sqrt{d_s^2 - 2d_s d_0\cos(\theta) + d_0^2}$$

$$d_2 = \sqrt{d_s^2 + 2d_s d_0\cos(\theta) + d_0^2}$$

The distances $d_1$ and $d_2$ are the distance from $O_1$ and $O_2$ to the speech source (see FIG. 12), respectively, and $\gamma$ is their difference divided by c, the speed of sound, and multiplied by the sampling frequency $f_s$. Thus $\gamma$ is in samples, but need not be an integer. For non-integer $\gamma$, fractional-delay filters (well known to those versed in the art) may be used.

It is important to note that the $\beta$ above is not the conventional $\beta$ used to denote the mixing of VMs in adaptive beamforming; it is a physical variable of the system that depends on the intra-microphone distance $d_0$ (which is fixed) and the distance $d_s$ and angle $\theta$, which can vary. As shown below, for properly calibrated microphones, it is not necessary for the system to be programmed with the exact $\beta$ of the array. Errors of approximately 10-15% in the actual $\beta$ (i.e. the $\beta$ used by the algorithm is not the $\beta$ of the physical array) have been used with very little degradation in quality. The algorithmic value of $\beta$ may be calculated and set for a particular user or may be calculated adaptively during speech production when little or no noise is present. However, adaptation during use is not required for nominal performance.

Figure 19:
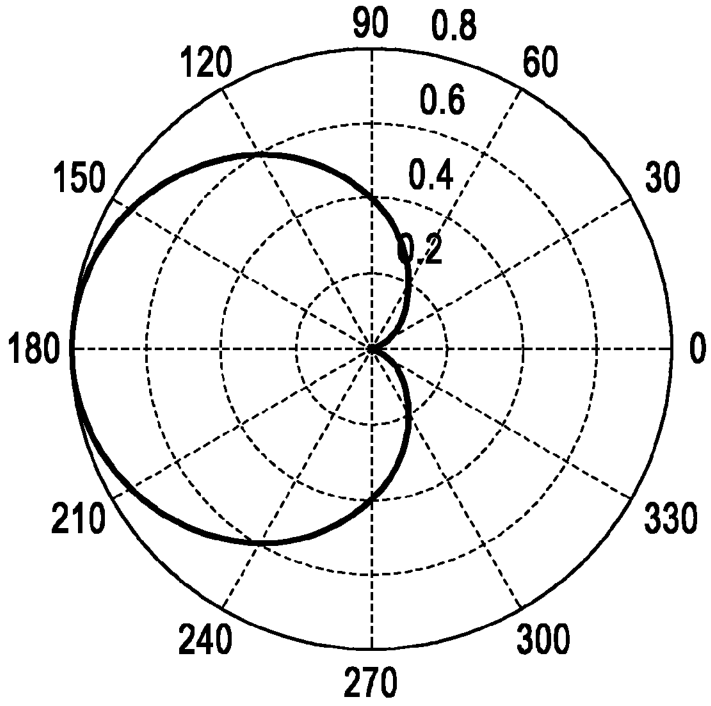
FIG. 19 is a plot of linear response of virtual microphone $V_2$ to a 1 kHz speech source at a distance of 0.1 m, under an embodiment. The null is at 0 degrees, where the speech is normally located.
Figure 20:
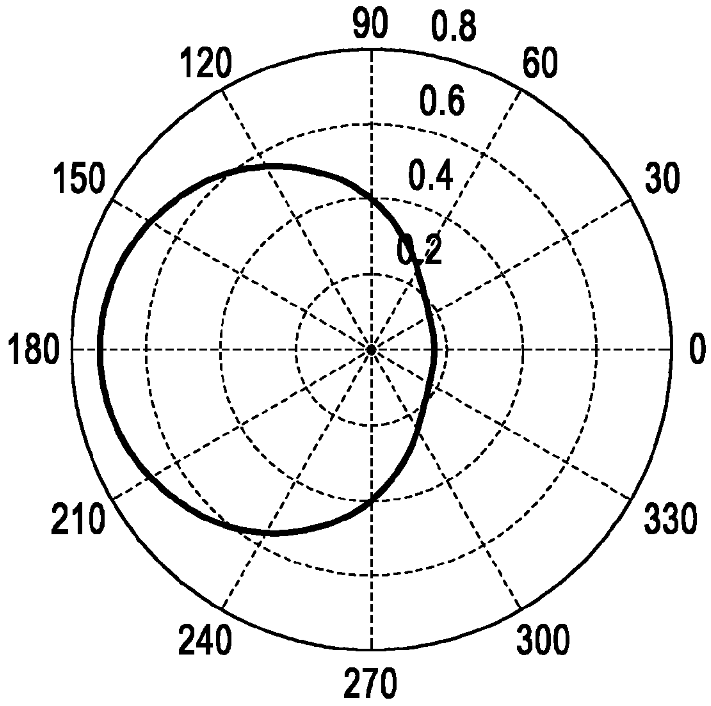
FIG. 20 is a plot of linear response of virtual microphone $V_2$ to a 1 kHz noise source at a distance of 1.0 m, under an embodiment. There is no null and all noise sources are detected.

FIG. 19 is a plot of linear response of virtual microphone $V_2$ with $\beta$=0.8 to a 1 kHz speech source at a distance of 0.1 m, under an embodiment. The null in the linear response of virtual microphone $V_2$ to speech is located at 0 degrees, where the speech is typically expected to be located. FIG. 20 is a plot of linear response of virtual microphone $V_2$ with $\beta$=0.8 to a 1 kHz noise source at a distance of 1.0 m, under an embodiment. The linear response of $V_2$ to noise is devoid of or includes no null, meaning all noise sources are detected.

The above formulation for $V_2(z)$ has a null at the speech location and will therefore exhibit minimal response to the speech. This is shown in FIG. 19 for an array with $d_0$=10.7 mm and a speech source on the axis of the array ($\theta$=0) at 10 cm ($\beta$=0.8). Note that the speech null at zero degrees is not present for noise in the far field for the same microphone, as shown in FIG. 20 with a noise source distance of approximately 1 meter. This insures that noise in front of the user will be detected so that it can be removed. This differs from conventional systems that can have difficulty removing noise in the direction of the mouth of the user.

The $V_1(z)$ can be formulated using the general form for $V_1(z)$:

$$V_1(z)=\alpha_A O_1(z)\cdot z^{-d_A}-\alpha_B O_2(z)\cdot z^{-d_B}$$

Since $$V_2(z)=O_2(z)-z^{-\gamma}\beta O_1(z)$$

and, since for noise in the forward direction $$O_{2N}(z)=O_{1N}(z)\cdot z^{-\gamma},$$

then $$V_{2N}(z)=O_{1N}(z)\cdot z^{-\gamma}-z^{-\gamma}\beta O_{1N}(z)$$

$$V_{2N}(z)=(1-\beta)(O_{1N}(z)\cdot z^{-\gamma})$$

If this is then set equal to $V_1(z)$ above, the result is $$V_{1N}(z)=\alpha_A O_{1N}(z)\cdot z^{-d_A}-\alpha_B O_{1N}(z)\cdot z^{-\gamma}\cdot z^{-d_B}=(1-\beta)(O_{1N}(z)\cdot z^{-\gamma})$$

thus we may set $$d_A=\gamma$$

$$d_B=0$$

$$\alpha_A=1$$

$$\alpha_B=\beta$$

to get $$V_1(z)=O_1(z)\cdot z^{-\gamma}-\beta O_2(z)$$

The definitions for $V_1$ and $V_2$ above mean that for noise $H_1(z)$ is:

$$H_1(z) = \frac{V_1(z)}{V_2(z)} = \frac{-\beta O_2(z) + O_1(z)\cdot z^{-\gamma}}{O_2(z) - z^{-\gamma}\beta O_1(z)}$$

which, if the amplitude noise responses are about the same, has the form of an allpass filter. This has the advantage of being easily and accurately modeled, especially in magnitude response, satisfying R2.

This formulation assures that the noise response will be as similar as possible and that the speech response will be proportional to $(1-\beta^2)$. Since $\beta$ is the ratio of the distances from $O_1$ and $O_2$ to the speech source, it is affected by the size of the array and the distance from the array to the speech source.

Figure 21:
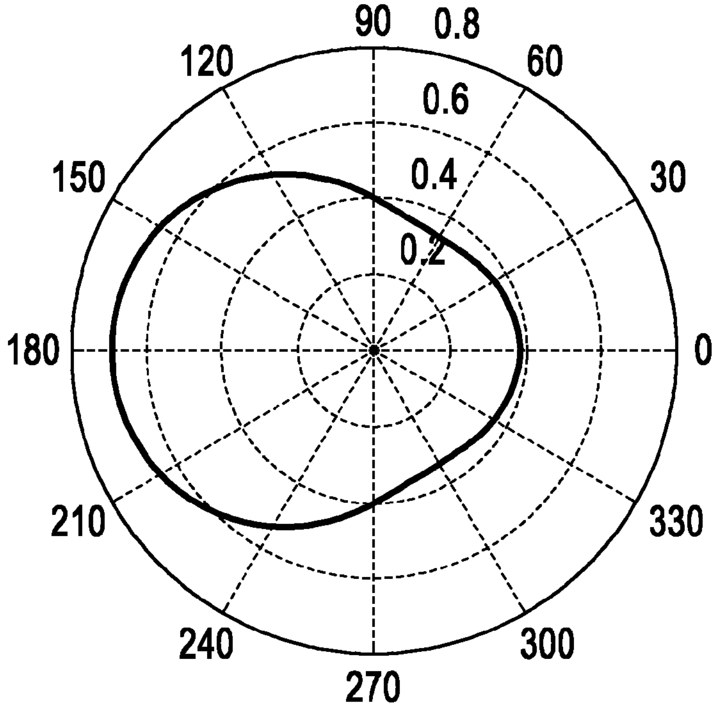
FIG. 21 is a plot of linear response of virtual microphone $V_1$ to a 1 kHz speech source at a distance of 0.1 m, under an embodiment. There is no null and the response for speech is greater than that shown in FIG. 19.

FIG. 21 is a plot of linear response of virtual microphone $V_1$ with $\beta$=0.8 to a 1 kHz speech source at a distance of 0.1 m, under an embodiment. The linear response of virtual microphone $V_1$ to speech is devoid of or includes no null and the response for speech is greater than that shown in FIG. 14.

Figure 22:
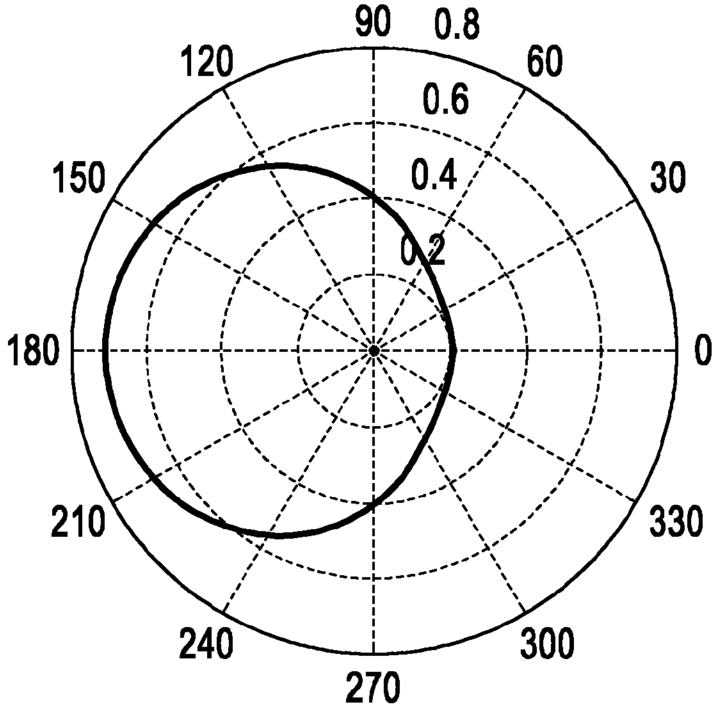
FIG. 22 is a plot of linear response of virtual microphone $V_1$ to a 1 kHz noise source at a distance of 1.0 m, under an embodiment. There is no null and the response is very similar to $V_2$ shown in FIG. 20.

FIG. 22 is a plot of linear response of virtual microphone $V_1$ with $\beta$=0.8 to a 1 kHz noise source at a distance of 1.0 m, under an embodiment. The linear response of virtual microphone $V_1$ to noise is devoid of or includes no null and the response is very similar to $V_2$ shown in FIG. 15.

Figure 23:
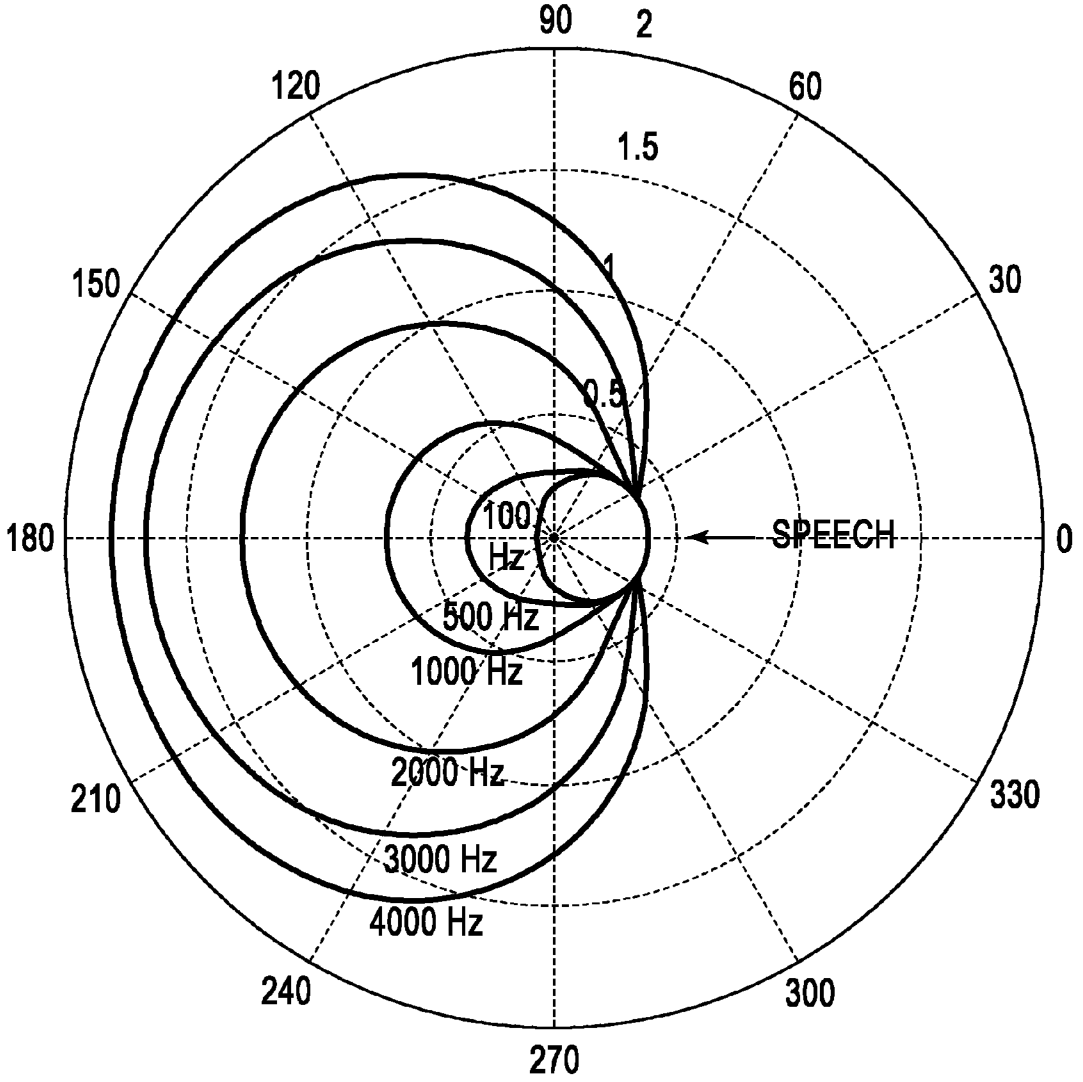
FIG. 23 is a plot of linear response of virtual microphone $V_1$ to a speech source at a distance of 0.1 m for frequencies of 100, 500, 1000, 2000, 3000, and 4000 Hz, under an embodiment.
Figure 24:
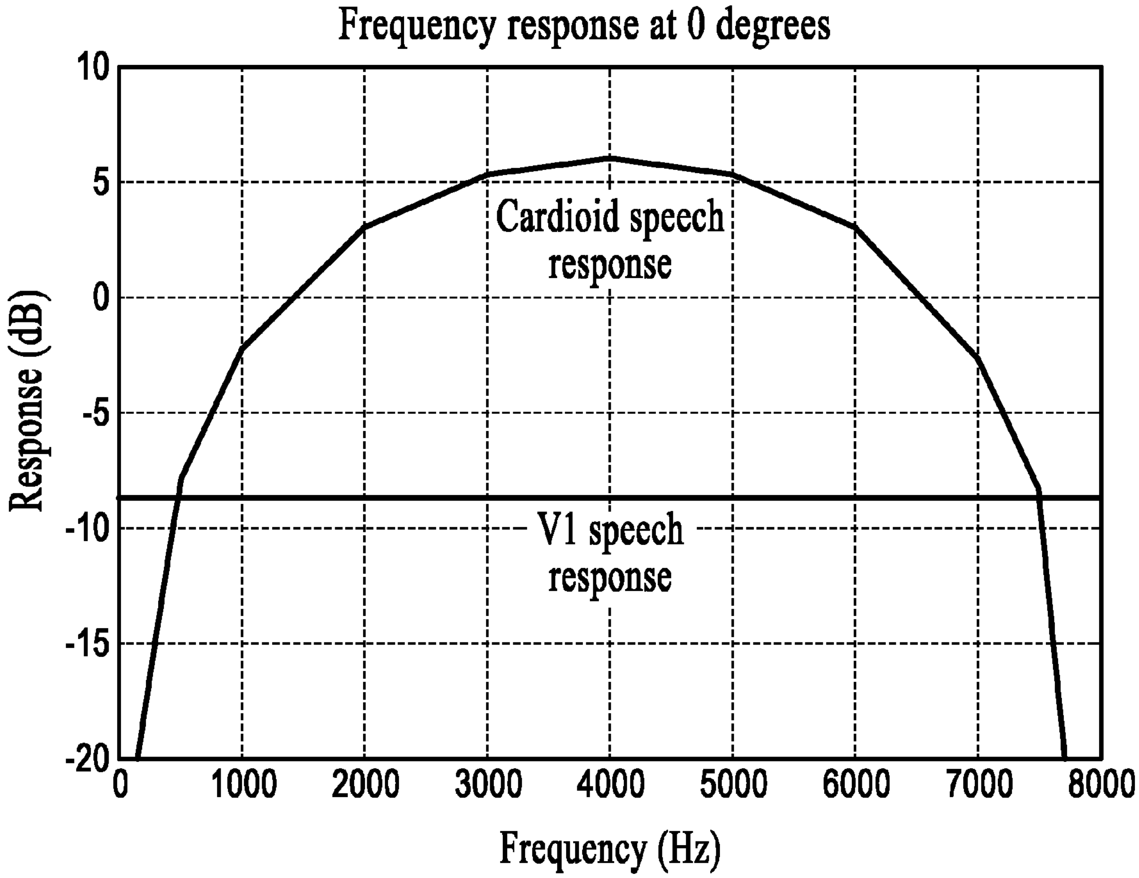
FIG. 24 is a plot showing comparison of frequency responses for speech for the array of an embodiment and for a conventional cardioid microphone.

FIG. 23 is a plot of linear response of virtual microphone $V_1$ with $\beta$=0.8 to a speech source at a distance of 0.1 m for frequencies of 100, 500, 1000, 2000, 3000, and 4000 Hz, under an embodiment. FIG. 24 is a plot showing comparison of frequency responses for speech for the array of an embodiment and for a conventional cardioid microphone.

The response of $V_1$ to speech is shown in FIG. 21, and the response to noise in FIG. 22. Note the difference in speech response compared to $V_2$ shown in FIG. 19 and the similarity of noise response shown in FIG. 20. Also note that the orientation of the speech response for $V_1$ shown in FIG. 21 is completely opposite the orientation of conventional systems, where the main lobe of response is normally oriented toward the speech source. The orientation of an embodiment, in which the main lobe of the speech response of $V_1$ is oriented away from the speech source, means that the speech sensitivity of $V_1$ is lower than a normal directional microphone but is flat for all frequencies within approximately +-30 degrees of the axis of the array, as shown in FIG. 23. This flatness of response for speech means that no shaping postfilter is needed to restore omnidirectional frequency response. This does come at a price—as shown in FIG. 24, which shows the speech response of $V_1$ with $\beta$=0.8 and the speech response of a cardioid microphone. The speech response of $V_1$ is approximately 0 to ~13 dB less than a normal directional microphone between approximately 500 and 7500 Hz and approximately 0 to 10+ dB greater than a directional microphone below approximately 500 Hz and above 7500 Hz for a sampling frequency of approximately 16000 Hz. However, the superior noise suppression made possible using this system more than compensates for the initially poorer SNR.

It should be noted that FIGS. 19-22 assume the speech is located at approximately 0 degrees and approximately 10 cm, $\beta$=0.8, and the noise at all angles is located approximately 1.0 meter away from the midpoint of the array. Generally, the noise distance is not required to be 1 m or more, but the denoising is the best for those distances. For distances less than approximately 1 m, denoising will not be as effective due to the greater dissimilarity in the noise responses of $V_1$ and $V_2$. This has not proven to be an impediment in practical use—in fact, it can be seen as a feature. Any "noise" source that is ~10 cm away from the earpiece is likely to be desired to be captured and transmitted.

The speech null of $V_2$ means that the VAD signal is no longer a critical component. The VAD's purpose was to ensure that the system would not train on speech and then subsequently remove it, resulting in speech distortion. If, however, $V_2$ contains no speech, the adaptive system cannot train on the speech and cannot remove it. As a result, the system can denoise all the time without fear of devoicing, and the resulting clean audio can then be used to generate a VAD signal for use in subsequent single-channel noise suppression algorithms such as spectral subtraction. In addition, constraints on the absolute value of $H_1(z)$ (i.e. restricting it to absolute values less than two) can keep the system from fully training on speech even if it is detected. In reality, though, speech can be present due to a mis-located $V_2$ null and/or echoes or other phenomena, and a VAD sensor or other acoustic-only VAD is recommended to minimize speech distortion.

Depending on the application, $\beta$ and $\gamma$ may be fixed in the noise suppression algorithm or they can be estimated when the algorithm indicates that speech production is taking place in the presence of little or no noise. In either case, there may be an error in the estimate of the actual $\beta$ and $\gamma$ of the system. The following description examines these errors and their effect on the performance of the system. As above, "good performance" of the system indicates that there is sufficient denoising and minimal devoicing.

The effect of an incorrect $\beta$ and $\gamma$ on the response of $V_1$ and $V_2$ can be seen by examining the definitions above:

$$V_1(z) \leqq O_1(z) \cdot z^{-\gamma_T} - \beta_T O_2(z)$$

$$V_2(z) = O_2(z) - z^{-\gamma_T} \beta_T O_1(z)$$

where $\beta_T$ and $\gamma_T$ denote the theoretical estimates of $\beta$ and $\gamma$ used in the noise suppression algorithm. In reality, the speech response of $O_2$ is $$O_{2S}(z) = \beta_R O_{1S}(z) \cdot z^{-\gamma_R}$$

where $\beta_R$ and $\gamma_R$ denote the real $\beta$ and $\gamma$ of the physical system. The differences between the theoretical and actual values of $\beta$ and $\gamma$ can be due to mis-location of the speech source (it is not where it is assumed to be) and/or a change in air temperature (which changes the speed of sound). Inserting the actual response of $O_2$ for speech into the above equations for $V_1$ and $V_2$ yields $$V_{1S}(z) = O_{1S}(z)\left[z^{-\gamma_T} - \beta_T \beta_R z^{-\gamma_R}\right]$$

$$V_{2S}(z) = O_{1S}(z)\left[\beta_R z^{-\beta_R} - \beta_T z^{-\gamma_T}\right]$$

If the difference in phase is represented by $$\gamma_R = \gamma_T + \gamma_D$$

And the difference in amplitude as $$\beta_R = B\beta_T$$

then $$V_{1S}(z) = O_{1S}(z) z^{-\beta_T}\left[1 - B\beta_T^2 z^{-\gamma_D}\right]$$

$$V_{2S}(z) = \beta_T O_{1S}(z) z^{-\beta_T}\left[B z^{-\gamma_D} - 1\right]. \quad \text{Eq. 5}$$

Figure 25:
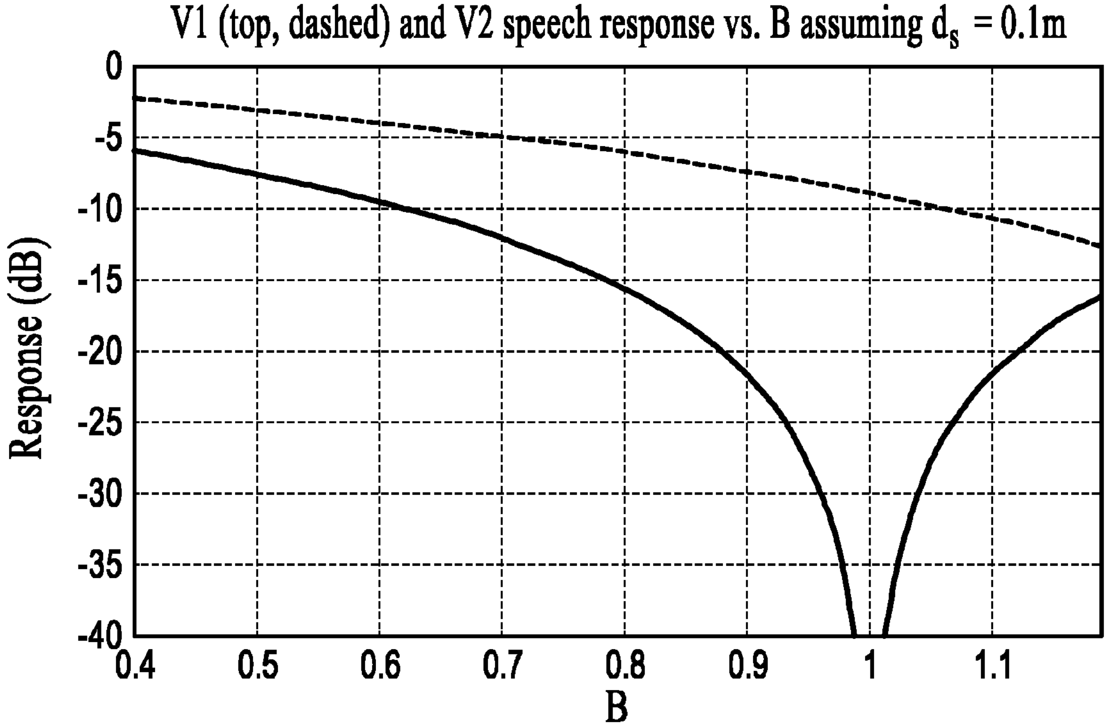
FIG. 25 is a plot showing speech response for $V_1$ (top, dashed) and $V_2$ (bottom, solid) versus B with $d_5$ assumed to be 0.1 m, under an embodiment. The spatial null in $V_2$ is relatively broad.
Figure 26:
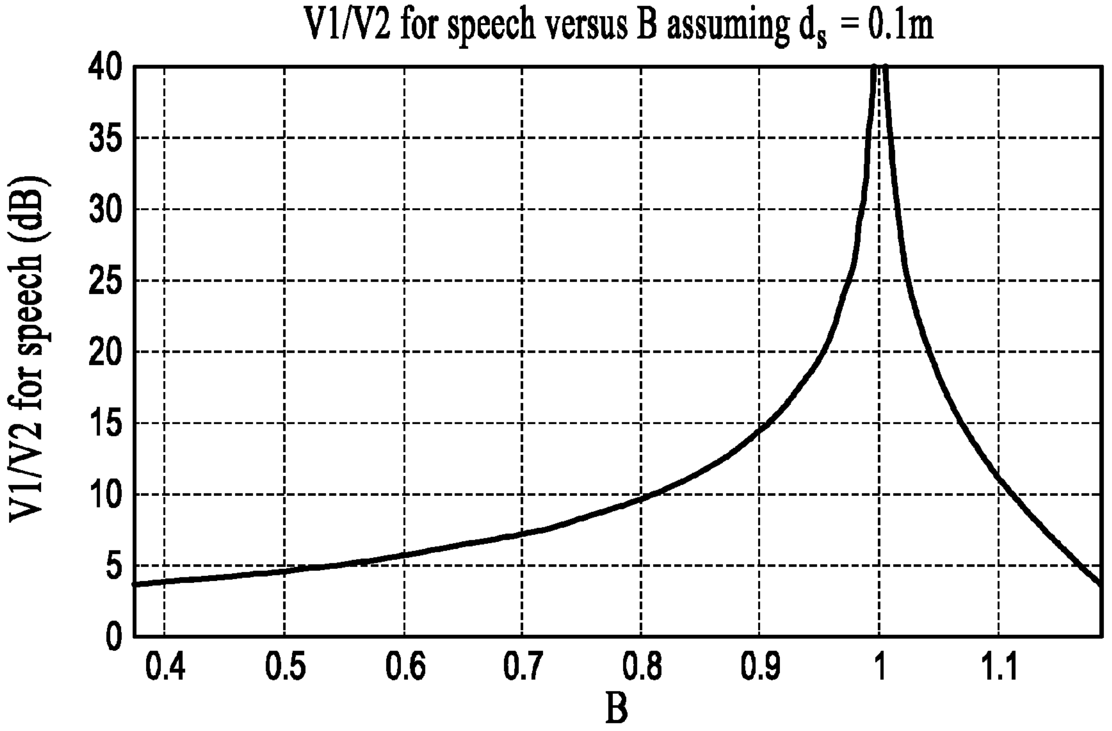
FIG. 26 is a plot showing a ratio of $V_1/V_2$ speech responses shown in FIG. 10 versus B, under an embodiment. The ratio is above 10 dB for all 0.8<B<1.1. This means that the physical β of the system need not be exactly modeled for good performance.
Figure 27:
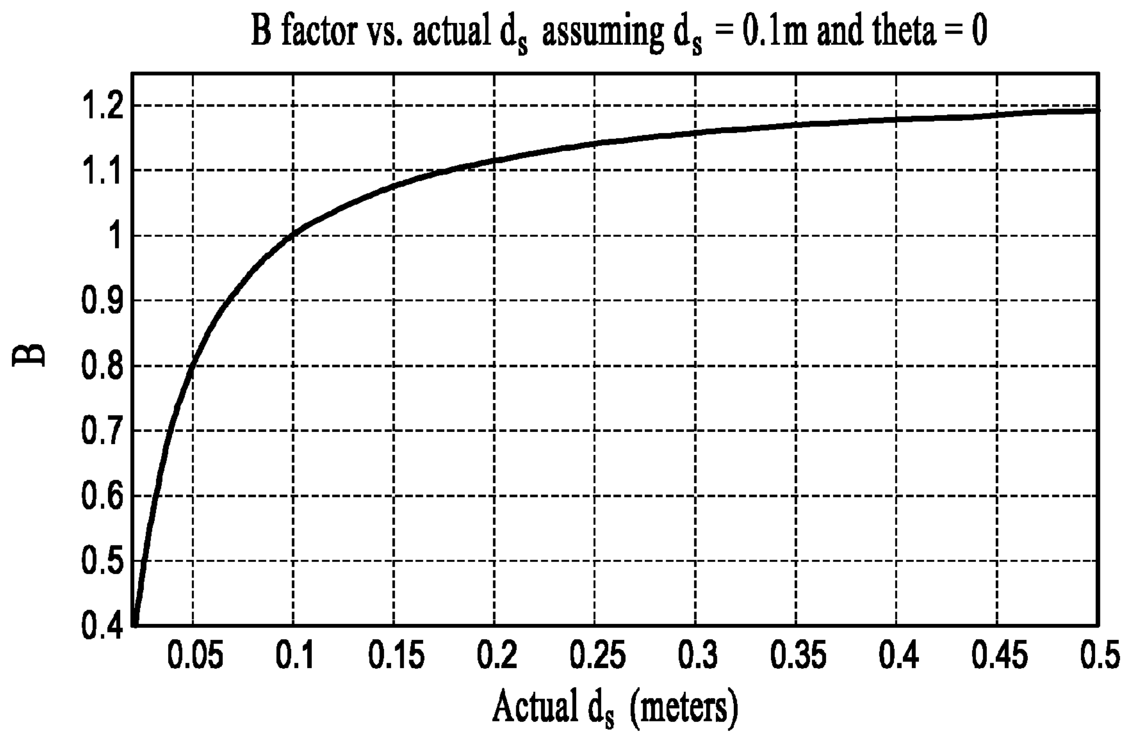
FIG. 27 is a plot of B versus actual $d_s$ assuming that $d_s$=10 cm and theta=0, under an embodiment.
Figure 28:
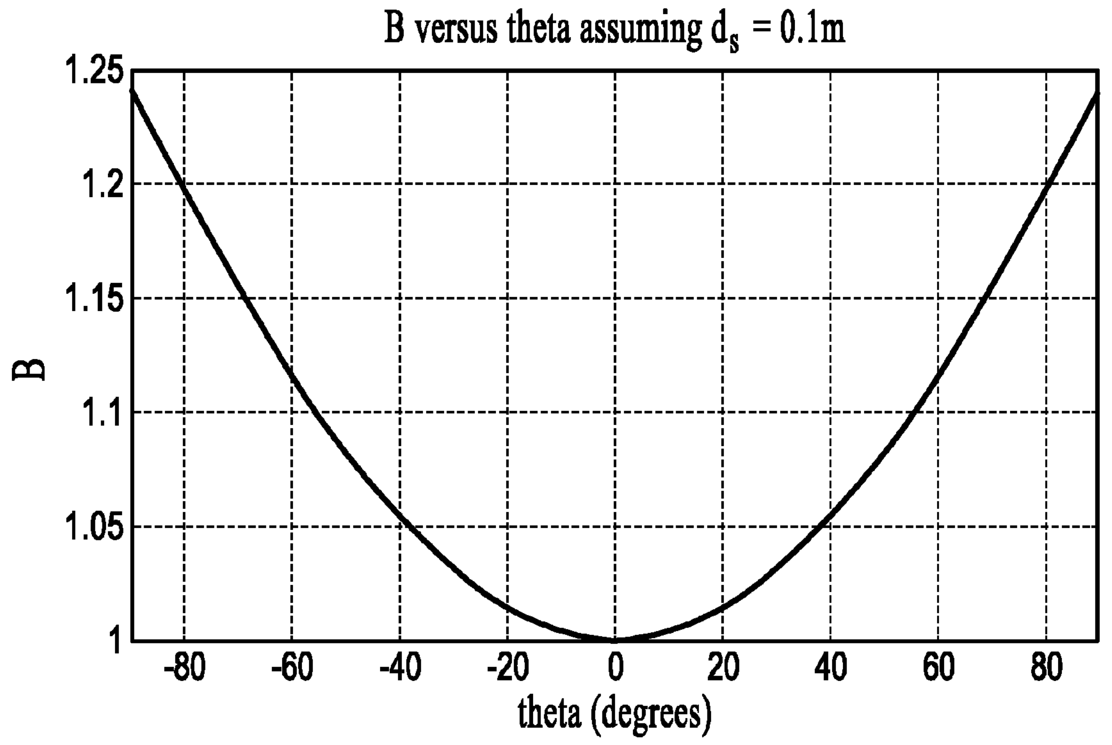
FIG. 28 is a plot of B versus theta with $d_s$=10 cm and assuming $d_s$=10 cm, under an embodiment.

The speech cancellation in $V_2$ (which directly affects the degree of devoicing) and the speech response of $V_1$ will be dependent on both B and D. An examination of the case where D=0 follows. FIG. 25 is a plot showing speech response for $V_1$ (top, dashed) and $V_2$ (bottom, solid) versus B with $d_s$ assumed to be 0.1 m, under an embodiment. This plot shows the spatial null in $V_2$ to be relatively broad. FIG. 26 is a plot showing a ratio of $V_1/V_2$ speech responses shown in FIG. 20 versus B, under an embodiment. The ratio of $V_1/V_2$ is above 10 dB for all 0.8<B<1.1, and this means that the physical $\beta$ of the system need not be exactly modeled for good performance. FIG. 27 is a plot of B versus actual $d_s$ assuming that $d_s$=10 cm and theta=0, under an embodiment. FIG. 28 is a plot of B versus theta with $d_s$=10 cm and assuming $d_s$=10 cm, under an embodiment.

In FIG. 25, the speech response for $V_1$ (upper, dashed) and $V_2$ (lower, solid) compared to $O_1$ is shown versus B when $d_s$ is thought to be approximately 10 cm and $\theta$=0. When B=1, the speech is absent from $V_2$. In FIG. 26, the ratio of the speech responses in FIG. 20 is shown. When 0.8<B<1.1, the $V_1/V_2$ ratio is above approximately 10 dB—enough for good performance. Clearly, if D=0, B can vary significantly without adversely affecting the performance of the system. Again, this assumes that calibration of the microphones so that both their amplitude and phase response is the same for an identical source has been performed.

The B factor can be non-unity for a variety of reasons. Either the distance to the speech source or the relative orientation of the array axis and the speech source or both can be different than expected. If both distance and angle mismatches are included for B, then $$B = \frac{\beta_R}{\beta_T} \frac{\sqrt{d_{SR}^2 - 2d_{SR}d_0\cos(\theta_R) + d_0^2}}{\sqrt{d_{SR}^2 + 2d_{SR}d_0\cos(\theta_R) + d_0^2}} \cdot \frac{\sqrt{d_{SR}^2 + 2d_{ST}d_0\cos(\theta_T) + d_0^2}}{\sqrt{d_{ST}^2 - 2d_{ST}d_0\cos(\theta_T) + d_0^2}}$$

where again the T subscripts indicate the theorized values and R the actual values. In FIG. 27, the factor B is plotted with respect to the actual $d_s$ with the assumption that $d_s$=10 cm and $\theta$=0. So, if the speech source in on-axis of the array, the actual distance can vary from approximately 5 cm to 18 cm without significantly affecting performance—a significant amount. Similarly, FIG. 28 shows what happens if the speech source is located at a distance of approximately 10 cm but not on the axis of the array. In this case, the angle can vary up to approximately +−55 degrees and still result in a B less than 1.1, assuring good performance. This is a significant amount of allowable angular deviation. If there is both angular and distance errors, the equation above may be used to determine if the deviations will result in adequate performance. Of course, if the value for $\beta_T$ is allowed to update during speech, essentially tracking the speech source, then B can be kept near unity for almost all configurations.

An examination follows of the case where B is unity but D is nonzero. This can happen if the speech source is not where it is thought to be or if the speed of sound is different from what it is believed to be. From Equation 5 above, it can be sees that the factor that weakens the speech null in $V_2$ for speech is $$N(z) = Bz^{-\gamma_D} - 1$$

or in the continuous s domain $$N(s)=Be^{-Ds}-1.$$

Figure 29:
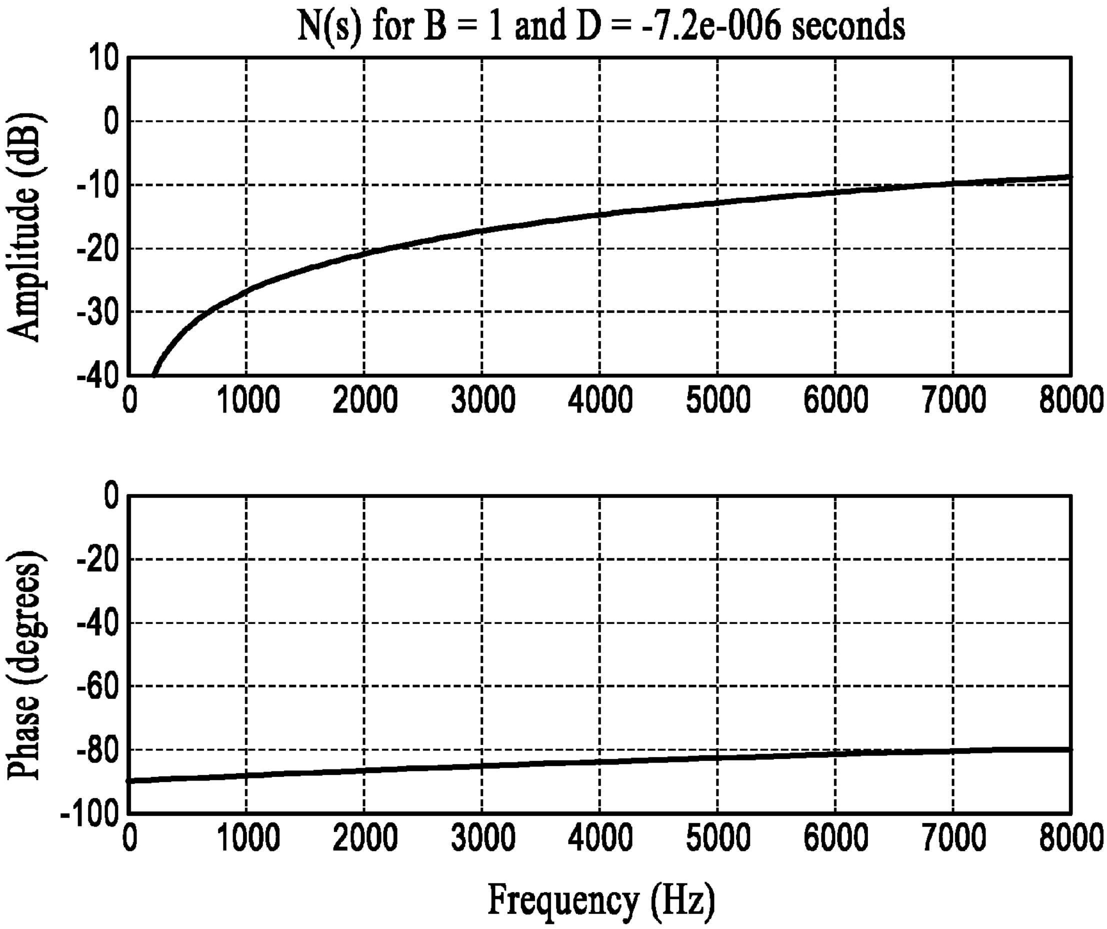
FIG. 29 is a plot of amplitude (top) and phase (bottom) response of N(s) with B=1 and D=−7.2 μsec, under an embodiment. The resulting phase difference clearly affects high frequencies more than low.

Since $\gamma$ is the time difference between arrival of speech at $V_1$ compared to $V_2$, it can be errors in estimation of the angular location of the speech source with respect to the axis of the array and/or by temperature changes. Examining the temperature sensitivity, the speed of sound varies with temperature as $$c=331.3+(0.606T)\text{ m/s}$$

where T is degrees Celsius. As the temperature decreases, the speed of sound also decreases. Setting 20 C as a design temperature and a maximum expected temperature range to −40 C to +60 C (−40 F to 140 F). The design speed of sound at 20 C is 343 m/s and the slowest speed of sound will be 307 m/s at −40 C with the fastest speed of sound 362 m/s at 60 C. Set the array length ($2d_0$) to be 21 mm. For speech sources on the axis of the array, the difference in travel time for the largest change in the speed of sound is $$\nabla t_{MAX}=\frac{d}{c_1}-\frac{d}{c_2}=0.021\text{ m}\left(\frac{1}{343\text{ m/s}}-\frac{1}{307\text{ m/s}}\right)=-7.2\times10^{-6}\text{ sec}$$

or approximately 7 microseconds. The response for N(s) given B=1 and D=7.2 μsec is shown in FIG. 29. FIG. 29 is a plot of amplitude (top) and phase (bottom) response of N(s) with B=1 and D=−7.2 μsec, under an embodiment. The resulting phase difference clearly affects high frequencies more than low. The amplitude response is less than approximately −10 dB for all frequencies less than 7 kHz and is only about −9 dB at 8 kHz. Therefore, assuming B=1, this system would likely perform well at frequencies up to approximately 8 kHz. This means that a properly compensated system would work well even up to 8 kHz in an exceptionally wide (e.g., −40 C to 80 C) temperature range. Note that the phase mismatch due to the delay estimation error causes N(s) to be much larger at high frequencies compared to low.

Figure 30:
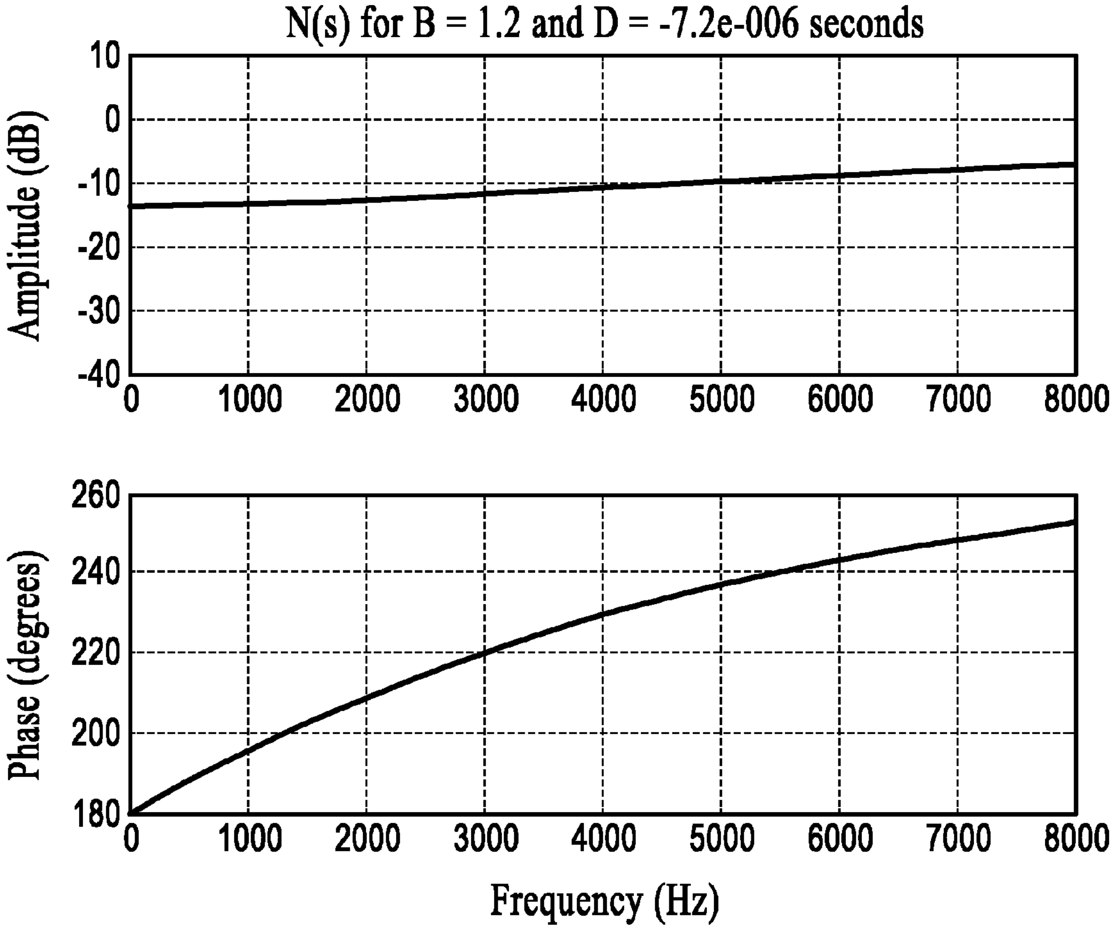
FIG. 30 is a plot of amplitude (top) and phase (bottom) response of N(s) with B=1.2 and D=−7.2 μsec, under an embodiment. Non-unity B affects the entire frequency range.

If B is not unity, the robustness of the system is reduced since the effect from non-unity B is cumulative with that of non-zero D. FIG. 30 shows the amplitude and phase response for B=1.2 and D=7.2 μsec. FIG. 30 is a plot of amplitude (top) and phase (bottom) response of N(s) with B=1.2 and D=−7.2 μsec, under an embodiment. Non-unity B affects the entire frequency range. Now N(s) is below approximately −10 dB only for frequencies less than approximately 5 kHz and the response at low frequencies is much larger. Such a system would still perform well below 5 kHz and would only suffer from slightly elevated devoicing for frequencies above 5 kHz. For ultimate performance, a temperature sensor may be integrated into the system to allow the algorithm to adjust $\gamma_T$ as the temperature varies.

Another way in which D can be non-zero is when the speech source is not where it is believed to be—specifically, the angle from the axis of the array to the speech source is incorrect. The distance to the source may be incorrect as well, but that introduces an error in B, not D.

Referring to FIG. 12, it can be seen that for two speech sources (each with their own $d_s$ and θ) that the time difference between the arrival of the speech at $O_1$ and the arrival at $O_2$ is $$\Delta t=\frac{1}{c}(d_{12}-d_{11}-d_{22}+d_{21})$$

where $$d_{11}=\sqrt{d_{S1}^2-2d_{S1}d_0\cos(\theta_1)+d_0^2}$$

-continued $$d_{12}=\sqrt{d_{S1}^2+2d_{S1}d_0\cos(\theta_1)+d_0^2}$$

$$d_{21}=\sqrt{d_{S2}^2-2d_{S2}d_0\cos(\theta_2)+d_0^2}$$

$$d_{22}=\sqrt{d_{S2}^2+2d_{S2}d_0\cos(\theta_2)+d_0^2}$$

Figure 31:
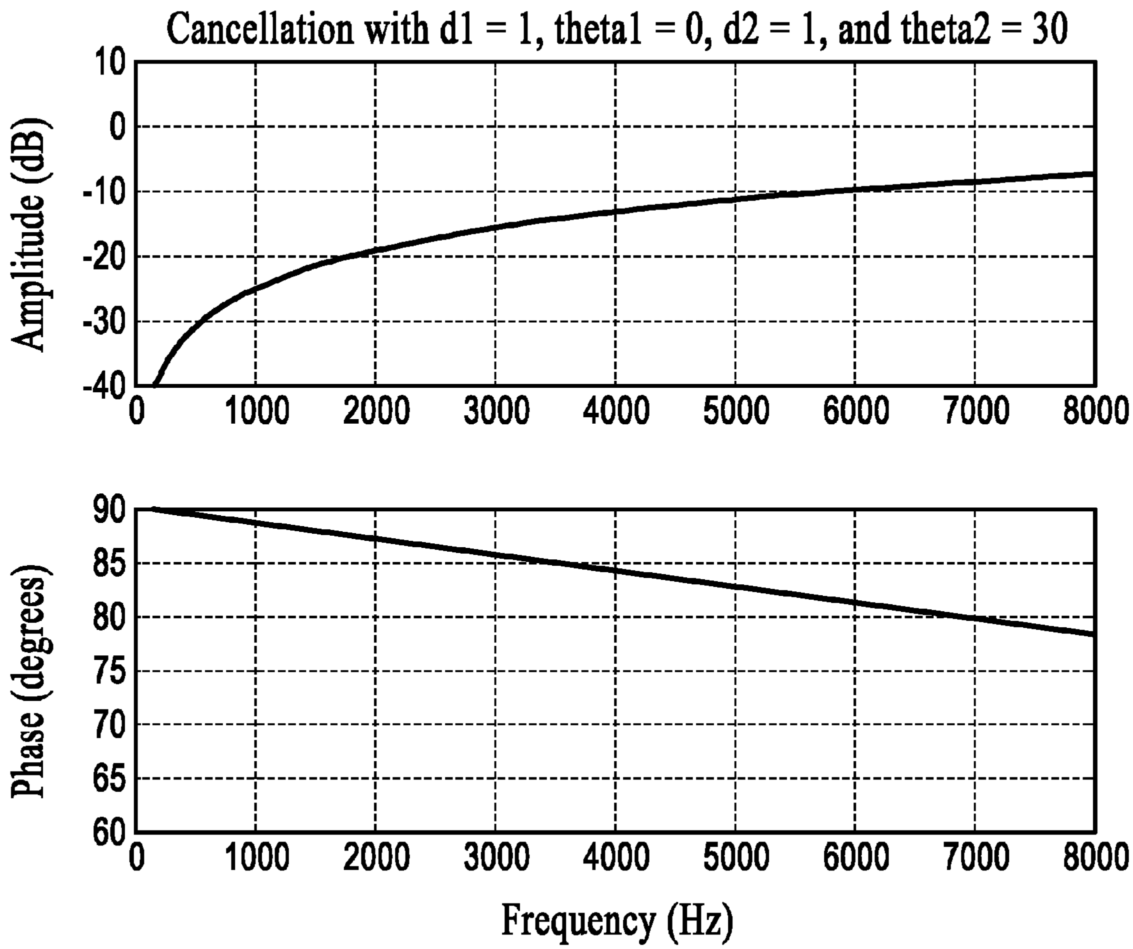
FIG. 31 is a plot of amplitude (top) and phase (bottom) response of the effect on the speech cancellation in $V_2$ due to a mistake in the location of the speech source with q1=0 degrees and q2=30 degrees, under an embodiment. The cancellation remains below −10 dB for frequencies below 6 kHz.
Figure 32:
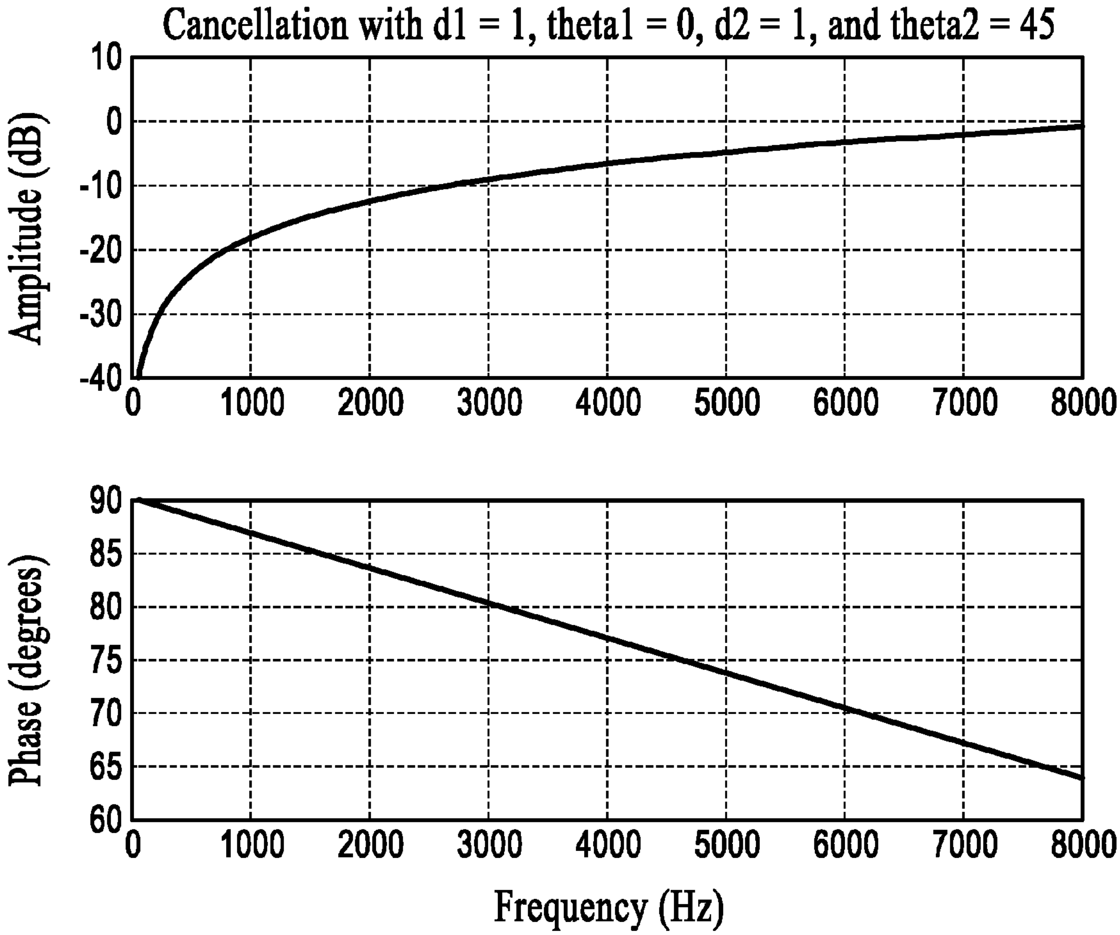
FIG. 32 is a plot of amplitude (top) and phase (bottom) response of the effect on the speech cancellation in $V_2$ due to a mistake in the location of the speech source with q1=0 degrees and q2=45 degrees, under an embodiment. The cancellation is below −10 dB only for frequencies below about 2.8 kHz and a reduction in performance is expected.

The $V_2$ speech cancellation response for $\theta_1$=0 degrees and $\theta_2$=30 degrees and assuming that B=1 is shown in FIG. 31. FIG. 31 is a plot of amplitude (top) and phase (bottom) response of the effect on the speech cancellation in $V_2$ due to a mistake in the location of the speech source with q1=0 degrees and q2=30 degrees, under an embodiment. Note that the cancellation is still below −10 dB for frequencies below 6 kHz. The cancellation is still below approximately −10 dB for frequencies below approximately 6 kHz, so an error of this type will not significantly affect the performance of the system. However, if $\theta_2$ is increased to approximately 45 degrees, as shown in FIG. 32, the cancellation is below approximately −10 dB only for frequencies below approximately 2.8 kHz. FIG. 32 is a plot of amplitude (top) and phase (bottom) response of the effect on the speech cancellation in $V_2$ due to a mistake in the location of the speech source with q1=0 degrees and q2=45 degrees, under an embodiment. Now the cancellation is below −10 dB only for frequencies below about 2.8 kHz and a reduction in performance is expected. The poor $V_2$ speech cancellation above approximately 4 kHz may result in significant devoicing for those frequencies.

The description above has assumed that the microphones $O_1$ and $O_2$ were calibrated so that their response to a source located the same distance away was identical for both amplitude and phase. This is not always feasible, so a more practical calibration procedure is presented below. It is not as accurate, but is much simpler to implement. Begin by defining a filter α(z) such that:

$$0_{1C}(z)=\alpha(z)0_{2C}(z)$$

where the "C" subscript indicates the use of a known calibration source. The simplest one to use is the speech of the user. Then $$O_{1S}(z)=\alpha(z)0_{2C}(z)$$

The microphone definitions are now:

$$V_1(z)=O_1(z)\cdot z^{-\gamma}-\beta(z)\alpha(z)O_2(z)$$

$$V_2(z)=\alpha(z)O_2(z)-z^{-\gamma}\beta(z)O_1(z)$$

The β of the system should be fixed and as close to the real value as possible. In practice, the system is not sensitive to changes in β and errors of approximately +−5% are easily tolerated. During times when the user is producing speech but there is little or no noise, the system can train α(z) to remove as much speech as possible. This is accomplished by:

1. Construct an adaptive system as shown in FIG. 11 with $\beta O_{1S}(z)z^{-\gamma}$ in the "MIC1" position, $O_{2S}(z)$ in the "MIC2" position, and α(z) in the $H_1(z)$ position.
2. During speech, adapt a(z) to minimize the residual of the system.
3. Construct $V_1(z)$ and $V_2(z)$ as above.

A simple adaptive filter can be used for α(z) so that only the relationship between the microphones is well modeled. The system of an embodiment trains only when speech is being produced by the user. A sensor like the SSM is invaluable in determining when speech is being produced in the absence of noise. If the speech source is fixed in position and will not vary significantly during use (such as when the array is on an earpiece), the adaptation should be infrequent and slow to update in order to minimize any errors introduced by noise present during training.

The above formulation works very well because the noise (far-field) responses of $V_1$ and $V_2$ are very similar while the speech (near-field) responses are very different. However, the formulations for $V_1$ and $V_2$ can be varied and still result in good performance of the system as a whole. If the definitions for $V_1$ and $V_2$ are taken from above and new variables B1 and B2 are inserted, the result is:

$$V_1(z)=O_1(z)\cdot z^{-\gamma T}-B\beta_T O_2(z)$$

$$V_2(z)=O_2(z)-z^{-\gamma T}B_2\beta_T O_1(z)$$

where B1 and B2 are both positive numbers or zero. If B1 and B2 are set equal to unity, the optimal system results as described above. If B1 is allowed to vary from unity, the response of $V_1$ is affected. An examination of the case where B2 is left at 1 and B1 is decreased follows. As B1 drops to approximately zero, $V_1$ becomes less and less directional, until it becomes a simple omnidirectional microphone when B1=0. Since B2=1, a speech null remains in $V_2$, so very different speech responses remain for $V_1$ and $V_2$. However, the noise responses are much less similar, so denoising will not be as effective. Practically, though, the system still performs well. B1 can also be increased from unity and once again the system will still denoise well, just not as well as with B1=1.

If B2 is allowed to vary, the speech null in $V_2$ is affected. As long as the speech null is still sufficiently deep, the system will still perform well. Practically values down to approximately B2=0.6 have shown sufficient performance, but it is recommended to set B2 close to unity for optimal performance.

Similarly, variables $\in$ and $\Delta$ may be introduced so that:

$$V_1(z)=(\in-\beta)O_{2N}(z)+(1+\Delta)O_{1N}(z)z^{-\gamma}$$

$$V_2(z)=(1+\Delta)O_{2N}(z)+(\in-\beta)O_{1N}(z)z^{-\gamma}$$

This formulation also allows the virtual microphone responses to be varied but retains the all-pass characteristic of $H_1(z)$.

In conclusion, the system is flexible enough to operate well at a variety of B1 values, but B2 values should be close to unity to limit devoicing for best performance.

Figure 33:
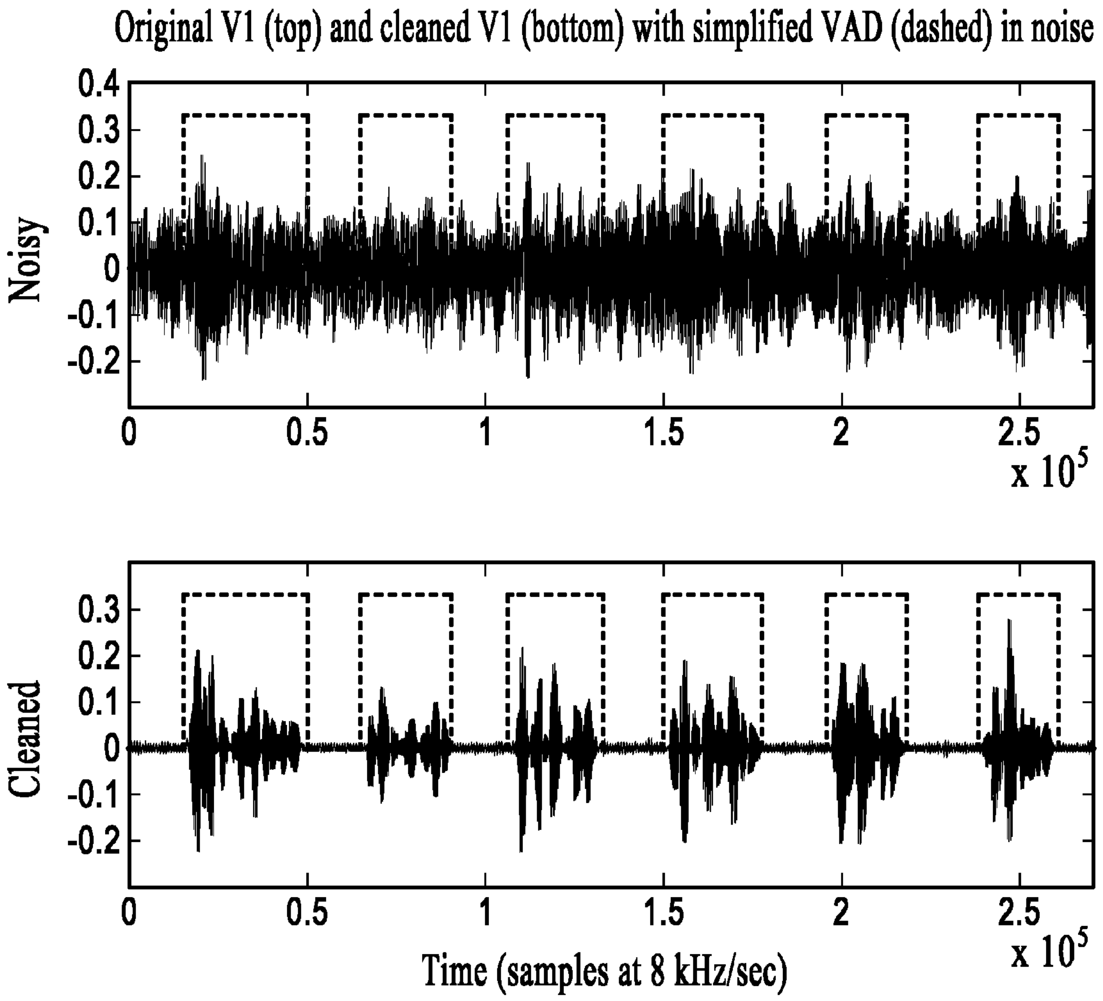
FIG. 33 shows experimental results for a $2d_0$=19 mm array using a linear β of 0.83 on a Bruel and Kjaer Head and Torso Simulator (HATS) in very loud (~85 dBA) music/speech noise environment, under an embodiment. The noise has been reduced by about 25 dB and the speech hardly affected, with no noticeable distortion.

Experimental results for a $2d_0$=19 mm array using a linear $\beta$ of 0.83 and B=B2=1 on a Bruel and Kjaer Head and Torso Simulator (HATS) in very loud (~85 dBA) music/speech noise environment are shown in FIG. 33. The alternate microphone calibration technique discussed above was used to calibrate the microphones. The noise has been reduced by about 25 dB and the speech hardly affected, with no noticeable distortion. Clearly the technique significantly increases the SNR of the original speech, far outperforming conventional noise suppression techniques.

The DOMA can be a component of a single system, multiple systems, and/or geographically separate systems. The DOMA can also be a subcomponent or subsystem of a single system, multiple systems, and/or geographically separate systems. The DOMA can be coupled to one or more other components (not shown) of a host system or a system coupled to the host system.

One or more components of the DOMA and/or a corresponding system or application to which the DOMA is coupled or connected includes and/or runs under and/or in association with a processing system. The processing system includes any collection of processor-based devices or computing devices operating together, or components of processing systems or devices, as is known in the art. For example, the processing system can include one or more of a portable computer, portable communication device operating in a communication network, and/or a network server. The portable computer can be any of a number and/or combination of devices selected from among personal computers, cellular telephones, personal digital assistants, portable computing devices, and portable communication devices, but is not so limited. The processing system can include components within a larger computer system.

Acoustic Voice Activity Detection (AVAD) for Electronic Systems

Acoustic Voice Activity Detection (AVAD) methods and systems are described herein. The AVAD methods and systems, which include algorithms or programs, use microphones to generate virtual directional microphones which have very similar noise responses and very dissimilar speech responses. The ratio of the energies of the virtual microphones is then calculated over a given window size and the ratio can then be used with a variety of methods to generate a VAD signal. The virtual microphones can be constructed using either a fixed or an adaptive filter. The adaptive filter generally results in a more accurate and noise-robust VAD signal but requires training. In addition, restrictions can be placed on the filter to ensure that it is training only on speech and not on environmental noise.

In the following description, numerous specific details are introduced to provide a thorough understanding of, and enabling description for, embodiments. One skilled in the relevant art, however, will recognize that these embodiments can be practiced without one or more of the specific details, or with other components, systems, etc. In other instances, well-known structures or operations are not shown, or are not described in detail, to avoid obscuring aspects of the disclosed embodiments.

Figure 34:
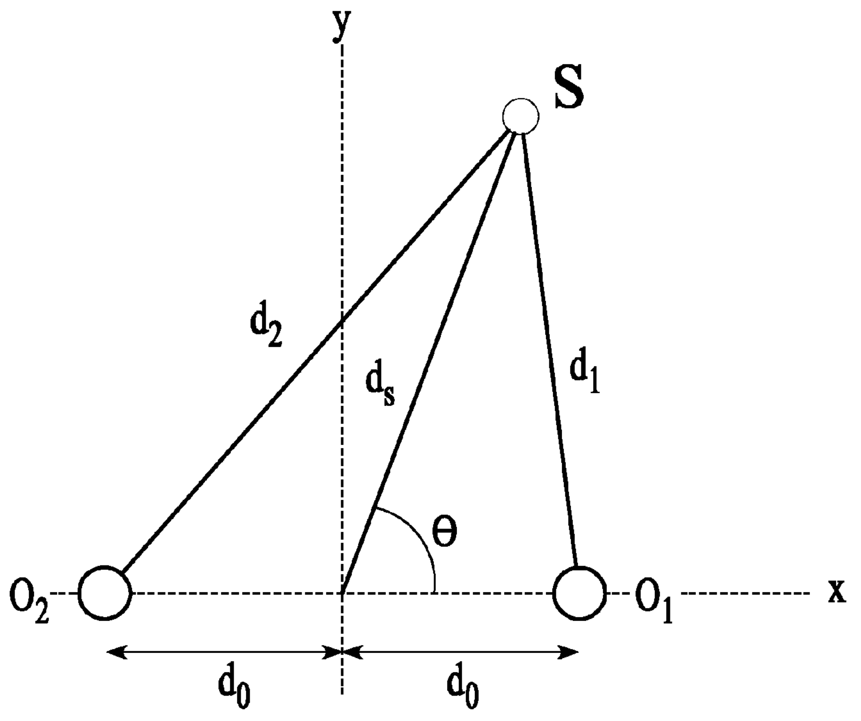
FIG. 34 is a configuration of a two-microphone array with speech source S, under an embodiment.

FIG. 34 is a configuration of a two-microphone array of the AVAD with speech source S, under an embodiment. The AVAD of an embodiment uses two physical microphones ($O_1$ and $O_2$) to form two virtual microphones ($V_1$ and $V_2$). The virtual microphones of an embodiment are directional microphones, but the embodiment is not so limited. The physical microphones of an embodiment include omnidirectional microphones, but the embodiments described herein are not limited to omnidirectional microphones. The virtual microphone (VM) $V_2$ is configured in such a way that it has minimal response to the speech of the user, while $V_1$ is configured so that it does respond to the user's speech but has a very similar noise magnitude response to $V_2$, as described in detail herein. The PSAD VAD methods can then be used to determine when speech is taking place. A further refinement is the use of an adaptive filter to further minimize the speech response of $V_2$, thereby increasing the speech energy ratio used in PSAD and resulting in better overall performance of the AVAD.

The PSAD algorithm as described herein calculates the ratio of the energies of two directional microphones $M_1$ and $M_2$:

$$R=\sum_i\sqrt{\frac{M_1(z_i)^2}{M_2(z_i)^2}}$$

where the "z" indicates the discrete frequency domain and "i" ranges from the beginning of the window of interest to the end, but the same relationship holds in the time domain. The summation can occur over a window of any length; 200 samples at a sampling rate of 8 kHz has been used to good effect. Microphone $M_1$ is assumed to have a greater speech response than microphone $M_2$. The ratio R depends on the relative strength of the acoustic signal of interest as detected by the microphones.

For matched omnidirectional microphones (i.e. they have the same response to acoustic signals for all spatial orientations and frequencies), the size of R can be calculated for speech and noise by approximating the propagation of speech and noise waves as spherically symmetric sources. For these the energy of the propagating wave decreases as $1/r^2$:

$$R = \sum_i \sqrt{\frac{M_1(z_i)^2}{M_2(z_i)^2}} = \frac{d_2}{d_1} = \frac{d_1 + d}{d_1}$$

The distance $d_1$ is the distance from the acoustic source to $M_1$, $d_2$ is the distance from the acoustic source to $M_2$, and $d=d_2-d_1$ (see FIG. 34). It is assumed that $O_1$ is closer to the speech source (the user's mouth) so that d is always positive. If the microphones and the user's mouth are all on a line, then $d=2d_0$, the distance between the microphones. For matched omnidirectional microphones, the magnitude of R, depends only on the relative distance between the microphones and the acoustic source. For noise sources, the distances are typically a meter or more, and for speech sources, the distances are on the order of 10 cm, but the distances are not so limited. Therefore for a 2-cm array typical values of R are:

$$R_S = \frac{d_2}{d_1} \approx \frac{12 \text{ cm}}{10 \text{ cm}} = 1.2$$

$$R_N = \frac{d_2}{d_1} \approx \frac{102 \text{ cm}}{100 \text{ cm}} = 1.02$$

where the "S" subscript denotes the ratio for speech sources and "N" the ratio for noise sources. There is not a significant amount of separation between noise and speech sources in this case, and therefore it would be difficult to implement a robust solution using simple omnidirectional microphones.

A better implementation is to use directional microphones where the second microphone has minimal speech response. As described herein, such microphones can be constructed using omnidirectional microphones $O_1$ and $O_2$:

$$V_1(z) = -\beta(z)\alpha(z)O_2(z) + O_1(z)z^{-\gamma}$$

$$V_2(z) = \alpha(z)O_2(z) - \beta(z)O_1(z)z^{-\gamma} \quad [1]$$

where $\alpha(z)$ is a calibration filter used to compensate $O_2$'s response so that it is the same as $O_1$, $\beta(z)$ is a filter that describes the relationship between $O_1$ and calibrated $O_2$ for speech, and $\gamma$ is a fixed delay that depends on the size of the array. There is no loss of generality in defining $\alpha(z)$ as above, as either microphone may be compensated to match the other. For this configuration $V_1$ and $V_2$ have very similar noise response magnitudes and very dissimilar speech response magnitudes if $$\gamma = \frac{d}{c}$$

where again $d=2d_0$ and c is the speed of sound in air, which is temperature dependent and approximately $$c = 331.3\sqrt{1 + \frac{T}{273.15}}\ \frac{m}{\sec}$$

where T is the temperature of the air in Celsius.

Figure 35:
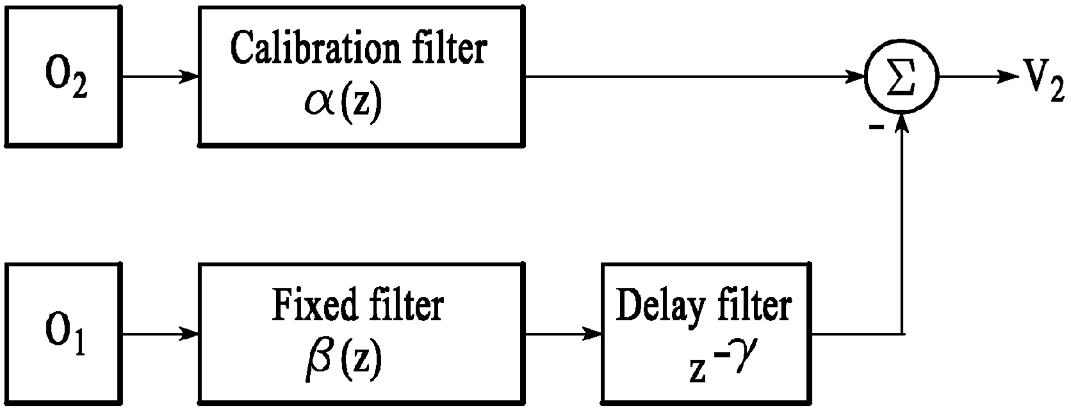
FIG. 35 is a block diagram of $V_2$ construction using a fixed β(z), under an embodiment.

The filter $\beta(z)$ can be calculated using wave theory to be $$\beta(z) = \frac{d_1}{d_2} = \frac{d_1}{d_1 + d} \quad [2]$$

where again $d_k$ is the distance from the user's mouth to $O_k$. FIG. 35 is a block diagram of $V_2$ construction using a fixed $\beta(z)$, under an embodiment. This fixed (or static) $\beta$ works sufficiently well if the calibration filter $\alpha(z)$ is accurate and $d_1$ and $d_2$ are accurate for the user. This fixed-$\beta$ algorithm, however, neglects important effects such as reflection, diffraction, poor array orientation (i.e. the microphones and the mouth of the user are not all on a line), and the possibility of different $d_1$ and $d_2$ values for different users.

Figure 36:
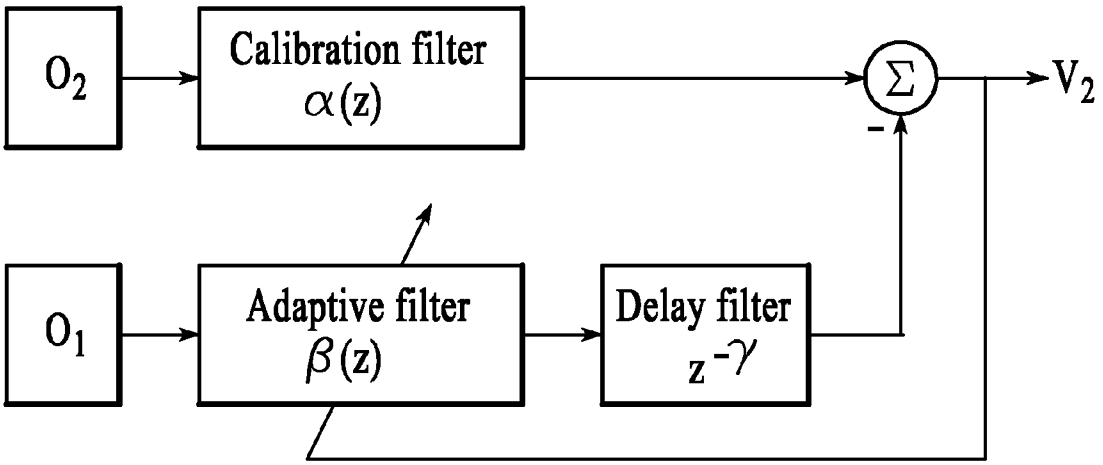
FIG. 36 is a block diagram of $V_2$ construction using an adaptive β(z), under an embodiment.

The filter $\beta(z)$ can also be determined experimentally using an adaptive filter. FIG. 36 is a block diagram of $V_2$ construction using an adaptive $\beta(z)$, under an embodiment, where:

$$\tilde{\beta}(z) = \frac{\alpha(z)O_2(z)}{z^{-\gamma}O_1(z)} \quad [3]$$

The adaptive process varies $\tilde{\beta}(z)$ to minimize the output of $V_2$ when only speech is being received by $O_1$ and $O_2$. A small amount of noise may be tolerated with little ill effect, but it is preferred that only speech is being received when the coefficients of $\tilde{\beta}(z)$ are calculated. Any adaptive process may be used; a normalized least-mean squares (NLMS) algorithm was used in the examples below.

Figure 37:
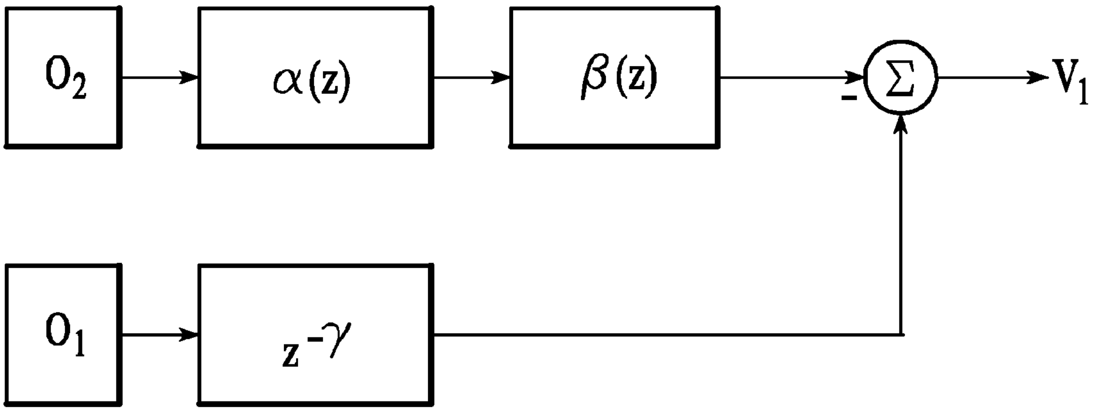
FIG. 37 is a block diagram of $V_1$ construction, under an embodiment.

The $V_1$ can be constructed using the current value for $\tilde{\beta}(z)$ or the fixed filter $\beta(z)$ can be used for simplicity. FIG. 37 is a block diagram of $V_1$ construction, under an embodiment.

Now the ratio R is $$R = \frac{\|V_1(z)\|}{\|V_2(z)\|} = \sqrt{\frac{\left(-\tilde{\beta}(z)\alpha(z)O_2(z) + O_1(z)z^{-\gamma}\right)^2}{\left(\alpha(z)O_2(z) - \tilde{\beta}(z)O_1(z)z^{-\gamma}\right)^2}}$$

where double bar indicates norm and again any size window may be used. If $\tilde{\beta}(z)$ has been accurately calculated, the ratio for speech should be relatively high (e.g., greater than approximately 2) and the ratio for noise should be relatively low (e.g., less than approximately 1.1). The ratio calculated will depend on both the relative energies of the speech and noise as well as the orientation of the noise and the reverberance of the environment. In practice, either the adapted filter $\tilde{\beta}(z)$ or the static filter b(z) may be used for $V_1(z)$ with little effect on R—but it is important to use the adapted filter $\tilde{\beta}(z)$ in $V_2(z)$ for best performance. Many techniques known to those skilled in the art (e.g., smoothing, etc.) can be used to make R more amenable to use in generating a VAD and the embodiments herein are not so limited.

The ratio R can be calculated for the entire frequency band of interest, or can be calculated in frequency subbands. One effective subband discovered was 250 Hz to 1250 Hz, another was 200 Hz to 3000 Hz, but many others are possible and useful.

Once generated, the vector of the ratio R versus time (or the matrix of R versus time if multiple subbands are used) can be used with any detection system (such as one that uses fixed and/or adaptive thresholds) to determine when speech is occurring. While many detection systems and methods are known to exist by those skilled in the art and may be used, the method described herein for generating an R so that the speech is easily discernable is novel. It is important to note that the R does not depend on the type of noise or its orientation or frequency content; R simply depends on the $V_1$ and $V_2$ spatial response similarity for noise and spatial response dissimilarity for speech. In this way it is very robust and can operate smoothly in a variety of noisy acoustic environments.

Figure 38:
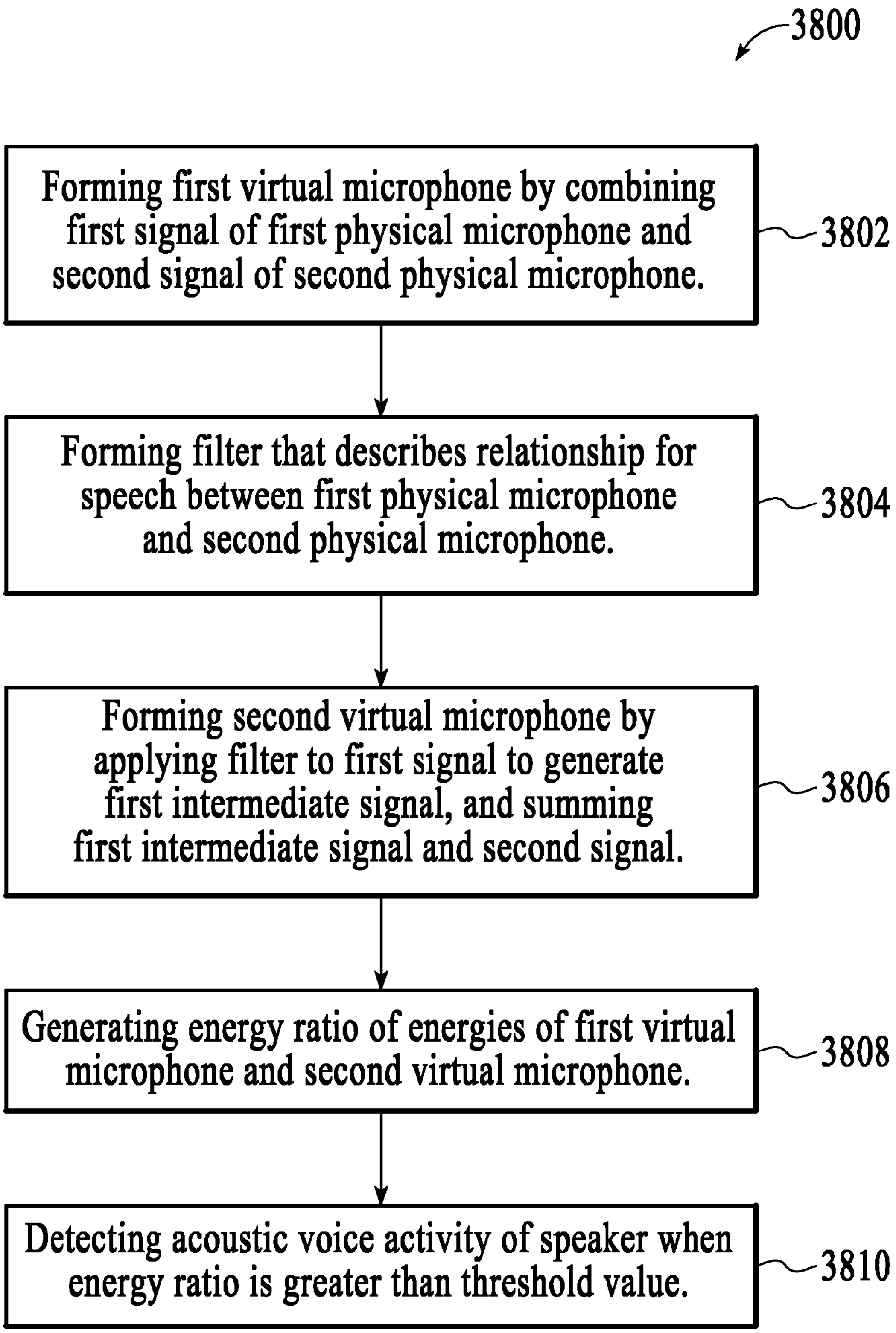
FIG. 38 is a flow diagram of acoustic voice activity detection, under an embodiment.

FIG. 38 is a flow diagram of acoustic voice activity detection 3800, under an embodiment. The detection comprises forming a first virtual microphone by combining a first signal of a first physical microphone and a second signal of a second physical microphone 3802. The detection comprises forming a filter that describes a relationship for speech between the first physical microphone and the second physical microphone 3804. The detection comprises forming a second virtual microphone by applying the filter to the first signal to generate a first intermediate signal, and summing the first intermediate signal and the second signal 3806. The detection comprises generating an energy ratio of energies of the first virtual microphone and the second virtual microphone 3808. The detection comprises detecting acoustic voice activity of a speaker when the energy ratio is greater than a threshold value 3810.

The accuracy of the adaptation to the β(z) of the system is a factor in determining the effectiveness of the AVAD. A more accurate adaptation to the actual β(z) of the system leads to lower energy of the speech response in $V_2$, and a higher ratio R. The noise (far-field) magnitude response is largely unchanged by the adaptation process, so the ratio R will be near unity for accurately adapted beta. For purposes of accuracy, the system can be trained on speech alone, or the noise should be low enough in energy so as not to affect or to have a minimal affect the training.

To make the training as accurate as possible, the coefficients of the filter β(z) of an embodiment are generally updated under the following conditions, but the embodiment is not so limited: speech is being produced (requires a relatively high SNR or other method of detection such as an Aliph Skin Surface Microphone (SSM) as described in U.S. patent application Ser. No. 10/769,302, filed Jan. 30, 2004, which is incorporated by reference herein in its entirety); no wind is detected (wind can be detected using many different methods known in the art, such as examining the microphones for uncorrelated low-frequency noise); and the current value of R is much larger than a smoothed history of R values (this ensures that training occurs only when strong speech is present). These procedures are flexible and others may be used without significantly affecting the performance of the system. These restrictions can make the system relatively more robust.

Even with these precautions, it is possible that the system accidentally trains on noise (e.g., there may be a higher likelihood of this without use of a non-acoustic VAD device such as the SSM used in the Jawbone headset produced by Aliph, San Francisco, Calif.). Thus, an embodiment includes a further failsafe system to preclude accidental training from significantly disrupting the system. The adaptive β is limited to certain values expected for speech. For example, values for $d_1$ for an ear-mounted headset will normally fall between 9 and 14 centimeters, so using an array length of $2d_0$=2.0 cm and Equation 2 above, $$|\beta(z)| = \frac{d_1}{d_2} \approx \frac{d_1}{d_1 + 2d_0}$$

which means that $$0.82 < |\beta(z)| < 0.88.$$

The magnitude of the β filter can therefore be limited to between approximately 0.82 and 0.88 to preclude problems if noise is present during training. Looser limits can be used to compensate for inaccurate calibrations (the response of omnidirectional microphones is usually calibrated to one another so that their frequency response is the same to the same acoustic source—if the calibration is not completely accurate the virtual microphones may not form properly).

Similarly, the phase of the β filter can be limited to be what is expected from a speech source within +−30 degrees from the axis of the array. As described herein, and with reference to FIG. 34, $$\gamma = \frac{d_2 - d_1}{c} \text{ (seconds)}$$

$$d_1 = \sqrt{d_S^2 - 2d_S d_0 \cos(\theta) + d_0^2}$$

$$d_2 = \sqrt{d_S^2 + 2d_S d_0 \cos(\theta) + d_0^2}$$

$d_s$ is the distance from the midpoint of the array to the speech source. Varying $d_s$ from 10 to 15 cm and allowing 0 to vary between 0 and +−30 degrees, the maximum difference in γ results from the difference of γ at 0 degrees (58.8 μsec) and γ at +−30 degrees for $d_s$=10 cm (50.8 μsec). This means that the maximum expected phase difference is 58.8−50.8=8.0 μsec, or 0.064 samples at an 8 kHz sampling rate. Since $$\phi(f) = 2\pi f t = 2\pi f(8.0\times10^{-6}) \text{ rad}$$

the maximum phase difference realized at 4 kHz is only 0.2 rad or about 11.4 degrees, a small amount, but not a negligible one. Therefore the β filter should almost linear phase, but some allowance made for differences in position and angle. In practice a slightly larger amount was used (0.071 samples at 8 kHz) in order to compensate for poor calibration and diffraction effects, and this worked well. The limit on the phase in the example below was implemented as the ratio of the central tap energy to the combined energy of the other taps:

$$\text{phase limit ratio} = \frac{(\text{center tap})^2}{\|\beta\|}$$

where β is the current estimate. This limits the phase by restricting the effects of the non-center taps. Other ways of limiting the phase of the beta filter are known to those skilled in the art and the algorithm presented here is not so limited.

Embodiments are presented herein that use both a fixed β(z) and an adaptive β(z), as described in detail above. In both cases, R was calculated using frequencies between 250 and 3000 Hz using a window size of 200 samples at 8 kHz. The results for $V_1$ (top plot), $V_2$ (middle plot), R (bottom plot, solid line, windowed using a 200 sample rectangular window at 8 kHz) and the VAD (bottom plot, dashed line) are shown in FIGS. 39-44. FIGS. 39-44 demonstrate the use of a fixed beta filter β(z) in conditions of only noise (street and bus noise, approximately 70 dB SPL at the ear), only speech (normalized to 94 dB SPL at the mouth reference point (MRP)), and mixed noise and speech, respectively. A Bruel & Kjaer Head and Torso Simulator (HATS) was used for the tests and the omnidirectional microphones mounted on HATS' ear with the midline of the array approximately 11 cm from the MRP. The fixed beta filter used was $\beta_F(z)$=0.82, where the "F" subscript indicates a fixed filter. The VAD was calculated using a fixed threshold of 1.5.

Figure 39:
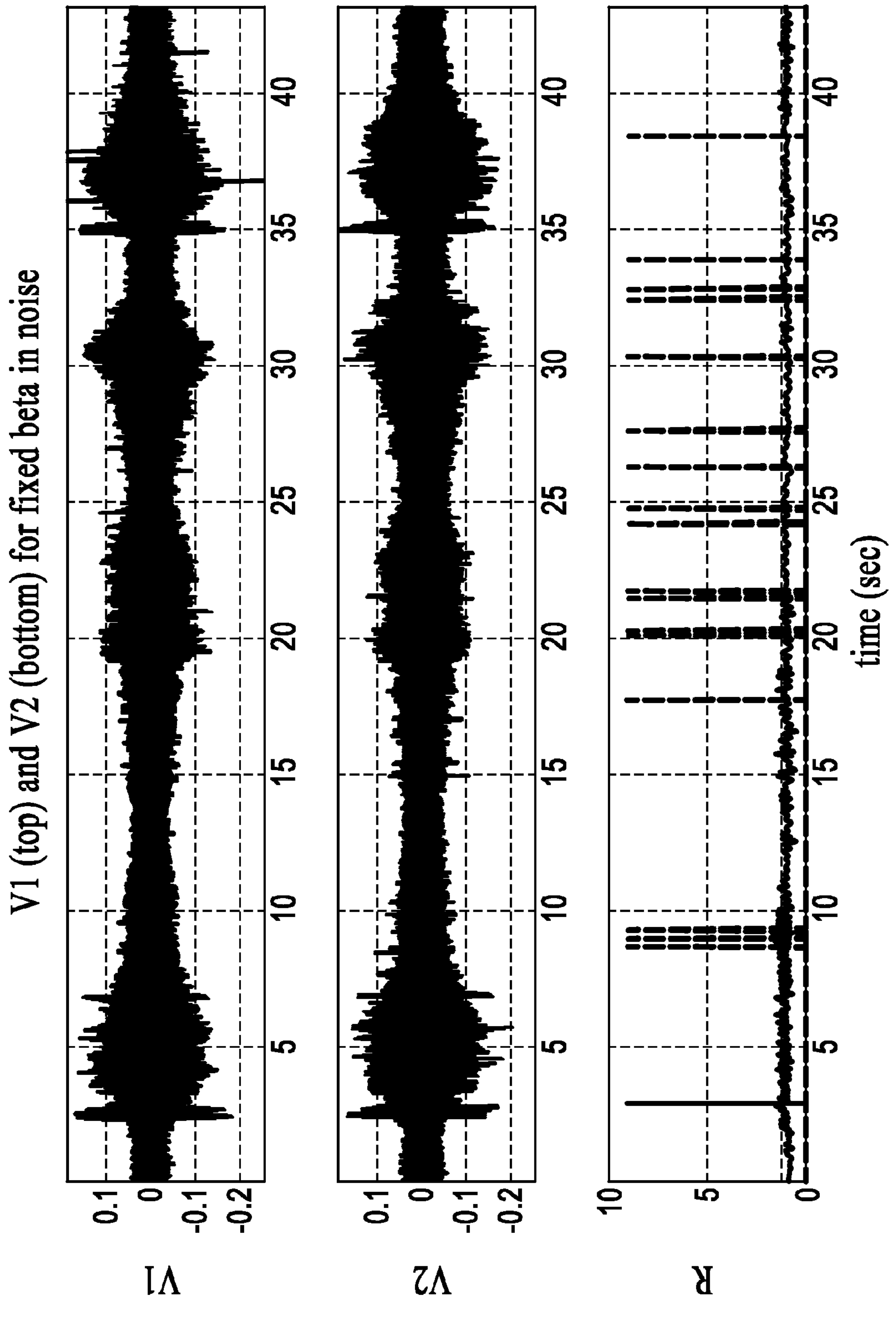
FIG. 39 shows experimental results of the algorithm using a fixed beta when only noise is present, under an embodiment.

FIG. 39 shows experimental results of the algorithm using a fixed beta when only noise is present, under an embodiment. The top plot is $V_1$, the middle plot is $V_2$, and the bottom plot is R (solid line) and the VAD result (dashed line) versus time. Examining FIG. 39, the response of both $V_1$ and $V_2$ are very similar, and the ratio R is very near unity for the entire sample. The VAD response has occasional false positives denoted by spikes in the R plot (windows that are identified by the algorithm as containing speech when they do not), but these are easily removed using standard pulse removal algorithms and/or smoothing of the R results.

Figure 40:
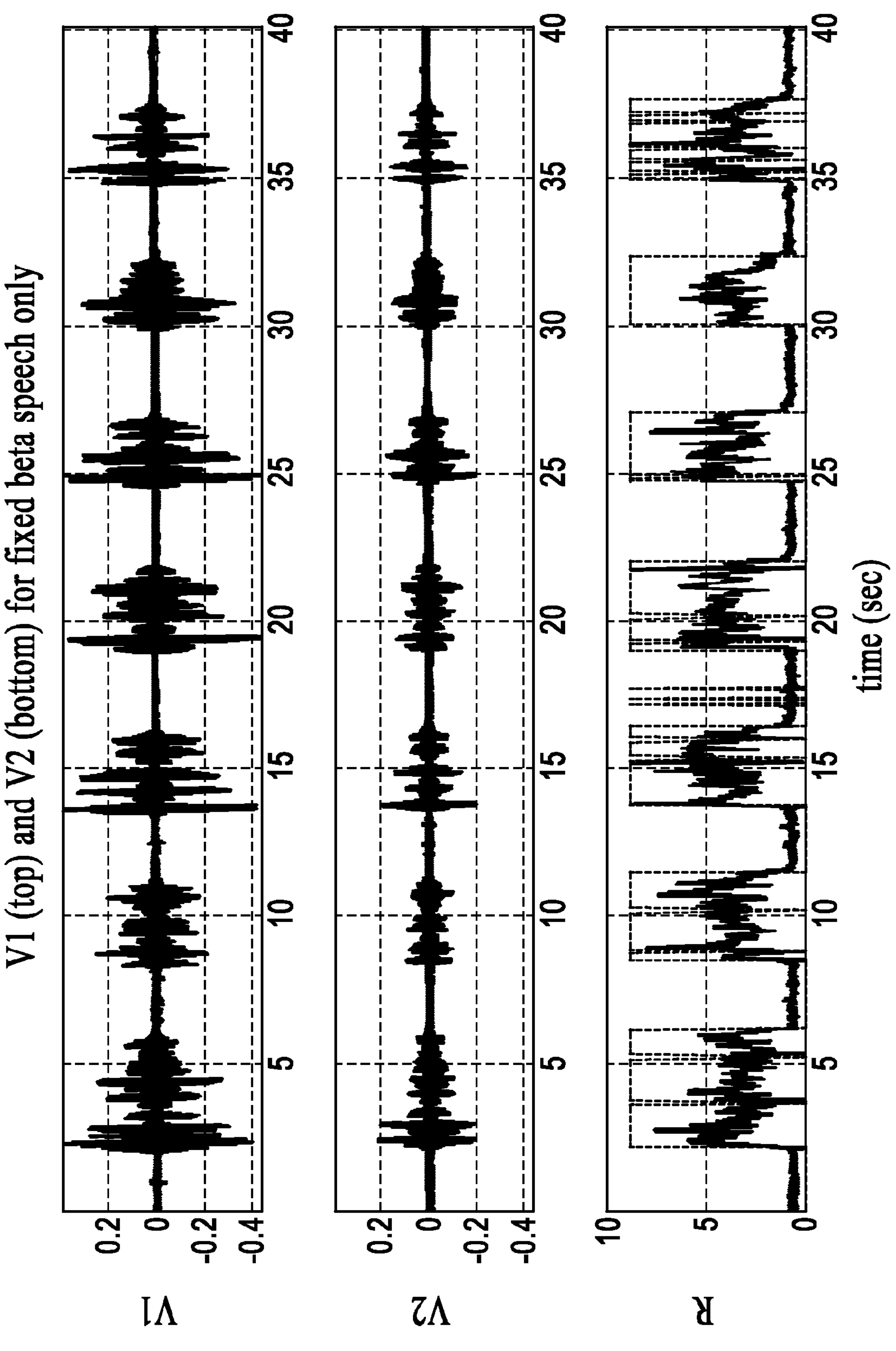
FIG. 40 shows experimental results of the algorithm using a fixed beta when only speech is present, under an embodiment.

FIG. 40 shows experimental results of the algorithm using a fixed beta when only speech is present, under an embodiment. The top plot is $V_1$, the middle plot is $V_2$, and the bottom plot is R (solid line) and the VAD result (dashed line) versus time. The R ratio is between approximately 2 and approximately 7 on average, and the speech is easily discernable using the fixed threshold. These results show that the response of the two virtual microphones to speech are very different, and indeed that ratio R varies from 2-7 during speech. There are very few false positives and very few false negatives (windows that contain speech but are not identified as speech windows). The speech is easily and accurately detected.

Figure 41:
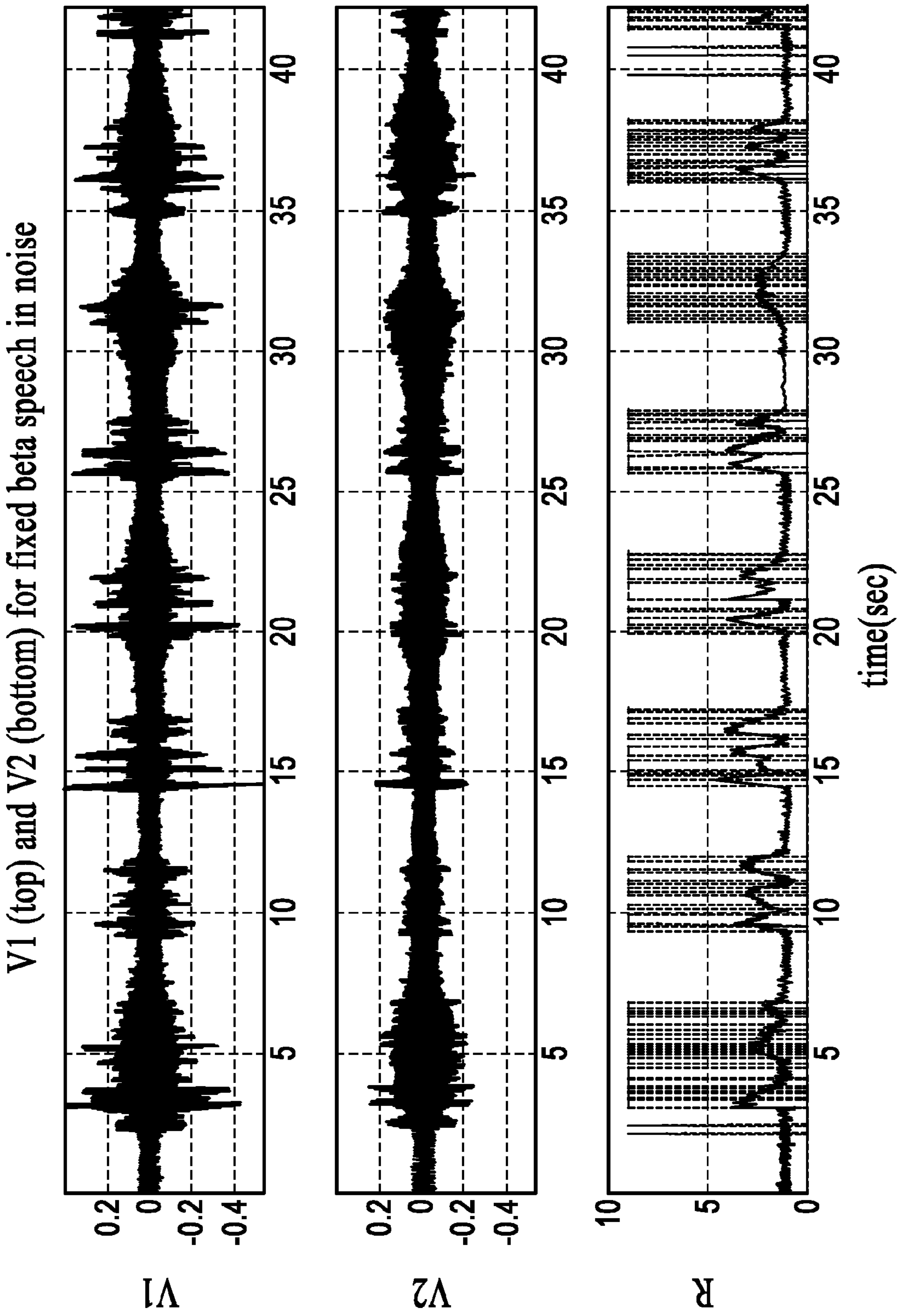
FIG. 41 shows experimental results of the algorithm using a fixed beta when speech and noise is present, under an embodiment.

FIG. 41 shows experimental results of the algorithm using a fixed beta when speech and noise is present, under an embodiment. The top plot is $V_1$, the middle plot is $V_2$, and the bottom plot is R (solid line) and the VAD result (dashed line) versus time. The R ratio is lower than when no noise is present, but the VAD remains accurate with only a few false positives. There are more false negatives than with no noise, but the speech remains easily detectable using standard thresholding algorithms. Even in a moderately loud noise environment (FIG. 41) the R ratio remains significantly above unity, and the VAD once again returns few false positives. More false negatives are observed, but these may be reduced using standard methods such as smoothing of R and allowing the VAD to continue reporting voiced windows for a few windows after R is under the threshold.

Figure 42:
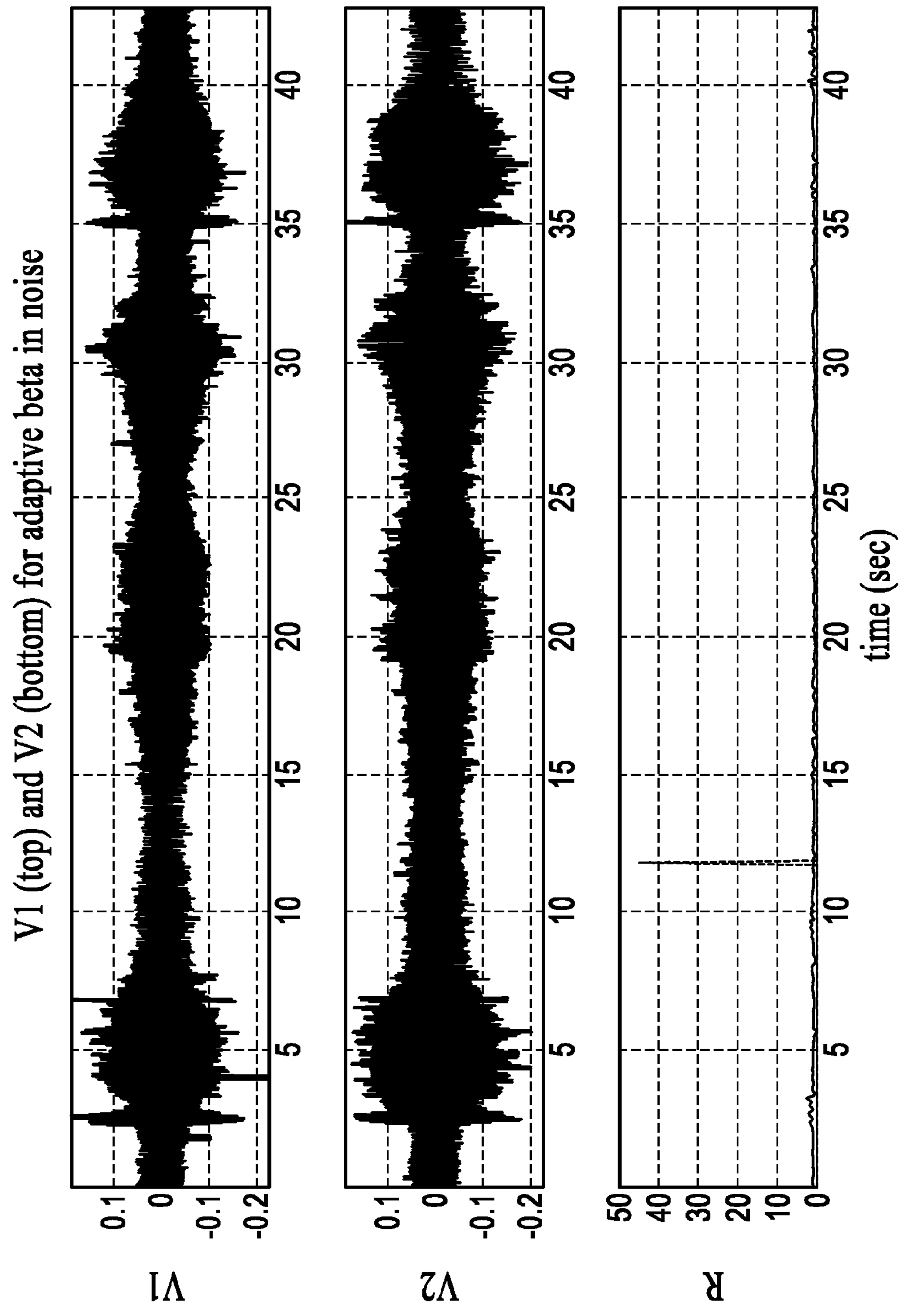
FIG. 42 shows experimental results of the algorithm using an adaptive beta when only noise is present, under an embodiment.
Figure 43:
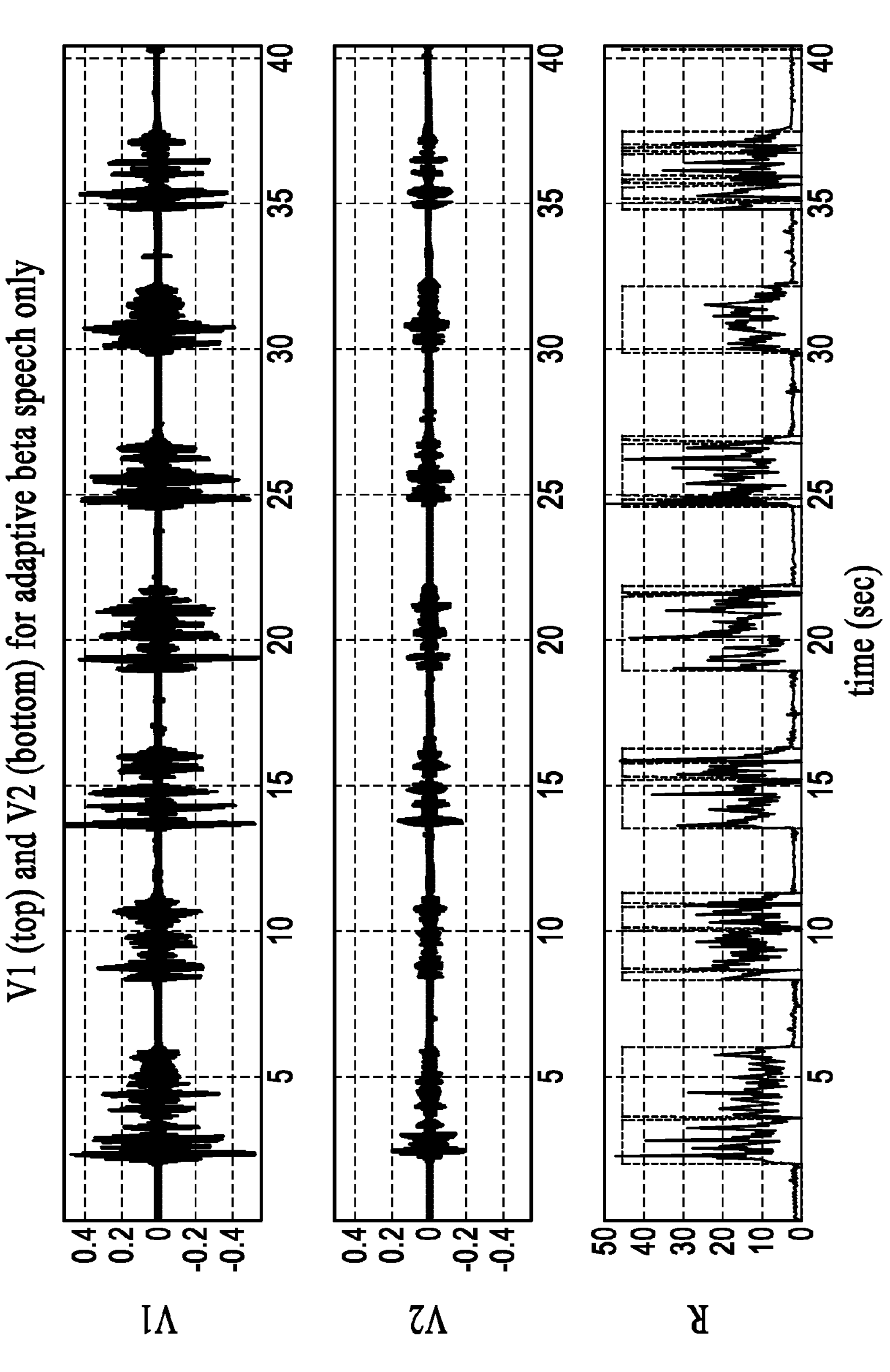
FIG. 43 shows experimental results of the algorithm using an adaptive beta when only speech is present, under an embodiment.
Figure 44:
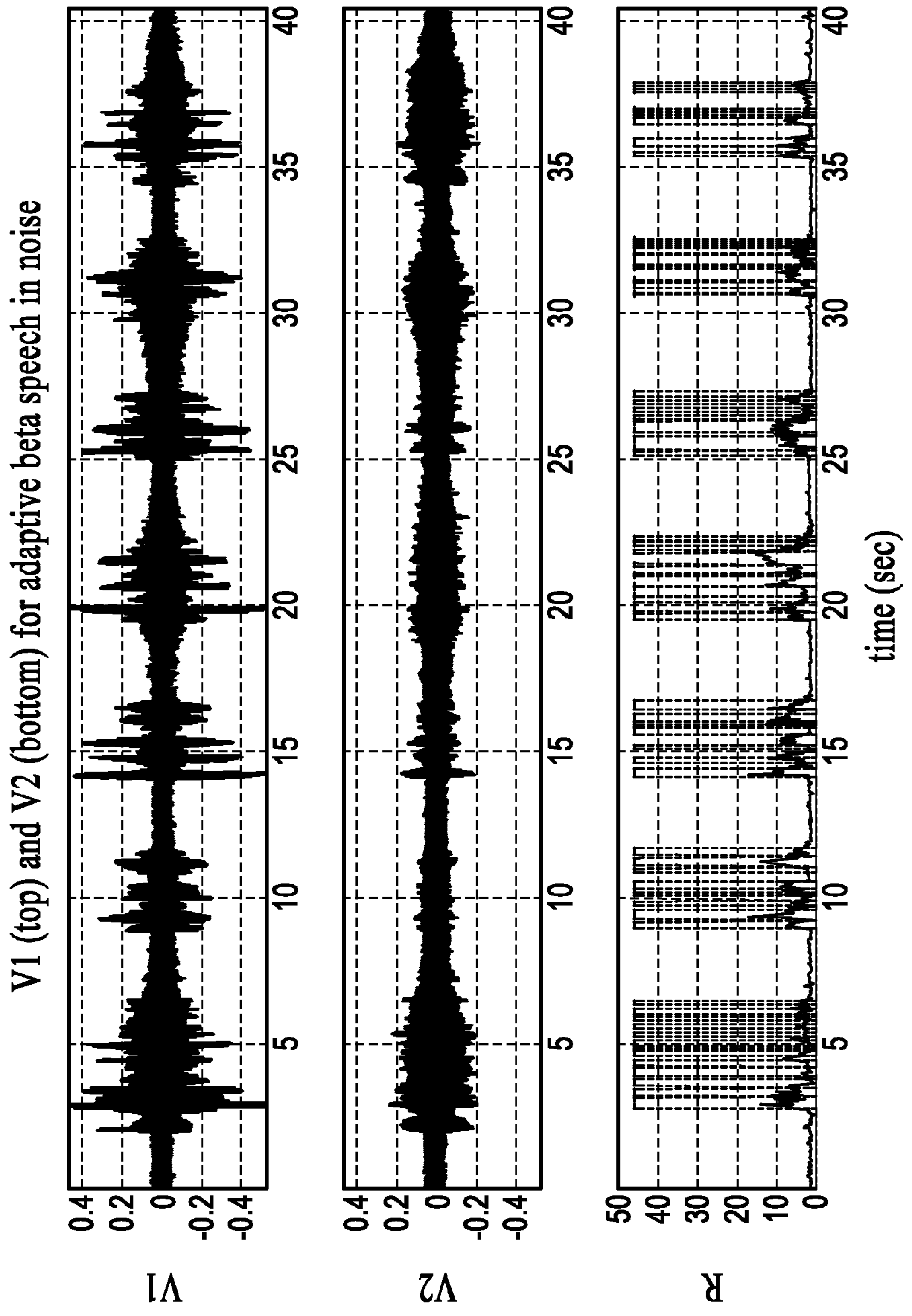
FIG. 44 shows experimental results of the algorithm using an adaptive beta when speech and noise is present, under an embodiment.

Results using the adaptive beta filter are shown in FIGS. 42-44. The adaptive filter used was a five-tap NLMS FIR filter using the frequency band from 100 Hz to 3500 Hz. A fixed filter of $z^{-0.43}$ is used to filter $O_1$ so that $O_1$ and $O_2$ are aligned for speech before the adaptive filter is calculated. The adaptive filter was constrained using the methods above using a low βlimit of 0.73, a high βlimit of 0.98, and a phase limit ratio of 0.98. Again a fixed threshold was used to generate the VAD result from the ratio R, but in this case a threshold value of 2.5 was used since the R values using the adaptive beta filter are normally greater than when the fixed filter is used. This allows for a reduction of false positives without significantly increasing false negatives.

FIG. 42 shows experimental results of the algorithm using an adaptive beta when only noise is present, under an embodiment. The top plot is $V_1$, the middle plot is $V_2$, and the bottom plot is R (solid line) and the VAD result (dashed line) versus time, with the y-axis expanded to 0-50. Again, $V_1$ and $V_2$ are very close in energy and the R ratio is near unity. Only a single false positive was generated.

FIG. 43 shows experimental results of the algorithm using an adaptive beta when only speech is present, under an embodiment. The top plot is $V_1$, the middle plot is $V_2$, and the bottom plot is (solid line) and the VAD result (dashed line) versus time, expanded to 0-50. The $V_2$ response is greatly reduced using the adaptive beta, and the R ratio has increased from the range of approximately 2-7 to the range of approximately 5-30 on average, making the speech even simpler to detect using standard thresholding algorithms. There are almost no false positives or false negatives. Therefore, the response of $V_2$ to speech is minimal, R is very high, and all of the speech is easily detected with almost no false positives.

FIG. 44 shows experimental results of the algorithm using an adaptive beta when speech and noise is present, under an embodiment. The top plot is $V_1$, the middle plot is $V_2$, and the bottom plot is R (solid line) and the VAD result (dashed line) versus time, with the y-axis expanded to 0-50. The R ratio is again lower than when no noise is present, but this R with significant noise present results in a VAD signal that is about the same as the case using the fixed beta with no noise present. This shows that use of the adaptive beta allows the system to perform well in higher noise environments than the fixed beta. Therefore, with mixed noise and speech, there are again very few false positives and fewer false negatives than in the results of FIG. 41, demonstrating that the adaptive filter can outperform the fixed filter in the same noise environment. In practice, the adaptive filter has proven to be significantly more sensitive to speech and less sensitive to noise.

Detecting Voiced and Unvoiced Speech Using Both Acoustic and Nonacoustic Sensors Systems and methods for discriminating voiced and unvoiced speech from background noise are provided below including a Non-Acoustic Sensor Voiced Speech Activity Detection (NAVSAD) system and a Pathfinder Speech Activity Detection (PSAD) system. The noise removal and reduction methods provided herein, while allowing for the separation and classification of unvoiced and voiced human speech from background noise, address the shortcomings of typical systems known in the art by cleaning acoustic signals of interest without distortion.

Figure 45:
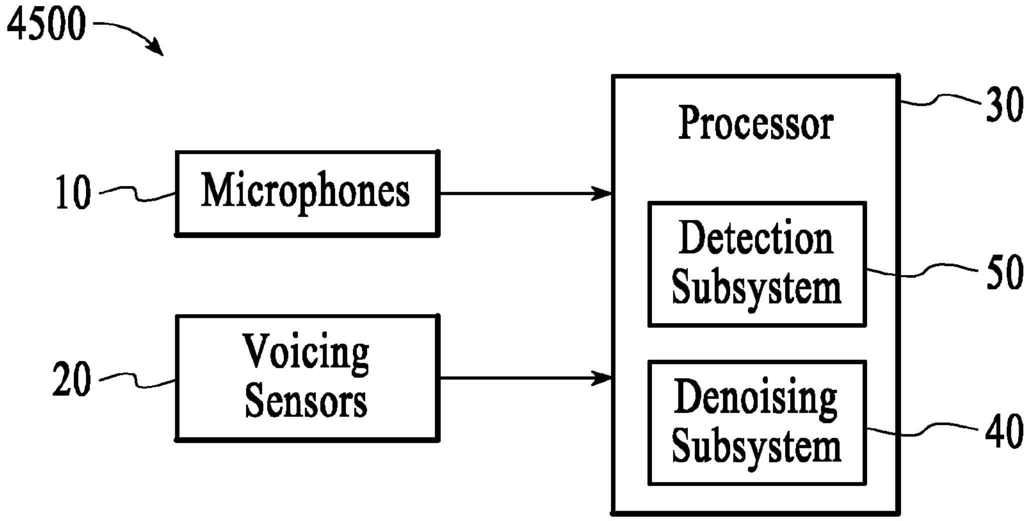
FIG. 45 is a block diagram of a NAVSAD system, under an embodiment.

FIG. 45 is a block diagram of a NAVSAD system 4500, under an embodiment. The NAVSAD system couples microphones 10 and sensors 20 to at least one processor 30. The sensors 20 of an embodiment include voicing activity detectors or non-acoustic sensors. The processor 30 controls subsystems including a detection subsystem 50, referred to herein as a detection algorithm, and a denoising subsystem 40. Operation of the denoising subsystem 40 is described in detail in the Related Applications. The NAVSAD system works extremely well in any background acoustic noise environment.

Figure 46:
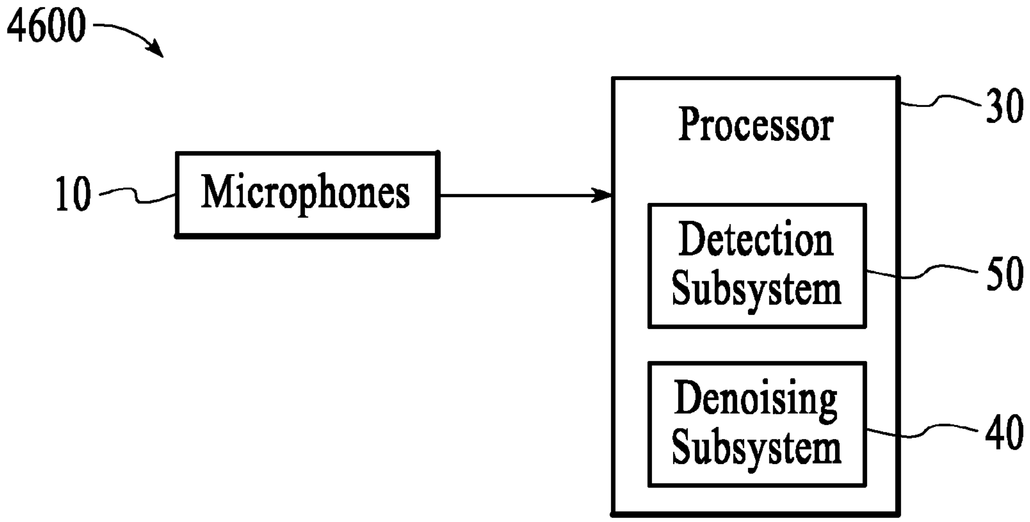
FIG. 46 is a block diagram of a PSAD system, under an embodiment.

FIG. 46 is a block diagram of a PSAD system 4600, under an embodiment. The PSAD system couples microphones 10 to at least one processor 30. The processor 30 includes a detection subsystem 50, referred to herein as a detection algorithm, and a denoising subsystem 40. The PSAD system is highly sensitive in low acoustic noise environments and relatively insensitive in high acoustic noise environments. The PSAD can operate independently or as a backup to the NAVSAD, detecting voiced speech if the NAVSAD fails.

Note that the detection subsystems 50 and denoising subsystems 40 of both the NAVSAD and PSAD systems of an embodiment are algorithms controlled by the processor 30, but are not so limited. Alternative embodiments of the NAVSAD and PSAD systems can include detection subsystems 50 and/or denoising subsystems 40 that comprise additional hardware, firmware, software, and/or combinations of hardware, firmware, and software. Furthermore, functions of the detection subsystems 50 and denoising subsystems 40 may be distributed across numerous components of the NAVSAD and PSAD systems.

Figure 47:
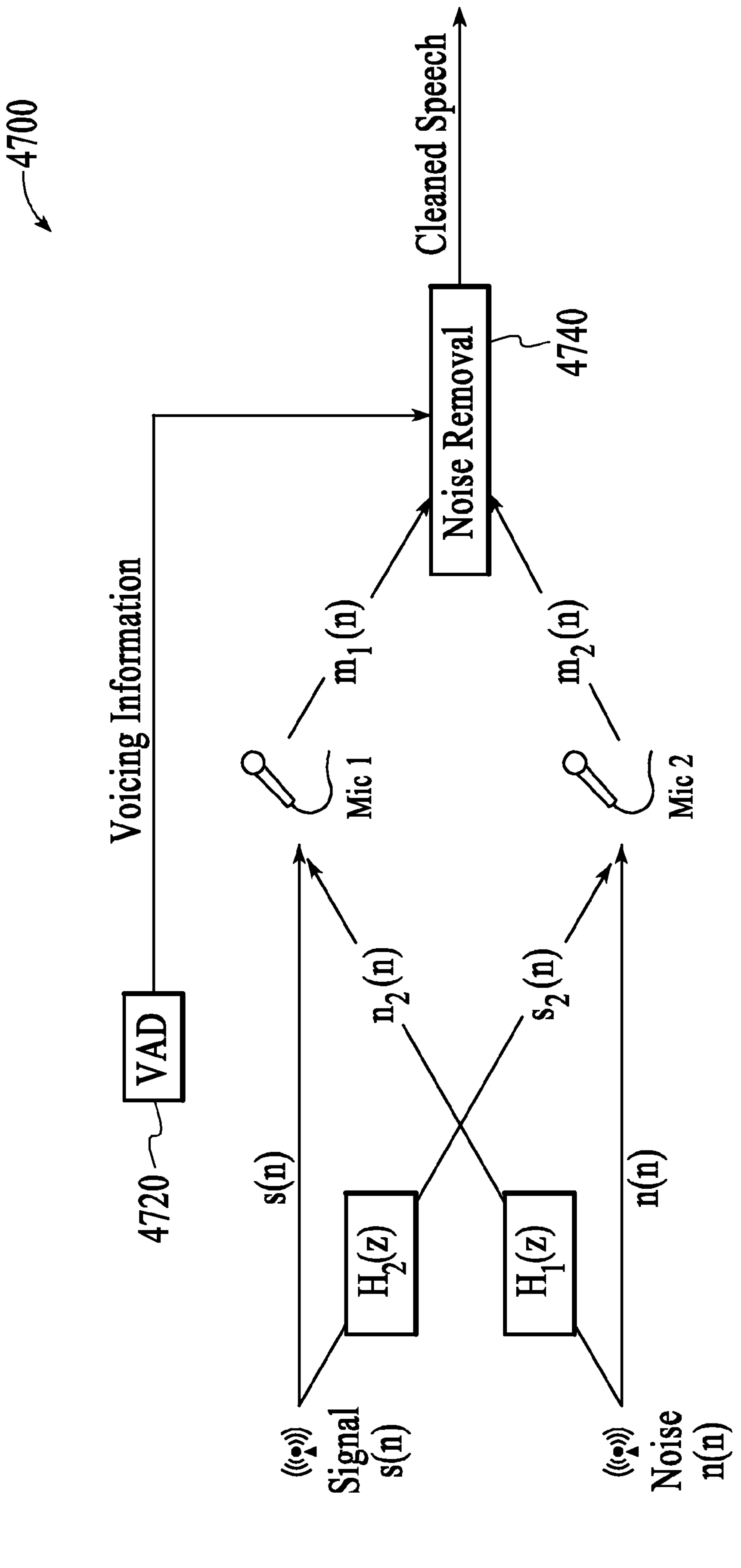
FIG. 47 is a block diagram of a denoising system, referred to herein as the Pathfinder system, under an embodiment.

FIG. 47 is a block diagram of a denoising subsystem 4700, referred to herein as the Pathfinder system, under an embodiment. The Pathfinder system is briefly described below, and is described in detail in the Related Applications. Two microphones Mic 1 and Mic 2 are used in the Pathfinder system, and Mic 1 is considered the "signal" microphone. With reference to FIG. 45, the Pathfinder system 4700 is equivalent to the NAVSAD system 4500 when the voicing activity detector (VAD) 4720 is a non-acoustic voicing sensor 20 and the noise removal subsystem 4740 includes the detection subsystem 50 and the denoising subsystem 40. With reference to FIG. 46, the Pathfinder system 4700 is equivalent to the PSAD system 4600 in the absence of the VAD 4720, and when the noise removal subsystem 4740 includes the detection subsystem 50 and the denoising subsystem 40.

The NAVSAD and PSAD systems support a two-level commercial approach in which (i) a relatively less expensive PSAD system supports an acoustic approach that functions in most low- to medium-noise environments, and (ii) a NAVSAD system adds a non-acoustic sensor to enable detection of voiced speech in any environment. Unvoiced speech is normally not detected using the sensor, as it normally does not sufficiently vibrate human tissue. However, in high noise situations detecting the unvoiced speech is not as important, as it is normally very low in energy and easily washed out by the noise. Therefore in high noise environments the unvoiced speech is unlikely to affect the voiced speech denoising. Unvoiced speech information is most important in the presence of little to no noise and, therefore, the unvoiced detection should be highly sensitive in low noise situations, and insensitive in high noise situations. This is not easily accomplished, and comparable acoustic unvoiced detectors known in the art are incapable of operating under these environmental constraints.

The NAVSAD and PSAD systems include an array algorithm for speech detection that uses the difference in frequency content between two microphones to calculate a relationship between the signals of the two microphones. This is in contrast to conventional arrays that attempt to use the time/phase difference of each microphone to remove the noise outside of an "area of sensitivity". The methods described herein provide a significant advantage, as they do not require a specific orientation of the array with respect to the signal.

Further, the systems described herein are sensitive to noise of every type and every orientation, unlike conventional arrays that depend on specific noise orientations. Consequently, the frequency-based arrays presented herein are unique as they depend only on the relative orientation of the two microphones themselves with no dependence on the orientation of the noise and signal with respect to the microphones. This results in a robust signal processing system with respect to the type of noise, microphones, and orientation between the noise/signal source and the microphones.

The systems described herein use the information derived from the Pathfinder noise suppression system and/or a non-acoustic sensor described in the Related Applications to determine the voicing state of an input signal, as described in detail below. The voicing state includes silent, voiced, and unvoiced states. The NAVSAD system, for example, includes a non-acoustic sensor to detect the vibration of human tissue associated with speech. The non-acoustic sensor of an embodiment is a General Electromagnetic Movement Sensor (GEMS) as described briefly below and in detail in the Related Applications, but is not so limited. Alternative embodiments, however, may use any sensor that is able to detect human tissue motion associated with speech and is unaffected by environmental acoustic noise.

The GEMS is a radio frequency device (2.4 GHz) that allows the detection of moving human tissue dielectric interfaces. The GEMS includes an RF interferometer that uses homodyne mixing to detect small phase shifts associated with target motion. In essence, the sensor sends out weak electromagnetic waves (less than 1 milliwatt) that reflect off of whatever is around the sensor. The reflected waves are mixed with the original transmitted waves and the results analyzed for any change in position of the targets. Anything that moves near the sensor will cause a change in phase of the reflected wave that will be amplified and displayed as a change in voltage output from the sensor. A similar sensor is described by Gregory C. Burnett (1999) in "The physiological basis of glottal electromagnetic micropower sensors (GEMS) and their use in defining an excitation function for the human vocal tract"; Ph.D. Thesis, University of California at Davis.

Figure 48:
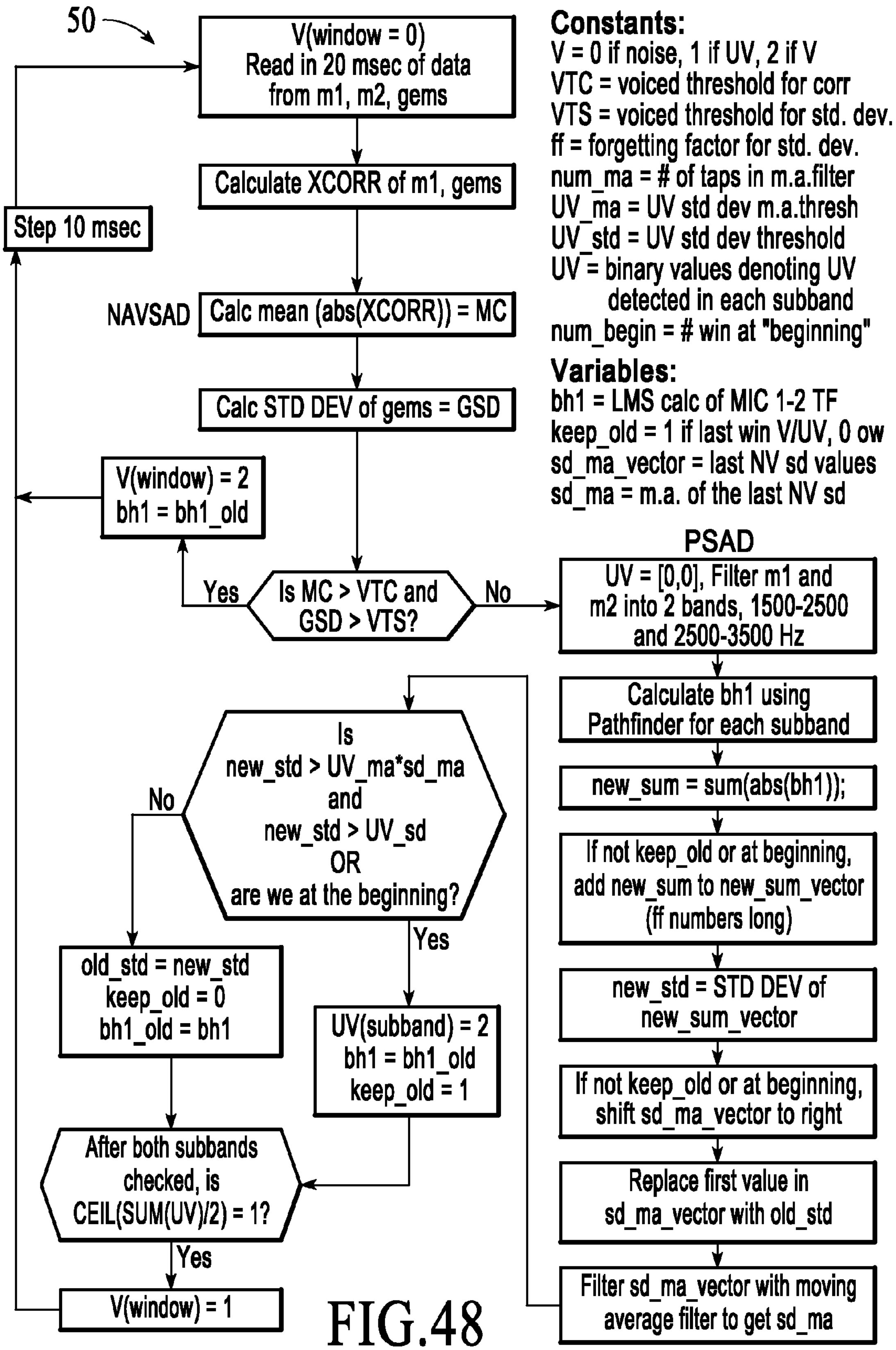
FIG. 48 is a flow diagram of a detection algorithm for use in detecting voiced and unvoiced speech, under an embodiment.

FIG. 48 is a flow diagram of a detection algorithm 50 for use in detecting voiced and unvoiced speech, under an embodiment. With reference to FIGS. 45 and 46, both the NAVSAD and PSAD systems of an embodiment include the detection algorithm 50 as the detection subsystem 50. This detection algorithm 50 operates in real-time and, in an embodiment, operates on 20 millisecond windows and steps 10 milliseconds at a time, but is not so limited. The voice activity determination is recorded for the first 10 milliseconds, and the second 10 milliseconds functions as a "look-ahead" buffer. While an embodiment uses the 20/10 windows, alternative embodiments may use numerous other combinations of window values.

Consideration was given to a number of multi-dimensional factors in developing the detection algorithm 50. The biggest consideration was to maintaining the effectiveness of the Pathfinder denoising technique, described in detail in the Related Applications and reviewed herein. Pathfinder performance can be compromised if the adaptive filter training is conducted on speech rather than on noise. It is therefore important not to exclude any significant amount of speech from the VAD to keep such disturbances to a minimum.

Consideration was also given to the accuracy of the characterization between voiced and unvoiced speech signals, and distinguishing each of these speech signals from noise signals. This type of characterization can be useful in such applications as speech recognition and speaker verification.

Furthermore, the systems using the detection algorithm of an embodiment function in environments containing varying amounts of background acoustic noise. If the non-acoustic sensor is available, this external noise is not a problem for voiced speech. However, for unvoiced speech (and voiced if the non-acoustic sensor is not available or has malfunctioned) reliance is placed on acoustic data alone to separate noise from unvoiced speech. An advantage inheres in the use of two microphones in an embodiment of the Pathfinder noise suppression system, and the spatial relationship between the microphones is exploited to assist in the detection of unvoiced speech. However, there may occasionally be noise levels high enough that the speech will be nearly undetectable and the acoustic-only method will fail. In these situations, the non-acoustic sensor (or hereafter just the sensor) will be required to ensure good performance.

In the two-microphone system, the speech source should be relatively louder in one designated microphone when compared to the other microphone. Tests have shown that this requirement is easily met with conventional microphones when the microphones are placed on the head, as any noise should result in an $H_1$ with a gain near unity.

Regarding the NAVSAD system, and with reference to FIG. 45 and FIG. 47, the NAVSAD relies on two parameters to detect voiced speech. These two parameters include the energy of the sensor in the window of interest, determined in an embodiment by the standard deviation (SD), and optionally the cross-correlation (XCORR) between the acoustic signal from microphone 1 and the sensor data. The energy of the sensor can be determined in any one of a number of ways, and the SD is just one convenient way to determine the energy.

For the sensor, the SD is akin to the energy of the signal, which normally corresponds quite accurately to the voicing state, but may be susceptible to movement noise (relative motion of the sensor with respect to the human user) and/or electromagnetic noise. To further differentiate sensor noise from tissue motion, the XCORR can be used. The XCORR is only calculated to 15 delays, which corresponds to just under 2 milliseconds at 8000 Hz.

The XCORR can also be useful when the sensor signal is distorted or modulated in some fashion. For example, there are sensor locations (such as the jaw or back of the neck) where speech production can be detected but where the signal may have incorrect or distorted time-based information. That is, they may not have well defined features in time that will match with the acoustic waveform. However, XCORR is more susceptible to errors from acoustic noise, and in high (<0 dB SNR) environments is almost useless. Therefore it should not be the sole source of voicing information.

The sensor detects human tissue motion associated with the closure of the vocal folds, so the acoustic signal produced by the closure of the folds is highly correlated with the closures. Therefore, sensor data that correlates highly with the acoustic signal is declared as speech, and sensor data that does not correlate well is termed noise. The acoustic data is expected to lag behind the sensor data by about 0.1 to 0.8 milliseconds (or about 1-7 samples) as a result of the delay time due to the relatively slower speed of sound (around 330 m/s). However, an embodiment uses a 15-sample correlation, as the acoustic wave shape varies significantly depending on the sound produced, and a larger correlation width is needed to ensure detection.

The SD and XCORR signals are related, but are sufficiently different so that the voiced speech detection is more reliable. For simplicity, though, either parameter may be used. The values for the SD and XCORR are compared to empirical thresholds, and if both are above their threshold, voiced speech is declared. Example data is presented and described below.

Figure 49A:
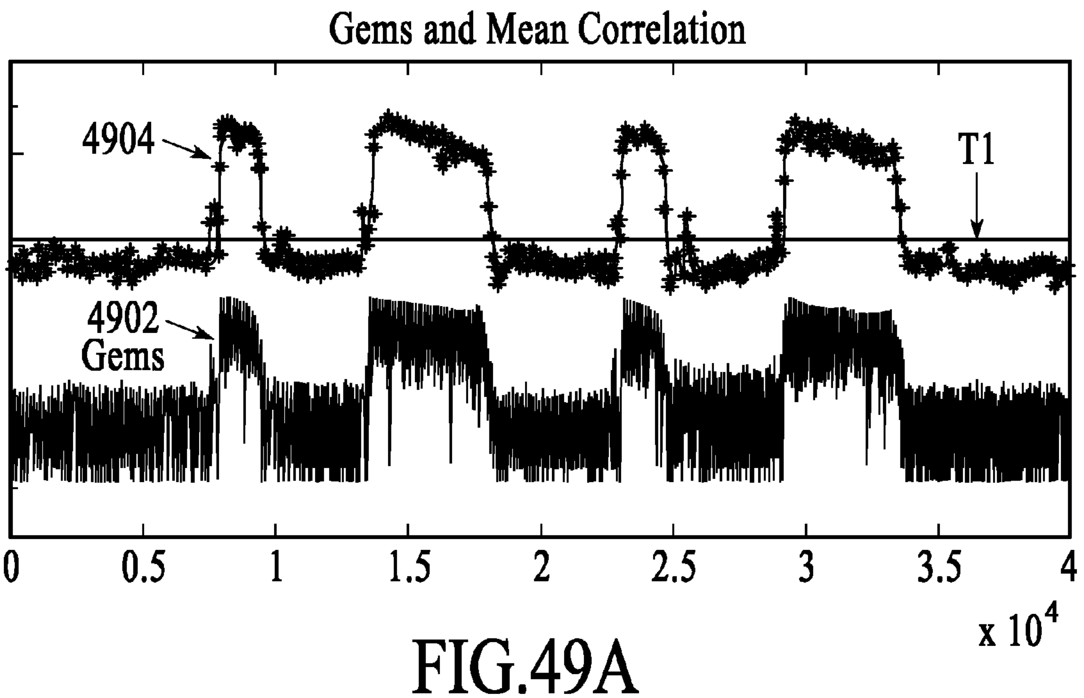
FIG. 49A plots the received GEMS signal for an utterance along with the mean correlation between the GEMS signal and the Mic 1 signal and the threshold for voiced speech detection.
Figure 49B:
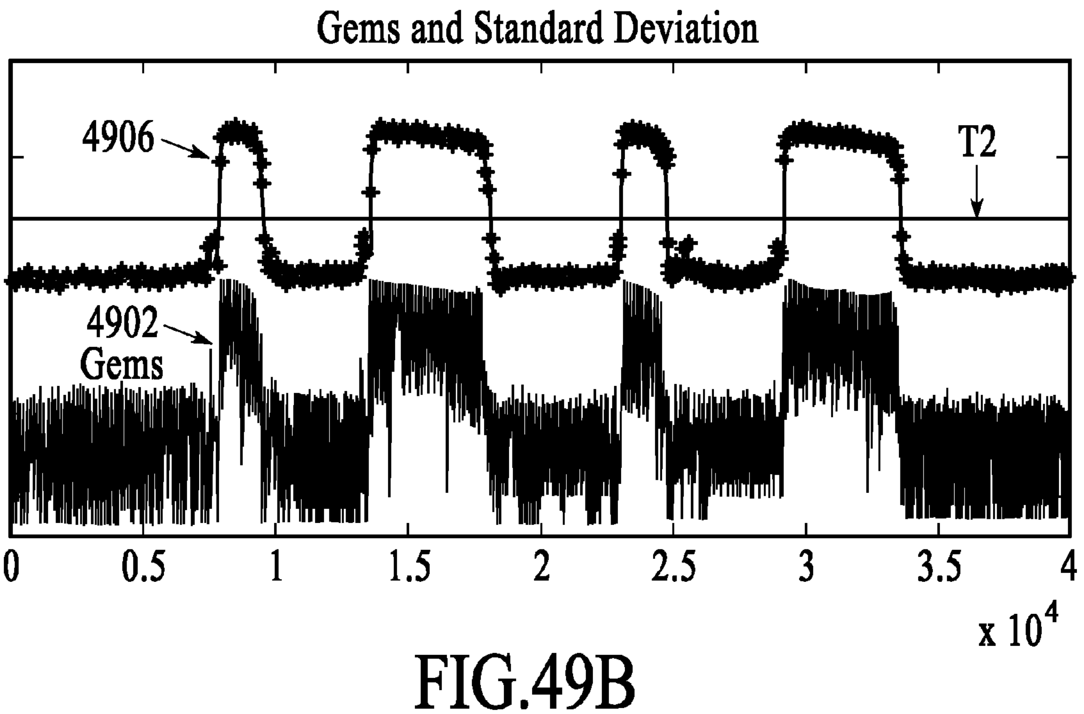
FIG. 49B plots the received GEMS signal for an utterance along with the standard deviation of the GEMS signal and the threshold for voiced speech detection.
Figure 50:
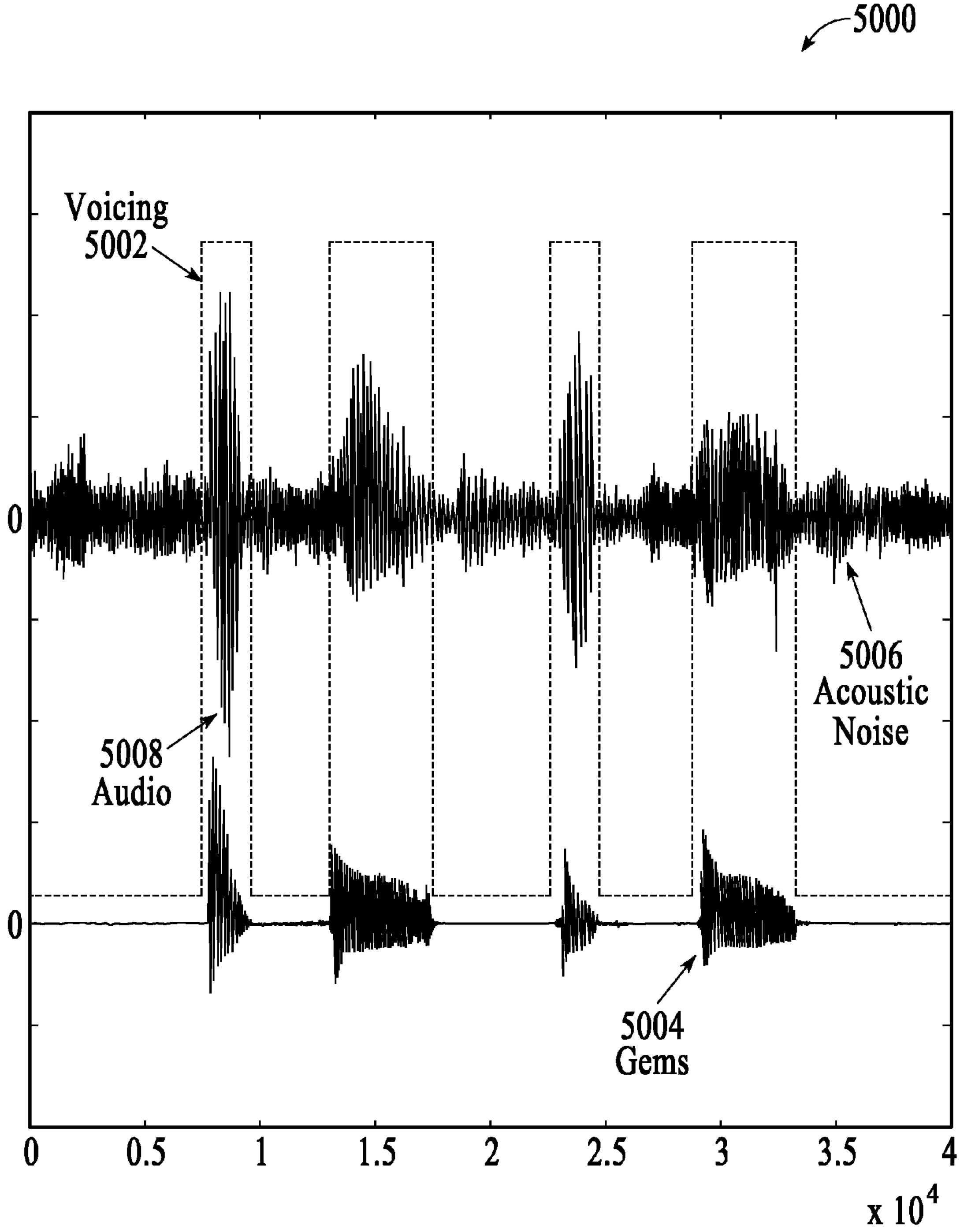
FIG. 50 plots voiced speech detected from an utterance along with the GEMS signal and the acoustic noise.

FIGS. 49A, 49B, and 50 show data plots for an example in which a subject twice speaks the phrase "pop pan", under an embodiment. FIG. 49A plots the received GEMS signal 4902 for this utterance along with the mean correlation 4904 between the GEMS signal and the Mic 1 signal and the threshold T1 used for voiced speech detection. FIG. 49B plots the received GEMS signal 4902 for this utterance along with the standard deviation 4906 of the GEMS signal and the threshold T2 used for voiced speech detection. FIG. 50 plots voiced speech 5002 detected from the acoustic or audio signal 5008, along with the GEMS signal 5004 and the acoustic noise 5006; no unvoiced speech is detected in this example because of the heavy background babble noise 5006. The thresholds have been set so that there are virtually no false negatives, and only occasional false positives. A voiced speech activity detection accuracy of greater than 99% has been attained under any acoustic background noise conditions.

The NAVSAD can determine when voiced speech is occurring with high degrees of accuracy due to the non-acoustic sensor data. However, the sensor offers little assistance in separating unvoiced speech from noise, as unvoiced speech normally causes no detectable signal in most non-acoustic sensors. If there is a detectable signal, the NAVSAD can be used, although use of the SD method is dictated as unvoiced speech is normally poorly correlated. In the absence of a detectable signal use is made of the system and methods of the Pathfinder noise removal algorithm in determining when unvoiced speech is occurring. A brief review of the Pathfinder algorithm is described below, while a detailed description is provided in the Related Applications.

With reference to FIG. 47, the acoustic information coming into Microphone 1 is denoted by $m_1(n)$, the information coming into Microphone 2 is similarly labeled $m_2(n)$, and the GEMS sensor is assumed available to determine voiced speech areas. In the z (digital frequency) domain, these signals are represented as $M_1(z)$ and $M_2(z)$. Then $$M_1(z)=S(z)+N_2(z)$$

$$M_2(z)=N(z)+S_2(z)$$

with $$N_2(z)=N(z)H_1(z)$$

$$S_2(z)=S(z)H_2(z)$$

so that $$M_1(z)=S(z)+N(z)H_1(z)$$

$$M_2(z)=N(z)+S(z)H_2(z) \qquad (1)$$

This is the general case for all two microphone systems. There is always going to be some leakage of noise into Mic 1, and some leakage of signal into Mic 2. Equation 1 has four unknowns and only two relationships and cannot be solved explicitly.

However, there is another way to solve for some of the unknowns in Equation 1. Examine the case where the signal is not being generated—that is, where the GEMS signal indicates voicing is not occurring. In this case, s(n)=S(z)=0, and Equation 1 reduces to $$M_{1n}(z)=N(z)H_1(z)$$

$$M_{2n}(z)=N(z)$$

where the n subscript on the M variables indicate that only noise is being received. This leads to $$M_{1n}(z)=M_{2n}(z)H_1(z) \qquad (2)$$

$$H_1(z)=\frac{M_{1n}(z)}{M_{2n}(z)}$$

$H_1(z)$ can be calculated using any of the available system identification algorithms and the microphone outputs when only noise is being received. The calculation can be done adaptively, so that if the noise changes significantly $H_1(z)$ can be recalculated quickly.

With a solution for one of the unknowns in Equation 1, solutions can be found for another, $H_2(z)$, by using the amplitude of the GEMS or similar device along with the amplitude of the two microphones. When the GEMS indicates voicing, but the recent (less than 1 second) history of the microphones indicate low levels of noise, assume that n(s)=N(z)~0. Then Equation 1 reduces to $$M_{1s}(z)=S(z)$$

$$M_{2s}(z)=S(z)H_2(z)$$

which in turn leads to $$M_{2s}(z) = M_{1s}(z)H_2(z)$$

$$H_2(z) = \frac{M_{2s}(z)}{M_{1s}(z)}$$

which is the inverse of the $H_1(z)$ calculation, but note that different inputs are being used.

After calculating $H_1(z)$ and $H_2(z)$ above, they are used to remove the noise from the signal. Rewrite Equation 1 as $$S(z)=M_1(z)-N(z)H_1(z)$$

$$N(z)=M_2(z)-S(z)H_2(z),$$

$$S(z)=M_1(z)-[M_2(z)-S(z)H_2(z)]H_1(z)$$

$$S(z)[1-H_2(z)H_1(z)]=M_1(z)-M_2(z)H_1(z)$$

and solve for S(z) as:

$$S(z) = \frac{M_1(z) - M_2(z)H_1(z)}{1 - H_2(z)H_1(z)}. \quad (3)$$

In practice $H_2(z)$ is usually quite small, so that $H_2(z)H_1(z) \ll 1$, and $$S(z) \approx M_1(z)-M_2(z)H_1(z),$$

obviating the need for the $H_2(z)$ calculation.

With reference to FIG. 46 and FIG. 47, the PSAD system is described. As sound waves propagate, they normally lose energy as they travel due to diffraction and dispersion. Assuming the sound waves originate from a point source and radiate isotropically, their amplitude will decrease as a function of 1/r, where r is the distance from the originating point. This function of 1/r proportional to amplitude is the worst case, if confined to a smaller area the reduction will be less. However it is an adequate model for the configurations of interest, specifically the propagation of noise and speech to microphones located somewhere on the user's head.

Figure 51:
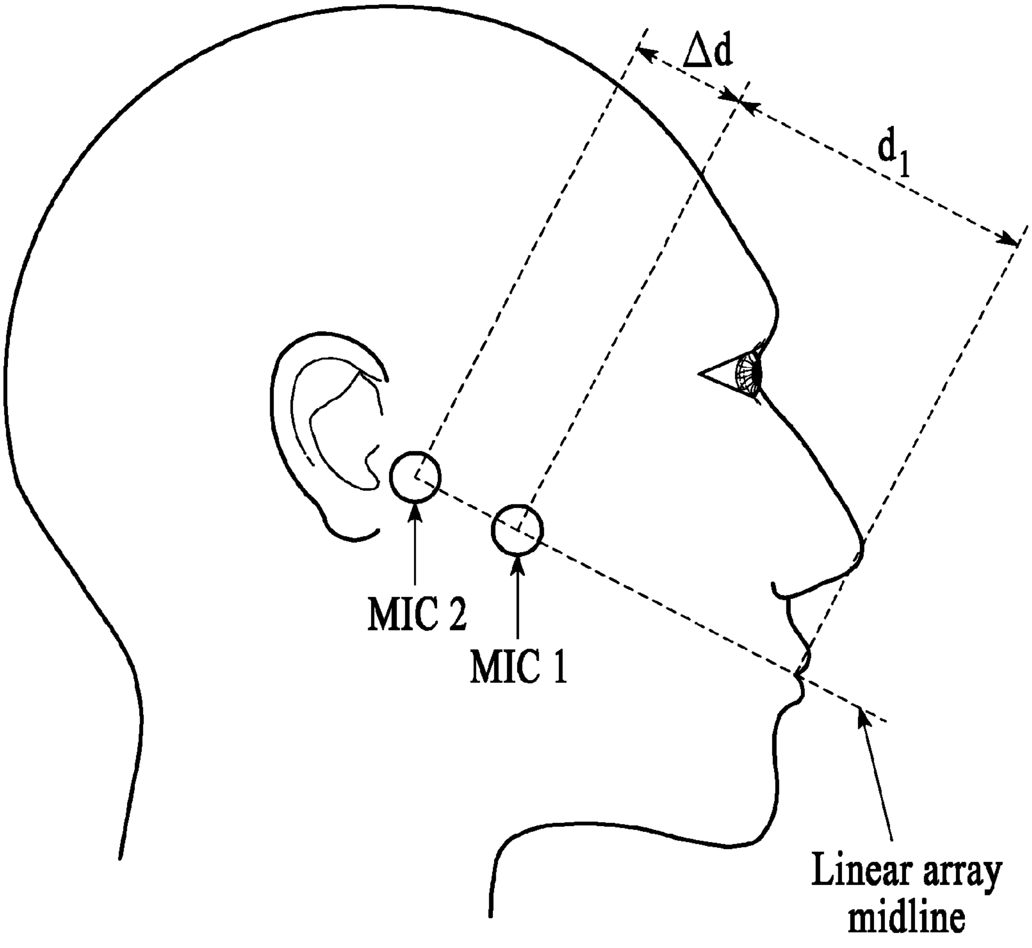
FIG. 51 is a microphone array for use under an embodiment of the PSAD system.

FIG. 51 is a microphone array for use under an embodiment of the PSAD system. Placing the microphones Mic 1 and Mic 2 in a linear array with the mouth on the array midline, the difference in signal strength in Mic 1 and Mic 2 (assuming the microphones have identical frequency responses) will be proportional to both $d_1$ and Δd. Assuming a 1/r (or in this case 1/d) relationship, it is seen that $$\Delta M = \frac{|Mic1|}{|Mic2|} = \Delta H_1(z) \propto \frac{d_1 + \Delta d}{d_1},$$

where ΔM is the difference in gain between Mic 1 and Mic 2 and therefore $H_1(z)$, as above in Equation 2. The variable $d_1$ is the distance from Mic 1 to the speech or noise source.

Figure 52:
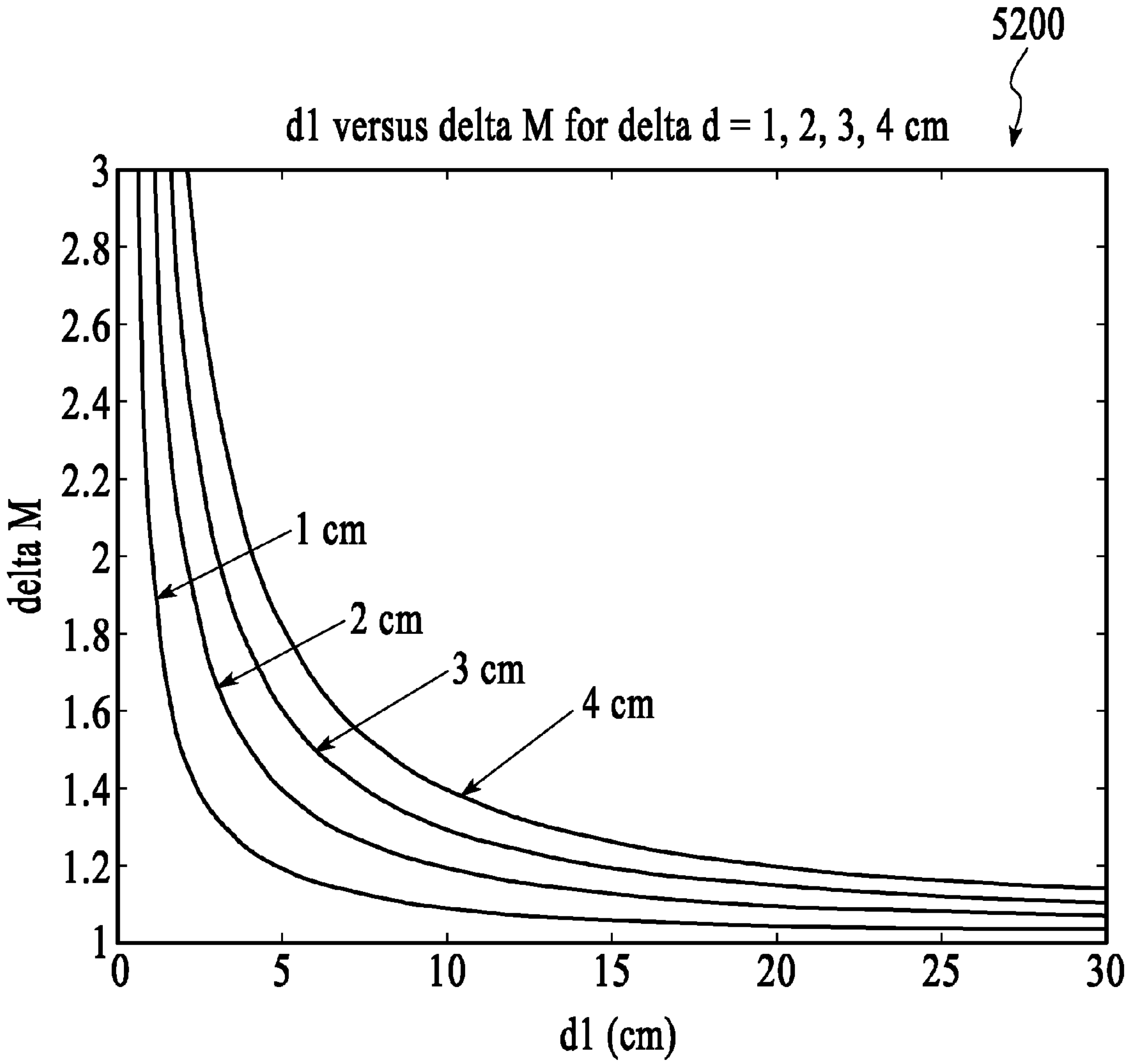
FIG. 52 is a plot of ΔM versus $d_1$ for several Δd values, under an embodiment.

FIG. 52 is a plot 5200 of ΔM versus $d_1$ for several Δd values, under an embodiment. It is clear that as Δd becomes larger and the noise source is closer, AM becomes larger. The variable Δd will change depending on the orientation to the speech/noise source, from the maximum value on the array midline to zero perpendicular to the array midline. From the plot 5200 it is clear that for small Δd and for distances over approximately 30 centimeters (cm), ΔM is close to unity. Since most noise sources are farther away than 30 cm and are unlikely to be on the midline on the array, it is probable that when calculating $H_1(z)$ as above in Equation 2, ΔM (or equivalently the gain of $H_1(z)$) will be close to unity. Conversely, for noise sources that are close (within a few centimeters), there could be a substantial difference in gain depending on which microphone is closer to the noise.

If the "noise" is the user speaking, and Mic 1 is closer to the mouth than Mic 2, the gain increases. Since environmental noise normally originates much farther away from the user's head than speech, noise will be found during the time when the gain of $H_1(z)$ is near unity or some fixed value, and speech can be found after a sharp rise in gain. The speech can be unvoiced or voiced, as long as it is of sufficient volume compared to the surrounding noise. The gain will stay somewhat high during the speech portions, then descend quickly after speech ceases. The rapid increase and decrease in the gain of $H_1(z)$ should be sufficient to allow the detection of speech under almost any circumstances. The gain in this example is calculated by the sum of the absolute value of the filter coefficients. This sum is not equivalent to the gain, but the two are related in that a rise in the sum of the absolute value reflects a rise in the gain.

Figure 53:
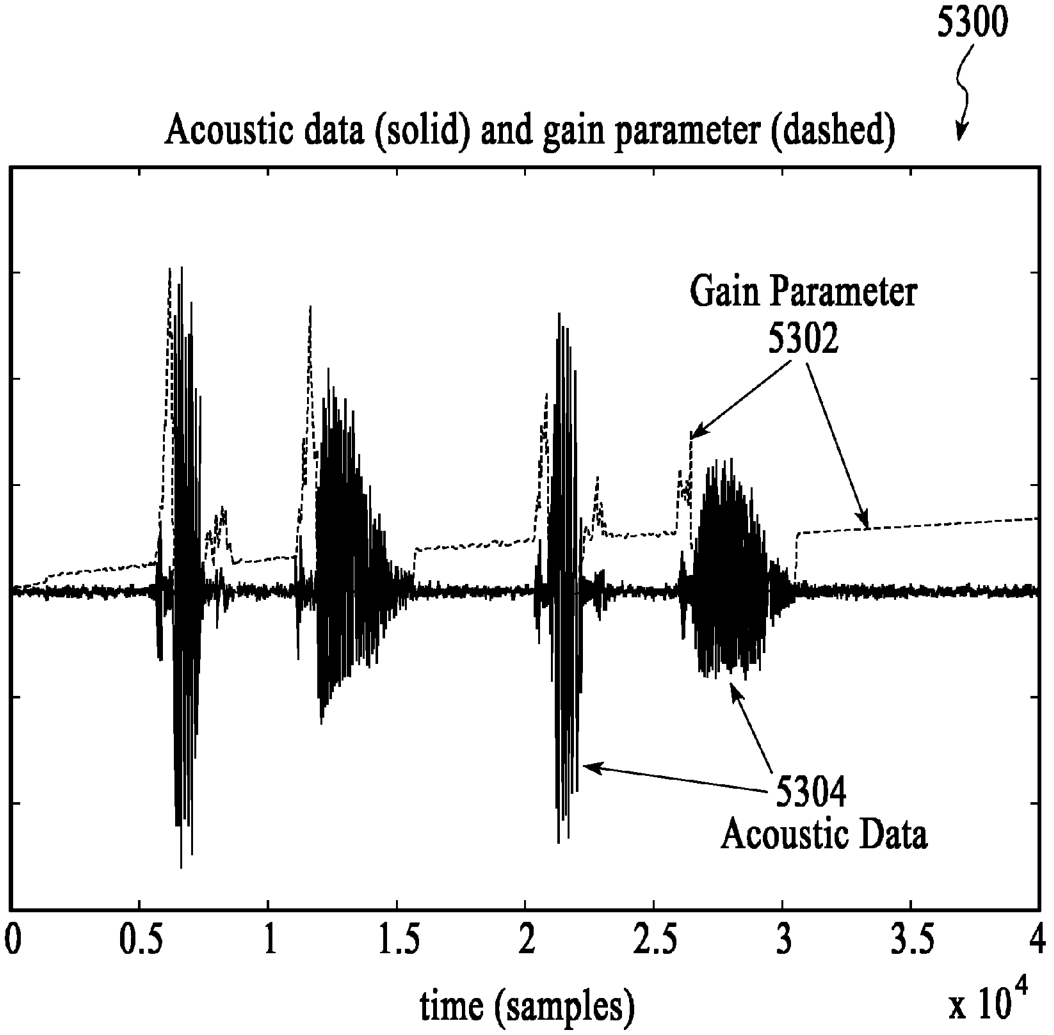
FIG. 53 shows a plot of the gain parameter as the sum of the absolute values of $H_1(z)$ and the acoustic data or audio from microphone 1.

As an example of this behavior, FIG. 53 shows a plot 5300 of the gain parameter 5302 as the sum of the absolute values of $H_1(z)$ and the acoustic data 5304 or audio from microphone 1. The speech signal was an utterance of the phrase "pop pan", repeated twice. The evaluated bandwidth included the frequency range from 2500 Hz to 3500 Hz, although 1500 Hz to 2500 Hz was additionally used in practice. Note the rapid increase in the gain when the unvoiced speech is first encountered, then the rapid return to normal when the speech ends. The large changes in gain that result from transitions between noise and speech can be detected by any standard signal processing techniques. The standard deviation of the last few gain calculations is used, with thresholds being defined by a running average of the standard deviations and the standard deviation noise floor. The later changes in gain for the voiced speech are suppressed in this plot 5300 for clarity.

Figure 54:
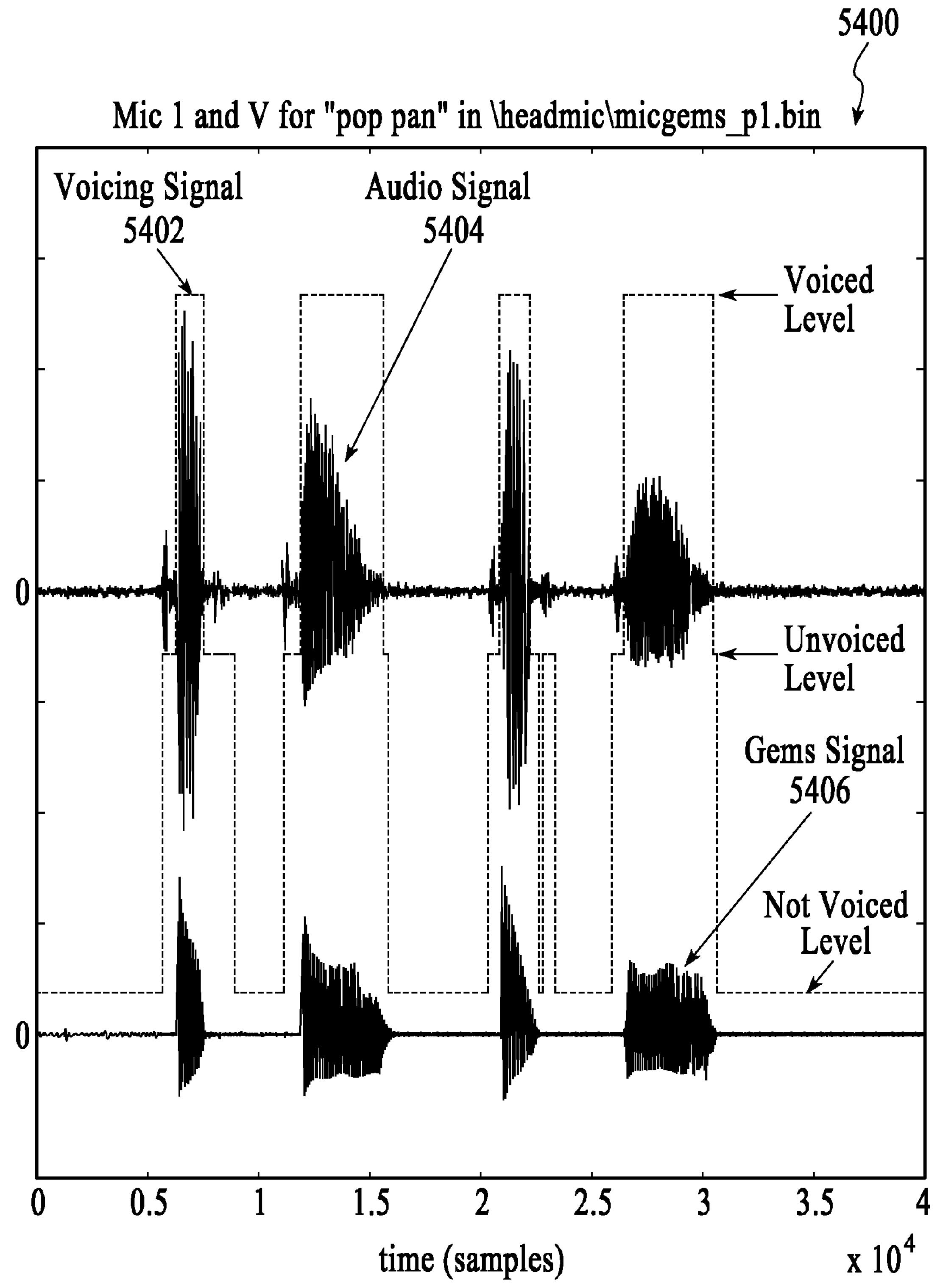
FIG. 54 is an alternative plot of acoustic data presented in FIG. 53.

FIG. 54 is an alternative plot 5400 of acoustic data presented in FIG. 53. The data used to form plot 5300 is presented again in this plot 5400, along with audio data 5404 and GEMS data 5406 without noise to make the unvoiced speech apparent. The voiced signal 5402 has three possible values: 0 for noise, 1 for unvoiced, and 2 for voiced. Denoising is only accomplished when V=0. It is clear that the unvoiced speech is captured very well, aside from two single dropouts in the unvoiced detection near the end of each "pop". However, these single-window dropouts are not common and do not significantly affect the denoising algorithm. They can easily be removed using standard smoothing techniques.

What is not clear from this plot 5400 is that the PSAD system functions as an automatic backup to the NAVSAD. This is because the voiced speech (since it has the same spatial relationship to the mics as the unvoiced) will be detected as unvoiced if the sensor or NAVSAD system fail for any reason. The voiced speech will be misclassified as unvoiced, but the denoising will still not take place, preserving the quality of the speech signal.

However, this automatic backup of the NAVSAD system functions best in an environment with low noise (approximately 10+ dB SNR), as high amounts (10 dB of SNR or less) of acoustic noise can quickly overwhelm any acoustic-only unvoiced detector, including the PSAD. This is evident in the difference in the voiced signal data 5002 and 5402 shown in plots 5000 and 5400 of FIGS. 50 and 54, respectively, where the same utterance is spoken, but the data of plot 5000 shows no unvoiced speech because the unvoiced speech is undetectable. This is the desired behavior when performing denoising, since if the unvoiced speech is not detectable then it will not significantly affect the denoising process. Using the Pathfinder system to detect unvoiced speech ensures detection of any unvoiced speech loud enough to distort the denoising.

Regarding hardware considerations, and with reference to FIG. 51, the configuration of the microphones can have an effect on the change in gain associated with speech and the thresholds needed to detect speech. In general, each configuration will require testing to determine the proper thresholds, but tests with two very different microphone configurations showed the same thresholds and other parameters to work well. The first microphone set had the signal microphone near the mouth and the noise microphone several centimeters away at the ear, while the second configuration placed the noise and signal microphones back-to-back within a few centimeters of the mouth. The results presented herein were derived using the first microphone configuration, but the results using the other set are virtually identical, so the detection algorithm is relatively robust with respect to microphone placement.

A number of configurations are possible using the NAVSAD and PSAD systems to detect voiced and unvoiced speech. One configuration uses the NAVSAD system (non-acoustic only) to detect voiced speech along with the PSAD system to detect unvoiced speech; the PSAD also functions as a backup to the NAVSAD system for detecting voiced speech. An alternative configuration uses the NAVSAD system (non-acoustic correlated with acoustic) to detect voiced speech along with the PSAD system to detect unvoiced speech; the PSAD also functions as a backup to the NAVSAD system for detecting voiced speech. Another alternative configuration uses the PSAD system to detect both voiced and unvoiced speech.

While the systems described above have been described with reference to separating voiced and unvoiced speech from background acoustic noise, there are no reasons more complex classifications can not be made. For more in-depth characterization of speech, the system can bandpass the information from Mic 1 and Mic 2 so that it is possible to see which bands in the Mic 1 data are more heavily composed of noise and which are more weighted with speech. Using this knowledge, it is possible to group the utterances by their spectral characteristics similar to conventional acoustic methods; this method would work better in noisy environments.

As an example, the "k" in "kick" has significant frequency content form 500 Hz to 4000 Hz, but a "sh" in "she" only contains significant energy from 1700-4000 Hz. Voiced speech could be classified in a similar manner. For instance, an /i/ ("ee") has significant energy around 300 Hz and 2500 Hz, and an /a/ ("ah") has energy at around 900 Hz and 1200 Hz. This ability to discriminate unvoiced and voiced speech in the presence of noise is, thus, very useful.

Acoustic Vibration Sensor

An acoustic vibration sensor, also referred to as a speech sensing device, is described below. The acoustic vibration sensor is similar to a microphone in that it captures speech information from the head area of a human talker or talker in noisy environments. Previous solutions to this problem have either been vulnerable to noise, physically too large for certain applications, or cost prohibitive. In contrast, the acoustic vibration sensor described herein accurately detects and captures speech vibrations in the presence of substantial airborne acoustic noise, yet within a smaller and cheaper physical package. The noise-immune speech information provided by the acoustic vibration sensor can subsequently be used in downstream speech processing applications (speech enhancement and noise suppression, speech encoding, speech recognition, talker verification, etc.) to improve the performance of those applications.

Figure 55:
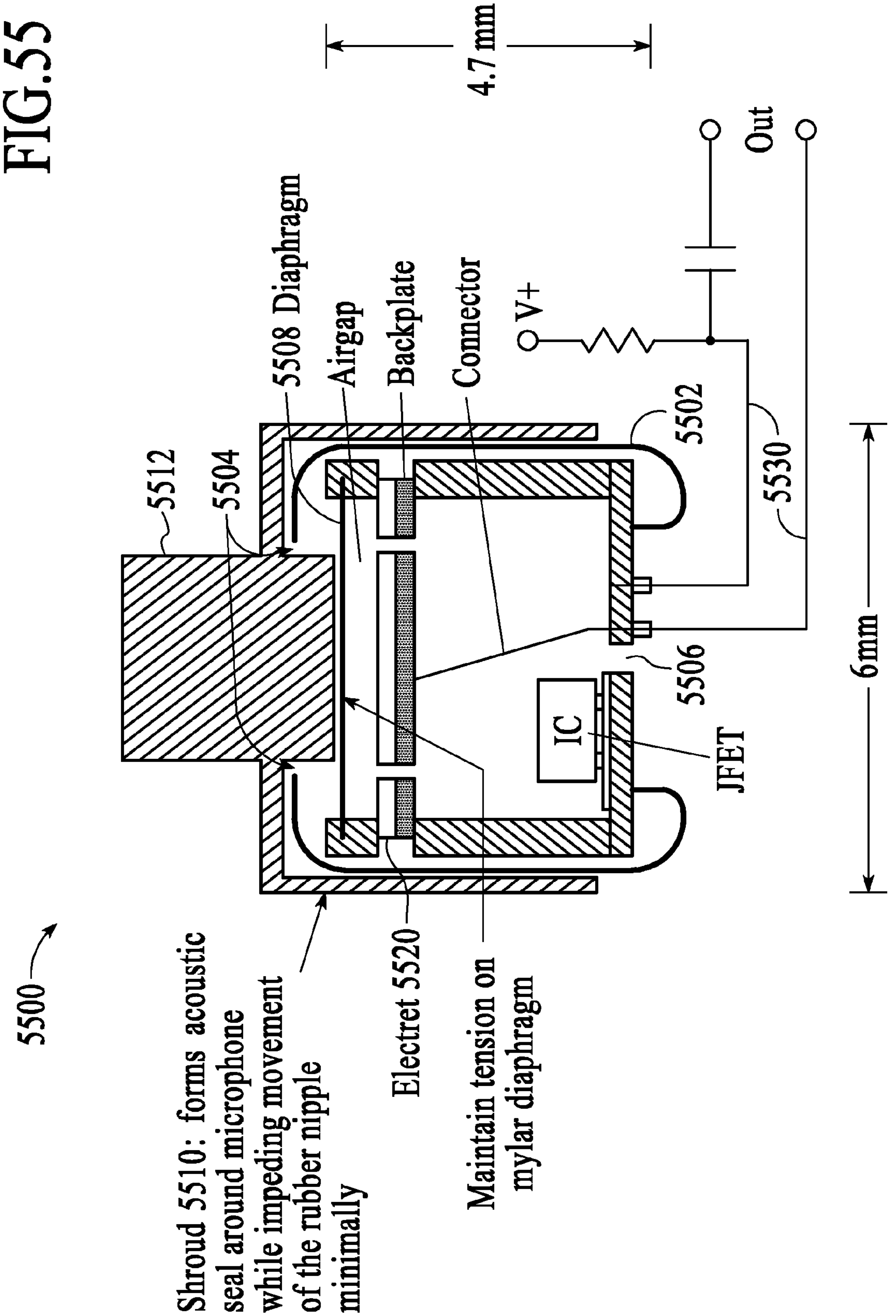
FIG. 55 is a cross section view of an acoustic vibration sensor, under an embodiment.
Figure 56A:
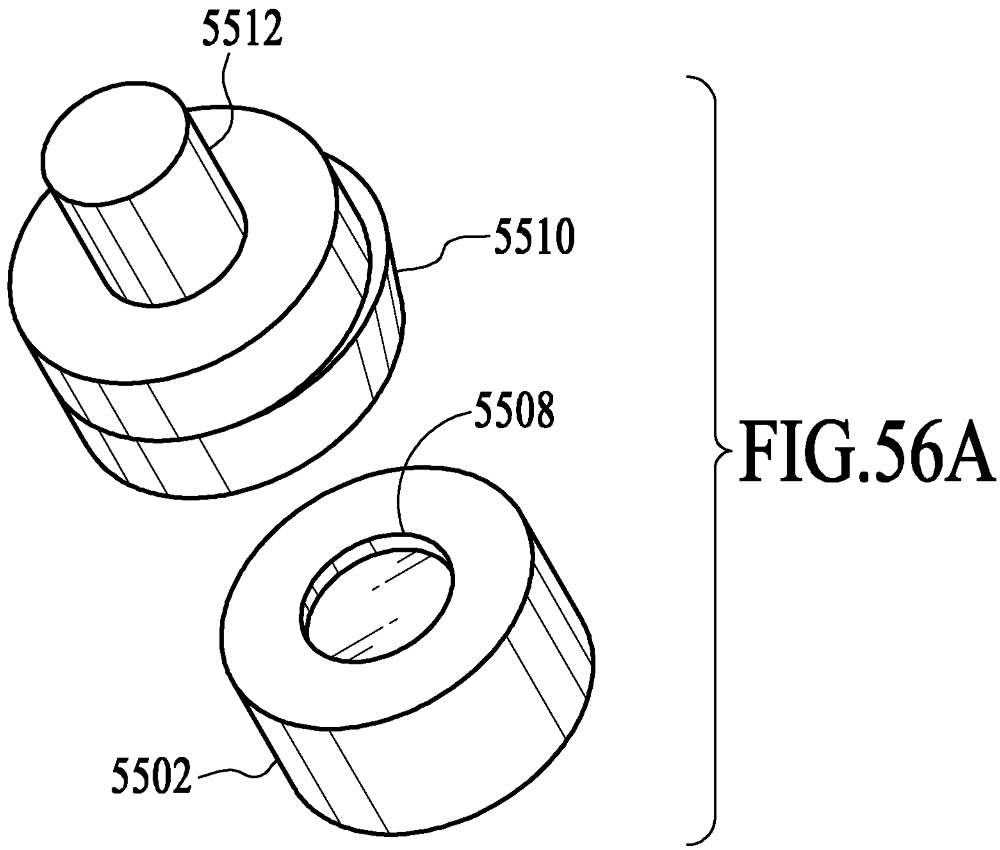
FIG. 56A is an exploded view of an acoustic vibration sensor, under the embodiment of FIG. 55.
Figure 56B:
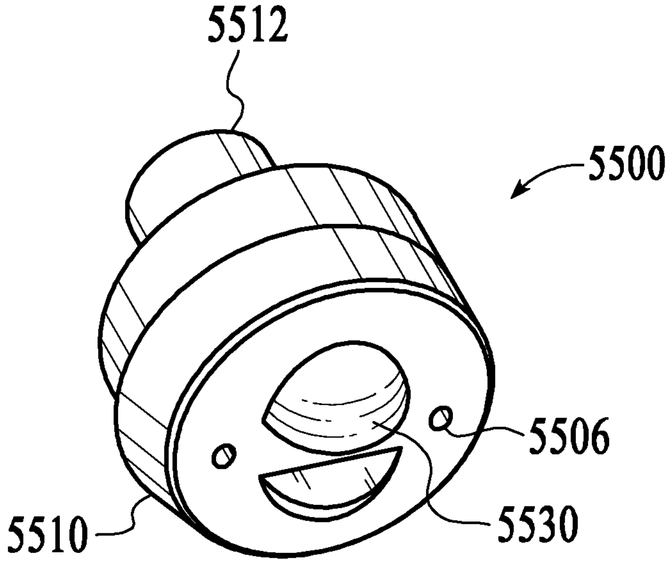
FIG. 56B is perspective view of an acoustic vibration sensor, under the embodiment of FIG. 55.

FIG. 55 is a cross section view of an acoustic vibration sensor 5500, also referred to herein as the sensor 5500, under an embodiment. FIG. 56A is an exploded view of an acoustic vibration sensor 5500, under the embodiment of FIG. 55. FIG. 56B is perspective view of an acoustic vibration sensor 5500, under the embodiment of FIG. 55. The sensor 5500 includes an enclosure 5502 having a first port 5504 on a first side and at least one second port 5506 on a second side of the enclosure 5502. A diaphragm 5508, also referred to as a sensing diaphragm 5508, is positioned between the first and second ports. A coupler 5510, also referred to as the shroud 5510 or cap 5510, forms an acoustic seal around the enclosure 5502 so that the first port 5504 and the side of the diaphragm facing the first port 5504 are isolated from the airborne acoustic environment of the human talker. The coupler 5510 of an embodiment is contiguous, but is not so limited. The second port 5506 couples a second side of the diaphragm to the external environment.

The sensor also includes electret material 5520 and the associated components and electronics coupled to receive acoustic signals from the talker via the coupler 5510 and the diaphragm 5508 and convert the acoustic signals to electrical signals representative of human speech. Electrical contacts 5530 provide the electrical signals as an output. Alternative embodiments can use any type/combination of materials and/or electronics to convert the acoustic signals to electrical signals representative of human speech and output the electrical signals.

The coupler 5510 of an embodiment is formed using materials having acoustic impedances matched to the impedance of human skin (characteristic acoustic impedance of skin is approximately $1.5\times10^6$ Pa×s/m). The coupler 5510 therefore, is formed using a material that includes at least one of silicone gel, dielectric gel, thermoplastic elastomers (TPE), and rubber compounds, but is not so limited. As an example, the coupler 5510 of an embodiment is formed using Kraiburg TPE products. As another example, the coupler 5510 of an embodiment is formed using Sylgard® Silicone products.

The coupler 5510 of an embodiment includes a contact device 5512 that includes, for example, a nipple or protrusion that protrudes from either or both sides of the coupler 5510. In operation, a contact device 5512 that protrudes from both sides of the coupler 5510 includes one side of the contact device 5512 that is in contact with the skin surface of the talker and another side of the contact device 5512 that is in contact with the diaphragm, but the embodiment is not so limited. The coupler 5510 and the contact device 5512 can be formed from the same or different materials.

The coupler 5510 transfers acoustic energy efficiently from skin/flesh of a talker to the diaphragm, and seals the diaphragm from ambient airborne acoustic signals. Consequently, the coupler 5510 with the contact device 5512 efficiently transfers acoustic signals directly from the talker's body (speech vibrations) to the diaphragm while isolating the diaphragm from acoustic signals in the airborne environment of the talker (characteristic acoustic impedance of air is approximately 415 Pa×s/m). The diaphragm is isolated from acoustic signals in the airborne environment of the talker by the coupler 5510 because the coupler 5510 prevents the signals from reaching the diaphragm, thereby reflecting and/or dissipating much of the energy of the acoustic signals in the airborne environment. Consequently, the sensor 5500 responds primarily to acoustic energy transferred from the skin of the talker, not air. When placed against the head of the talker, the sensor 5500 picks up speech-induced acoustic signals on the surface of the skin while airborne acoustic noise signals are largely rejected, thereby increasing the signal-to-noise ratio and providing a very reliable source of speech information.

Performance of the sensor 5500 is enhanced through the use of the seal provided between the diaphragm and the airborne environment of the talker. The seal is provided by the coupler 5510. A modified gradient microphone is used in an embodiment because it has pressure ports on both ends. Thus, when the first port 5504 is sealed by the coupler 5510, the second port 5506 provides a vent for air movement through the sensor 5500.

Figure 57:
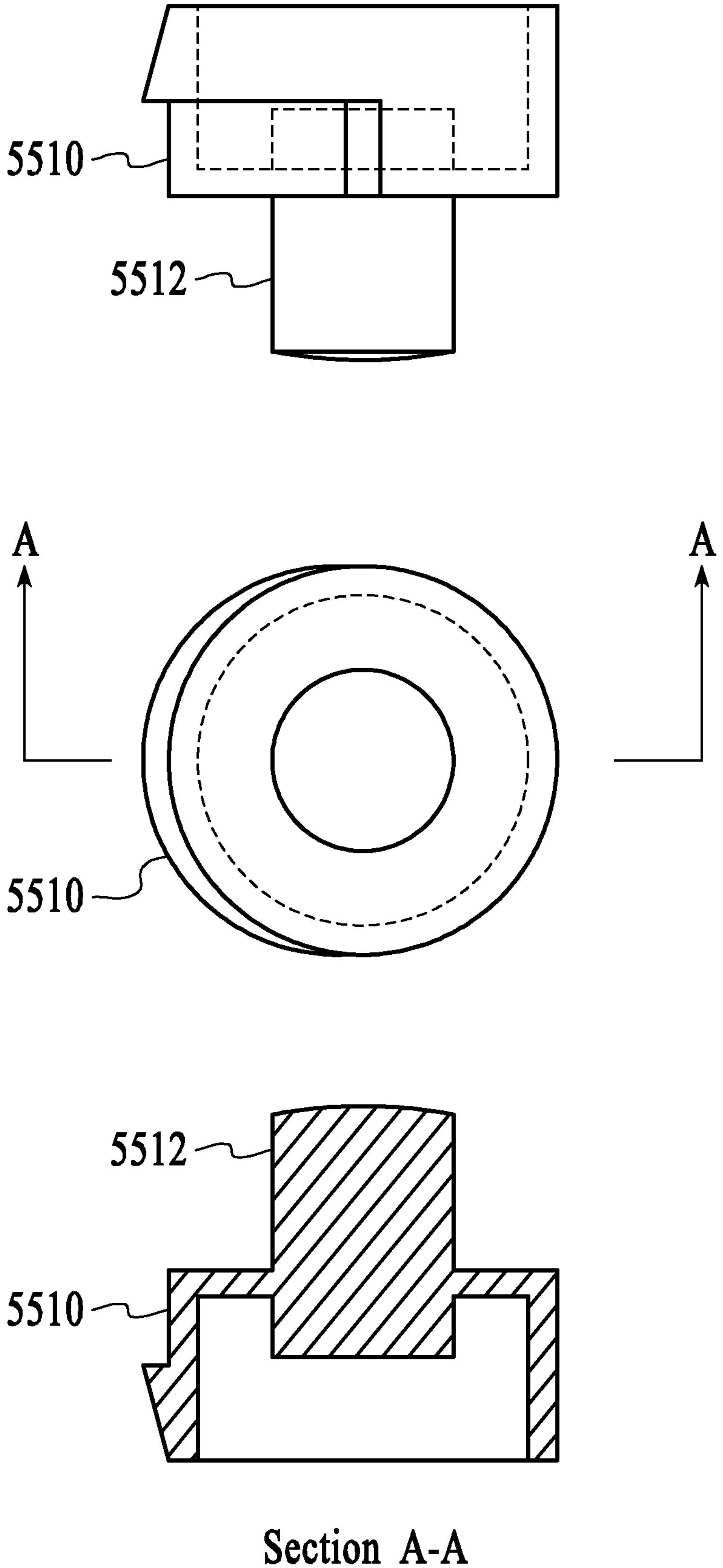
FIG. 57 is a schematic diagram of a coupler of an acoustic vibration sensor, under the embodiment of FIG. 55.

FIG. 57 is a schematic diagram of a coupler 5510 of an acoustic vibration sensor, under the embodiment of FIG. 55. The dimensions shown are in millimeters and are only intended to serve as an example for one embodiment. Alternative embodiments of the coupler can have different configurations and/or dimensions. The dimensions of the coupler 5510 show that the acoustic vibration sensor 5500 is small in that the sensor 5500 of an embodiment is approximately the same size as typical microphone capsules found in mobile communication devices. This small form factor allows for use of the sensor 5510 in highly mobile miniaturized applications, where some example applications include at least one of cellular telephones, satellite telephones, portable telephones, wireline telephones, Internet telephones, wireless transceivers, wireless communication radios, personal digital assistants (PDAs), personal computers (PCs), headset devices, head-worn devices, and earpieces.

The acoustic vibration sensor provides very accurate Voice Activity Detection (VAD) in high noise environments, where high noise environments include airborne acoustic environments in which the noise amplitude is as large if not larger than the speech amplitude as would be measured by conventional omnidirectional microphones. Accurate VAD information provides significant performance and efficiency benefits in a number of important speech processing applications including but not limited to: noise suppression algorithms such as the Pathfinder algorithm available from Aliph, Brisbane, Calif. and described in the Related Applications; speech compression algorithms such as the Enhanced Variable Rate Coder (EVRC) deployed in many commercial systems; and speech recognition systems.

In addition to providing signals having an improved signal-to-noise ratio, the acoustic vibration sensor uses only minimal power to operate (on the order of 200 micro Amps, for example). In contrast to alternative solutions that require power, filtering, and/or significant amplification, the acoustic vibration sensor uses a standard microphone interface to connect with signal processing devices. The use of the standard microphone interface avoids the additional expense and size of interface circuitry in a host device and supports for of the sensor in highly mobile applications where power usage is an issue.

Figure 58:
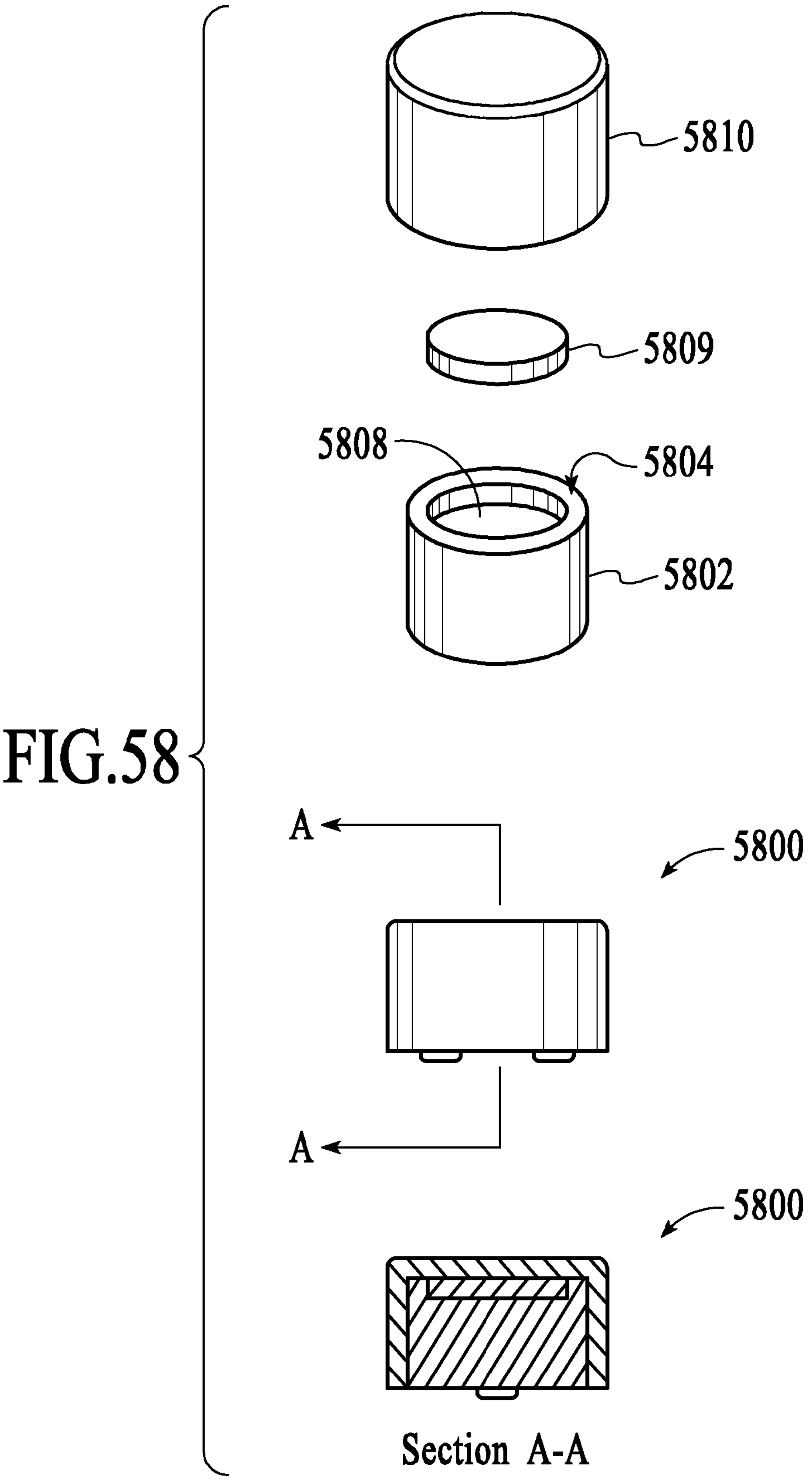
FIG. 58 is an exploded view of an acoustic vibration sensor, under an alternative embodiment.

FIG. 58 is an exploded view of an acoustic vibration sensor 5800, under an alternative embodiment. The sensor 5800 includes an enclosure 5802 having a first port 5804 on a first side and at least one second port (not shown) on a second side of the enclosure 5802. A diaphragm 5808 is positioned between the first and second ports. A layer of silicone gel 5809 or other similar substance is formed in contact with at least a portion of the diaphragm 5808. A coupler 5810 or shroud 5810 is formed around the enclosure 5802 and the silicon gel 5809 where a portion of the coupler 5810 is in contact with the silicon gel 5809. The coupler 5810 and silicon gel 5809 in combination form an acoustic seal around the enclosure 5802 so that the first port 5804 and the side of the diaphragm facing the first port 5804 are isolated from the acoustic environment of the human talker. The second port couples a second side of the diaphragm to the acoustic environment.

As described above, the sensor includes additional electronic materials as appropriate that couple to receive acoustic signals from the talker via the coupler 5810, the silicon gel 5809, and the diaphragm 5808 and convert the acoustic signals to electrical signals representative of human speech. Alternative embodiments can use any type/combination of materials and/or electronics to convert the acoustic signals to electrical signals representative of human speech.

The coupler 5810 and/or gel 5809 of an embodiment are formed using materials having impedances matched to the impedance of human skin. As such, the coupler 5810 is formed using a material that includes at least one of silicone gel, dielectric gel, thermoplastic elastomers (TPE), and rubber compounds, but is not so limited. The coupler 5810 transfers acoustic energy efficiently from skin/flesh of a talker to the diaphragm, and seals the diaphragm from ambient airborne acoustic signals. Consequently, the coupler 5810 efficiently transfers acoustic signals directly from the talker's body (speech vibrations) to the diaphragm while isolating the diaphragm from acoustic signals in the airborne environment of the talker. The diaphragm is isolated from acoustic signals in the airborne environment of the talker by the silicon gel 5809/coupler 5810 because the silicon gel 5809/coupler 5810 prevents the signals from reaching the diaphragm, thereby reflecting and/or dissipating much of the energy of the acoustic signals in the airborne environment. Consequently, the sensor 5800 responds primarily to acoustic energy transferred from the skin of the talker, not air. When placed again the head of the talker, the sensor 5800 picks up speech-induced acoustic signals on the surface of the skin while airborne acoustic noise signals are largely rejected, thereby increasing the signal-to-noise ratio and providing a very reliable source of speech information.

Figure 59:
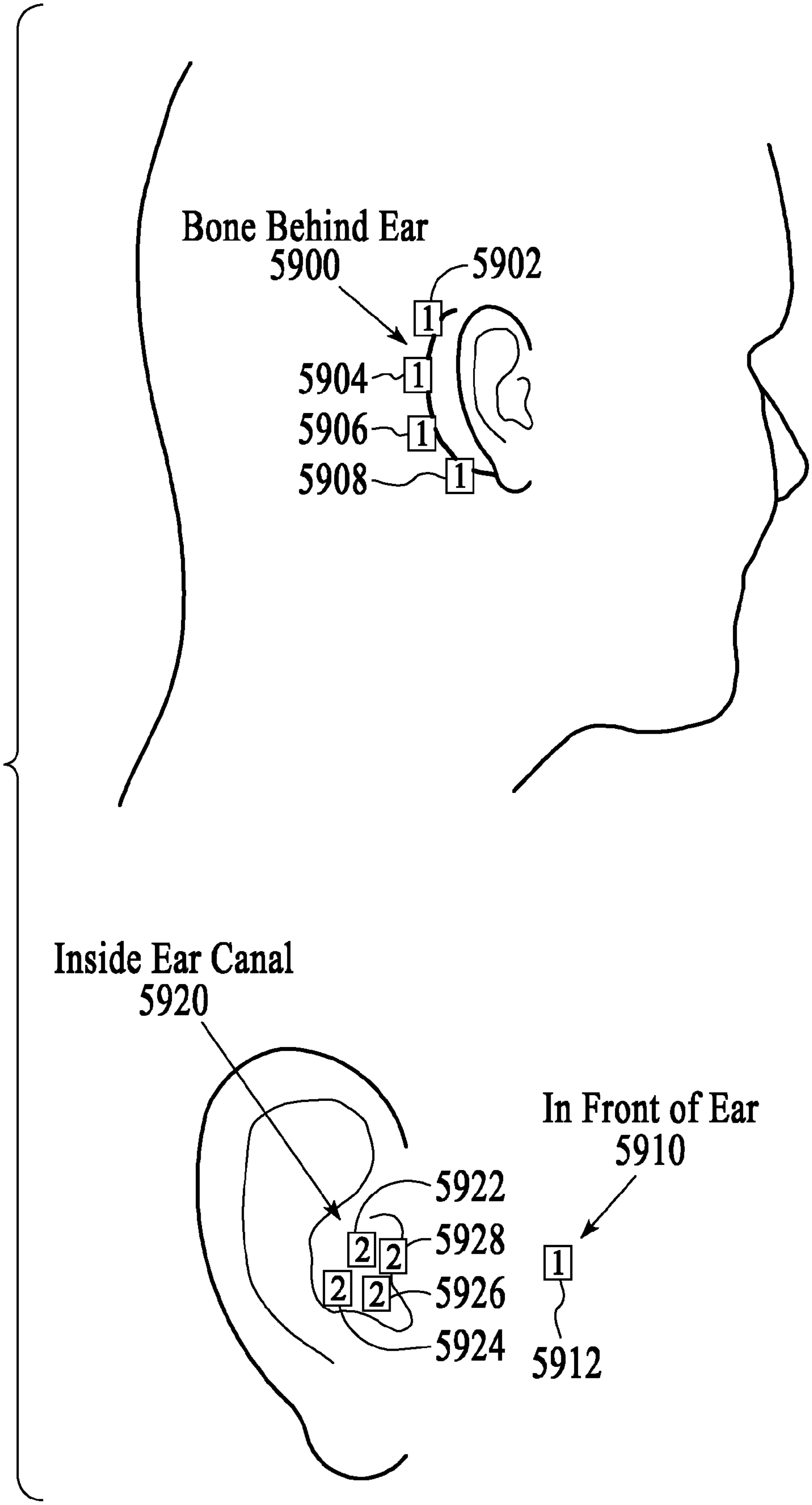
FIG. 59 shows representative areas of sensitivity on the human head appropriate for placement of the acoustic vibration sensor, under an embodiment.

There are many locations outside the ear from which the acoustic vibration sensor can detect skin vibrations associated with the production of speech. The sensor can be mounted in a device, handset, or earpiece in any manner, the only restriction being that reliable skin contact is used to detect the skin-borne vibrations associated with the production of speech. FIG. 59 shows representative areas of sensitivity 5900-5920 on the human head appropriate for placement of the acoustic vibration sensor 5500/5800, under an embodiment. The areas of sensitivity 5900-5920 include numerous locations 5902-5908 in an area behind the ear 5900, at least one location 5912 in an area in front of the ear 5910, and in numerous locations 5922-5928 in the ear canal area 5920. The areas of sensitivity 5900-5920 are the same for both sides of the human head. These representative areas of sensitivity 5900-5920 are provided as examples only and do not limit the embodiments described herein to use in these areas.

Figure 60:
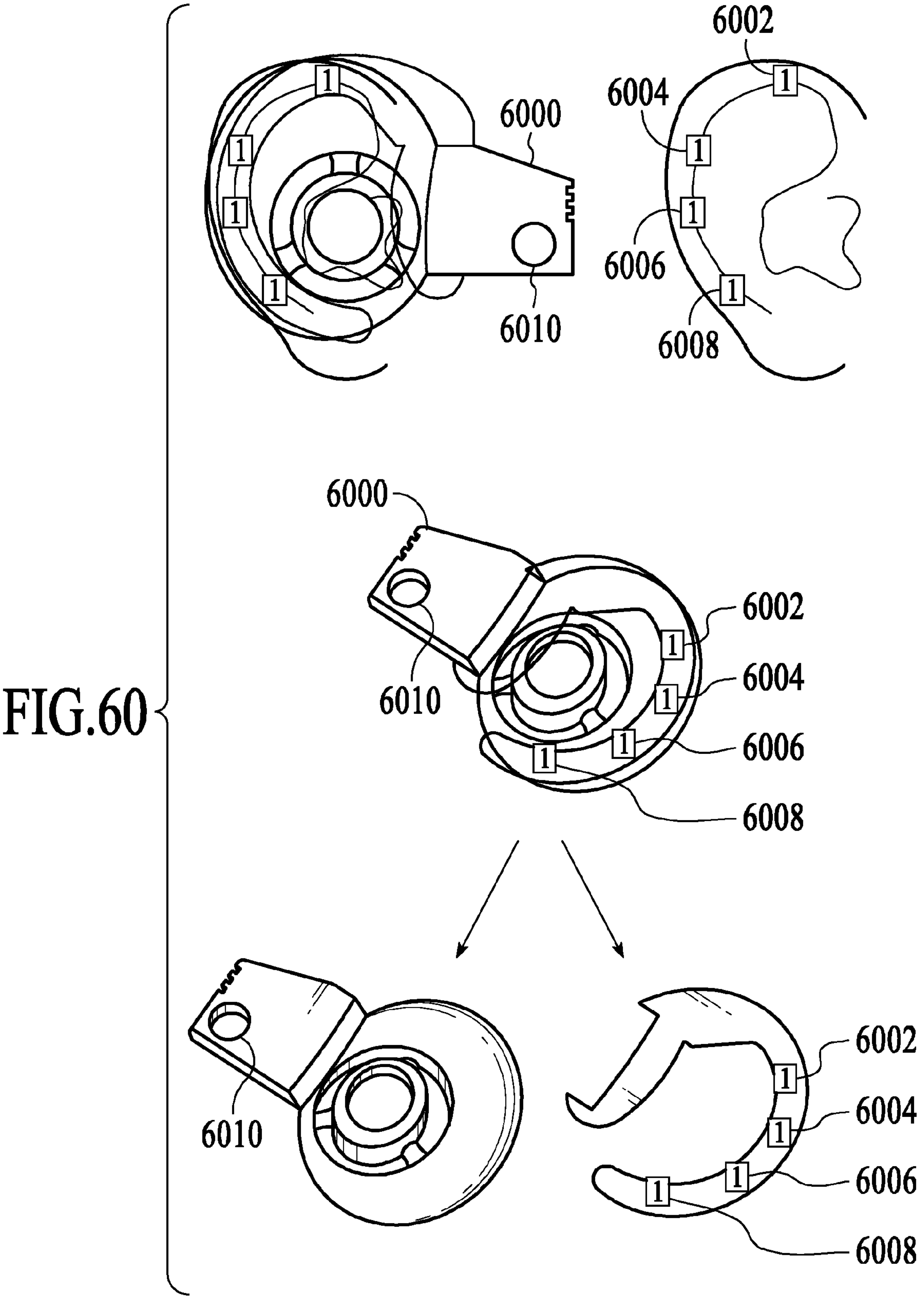
FIG. 60 is a generic headset device that includes an acoustic vibration sensor placed at any of a number of locations, under an embodiment.

FIG. 60 is a generic headset device 6000 that includes an acoustic vibration sensor 5500/5800 placed at any of a number of locations 6002-6010, under an embodiment. Generally, placement of the acoustic vibration sensor 5500/5800 can be on any part of the device 6000 that corresponds to the areas of sensitivity 5900-5920 (FIG. 59) on the human head. While a headset device is shown as an example, any number of communication devices known in the art can carry and/or couple to an acoustic vibration sensor 5500/5800.

Figure 61:
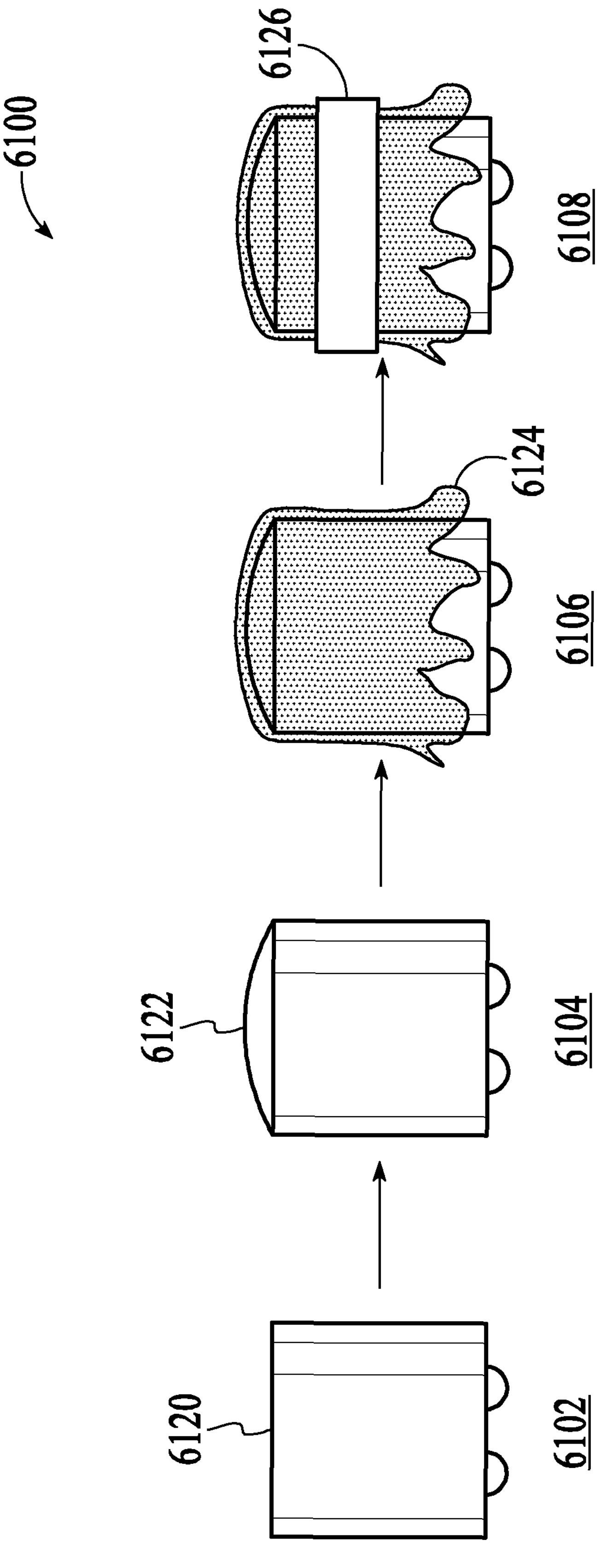
FIG. 61 is a diagram of a manufacturing method for an acoustic vibration sensor, under an embodiment.

FIG. 61 is a diagram of a manufacturing method 6100 for an acoustic vibration sensor, under an embodiment. Operation begins with, for example, a uni-directional microphone 6120, at block 6102. Silicon gel 6122 is formed over/on the diaphragm (not shown) and the associated port, at block 6104. A material 6124, for example polyurethane film, is formed or placed over the microphone 6120/silicone gel 6122 combination, at block 6106, to form a coupler or shroud. A snug fit collar or other device is placed on the microphone to secure the material of the coupler during curing, at block 6108.

Note that the silicon gel (block 6102) is an optional component that depends on the embodiment of the sensor being manufactured, as described above. Consequently, the manufacture of an acoustic vibration sensor 5500 that includes a contact device 5512 (referring to FIG. 55) will not include the formation of silicon gel 6122 over/on the diaphragm. Further, the coupler formed over the microphone for this sensor 5500 will include the contact device 5512 or formation of the contact device 5512.

The embodiments described herein include a system comprising a first detector that receives a first signal and a second detector that receives a second signal. The system of an embodiment comprises a voice activity detector (VAD) coupled to the first detector. The VAD generates a VAD signal when the first signal corresponds to voiced speech. The system of an embodiment comprises a wind detector coupled to the second detector. The wind detector correlates signals received at the second detector and derives from the correlation a plurality of wind metrics that characterize wind noise that is acoustic disturbance corresponding to at least one of air flow and air pressure in the second detector. The wind detector controls a configuration of the second detector according to the plurality of wind metrics. The wind detector uses the plurality of wind metrics to dynamically control mixing of the first signal and the second signal to generate an output signal for transmission.

The embodiments described herein include a system comprising: a first detector that receives a first signal and a second detector that receives a second signal; a voice activity detector (VAD) coupled to the first detector, the VAD generating a VAD signal when the first signal corresponds to voiced speech; and a wind detector coupled to the second detector, wherein the wind detector correlates signals received at the second detector and derives from the correlation a plurality of wind metrics that characterize wind noise that is acoustic disturbance corresponding to at least one of air flow and air pressure in the second detector, wherein the wind detector controls a configuration of the second detector according to the plurality of wind metrics, wherein the wind detector uses the plurality of wind metrics to dynamically control mixing of the first signal and the second signal to generate an output signal for transmission.

The first detector of an embodiment is a vibration sensor.

The first detector of an embodiment is a skin surface microphone (SSM).

The second detector of an embodiment is an acoustic sensor.

The second detector of an embodiment comprises two omnidirectional microphones.

The two omnidirectional microphones of an embodiment are positioned adjacent one another and are separated by a distance approximately in a range of 10 millimeters (mm) to 40 mm.

The wind detector of an embodiment comprises an adaptive filter coupled to the second detector, wherein the wind detector correlates signals by calculating energy of an adaptive filter error.

The wind detector of an embodiment comprises a first exponential averaging filter and a second exponential averaging filter coupled to the adaptive filter, wherein the wind detector applies the energy to the first exponential averaging filter and the second exponential averaging filter.

The wind detector of an embodiment generates an instantaneous wind level from the energy, wherein the instantaneous wind level represents an instant wind level of the wind noise.

The plurality of wind metrics of an embodiment comprise a wind present metric that characterizes the instantaneous wind level relative to a present wind threshold over which the wind noise negatively affects electronic operations in a host electronic system.

The plurality of wind metrics of an embodiment comprise a wind mode metric that characterizes the instantaneous wind level relative to a wind high threshold over which the wind noise is considered to have a relatively high impact on audio intelligibility in a host electronic system.

The wind detector of an embodiment generates a current wind level from the energy, wherein the current wind level represents an average current wind level of the wind noise.

The plurality of wind metrics of an embodiment comprise a wind index metric that characterizes the current wind level relative to a minimum wind threshold under which the wind noise is considered to have a negligible impact on noise suppression and audio intelligibility in a host electronic system.

The plurality of wind metrics of an embodiment comprise a wind mode metric that the wind detector generates to control the configuration of the second detector, wherein the wind mode metric characterizes instantaneous wind level relative to a wind high threshold over which the wind noise is considered to have a relatively high impact on audio intelligibility in a host electronic system.

In response to the wind mode metric indicating that instantaneous wind level exceeds the wind high threshold, the wind detector of an embodiment controls the configuration of the second detector by controlling generation of a summed detector signal by summing signals from each of two microphones of the second detector.

The wind detector of an embodiment controls the configuration of the second detector by controlling application of single-microphone noise suppression to the summed detector signal.

The wind detector of an embodiment controls the configuration of the second detector by controlling separate processing of signals from each of two microphones of the second detector when the wind mode metric indicates instantaneous wind level is below the wind high threshold.

The wind detector of an embodiment controls the configuration of the second detector by controlling application of dual-microphone noise suppression to the signals from the two microphones.

The system of an embodiment comprises a gain controller coupled to the first detector and the wind detector.

The gain controller of an embodiment controls gain applied to the first signal in response to the plurality of wind metrics and the VAD signal.

The gain controller of an embodiment adjusts a gain applied to the first signal when the plurality of wind metrics indicates no wind is present.

The plurality of wind metrics of an embodiment includes a wind present metric that characterizes an instantaneous wind level derived from the second signal relative to a present wind threshold over which the wind noise negatively affects electronic operations in a host electronic system.

The system of an embodiment comprises adjusting the gain to match a first root mean square (RMS) of the first signal to a second RMS of a noise-suppressed speech signal.

The system of an embodiment comprises generating a VAD signal when the first signal corresponds to voiced speech, and using the VAD signal to noise gate the first signal.

The gain controller of an embodiment adjusts a gain applied to the first signal when the VAD signal indicates the first signal corresponds to voiced speech.

The system of an embodiment comprises a first filter coupled to the first detector and a second filter coupled to the second detector.

The first filter of an embodiment is a low-pass filter and the second filter is a high-pass filter.

The plurality of wind metrics of an embodiment dynamically control mixing of the first signal and the second signal.

The plurality of wind metrics of an embodiment dynamically adjust a response of the first filter to which the first signal is applied and dynamically adjust a response of the second filter to which the second signal is applied.

The plurality of wind metrics of an embodiment comprise a wind index metric that characterizes a current wind level relative to a minimum wind threshold under which the wind noise is considered to have a negligible impact on noise suppression and audio intelligibility in a host electronic system, wherein the current wind level represents an average current wind level of the wind noise.

The system of an embodiment comprises estimating a wind frequency response of the wind noise from the wind index metric.

The system of an embodiment comprises a comfort equalizer coupled to the second detector.

The comfort equalizer of an embodiment generates a comfort wind component and adds the comfort wind component to audio signals, wherein the comfort wind component provides listener awareness of wind presence.

The comfort equalizer of an embodiment is coupled to a transmitter, and adds the comfort wind component to audio signals processed for transmission.

The comfort equalizer of an embodiment is coupled to a receiver, and adds the comfort wind component to audio signals processed for reception.

The comfort equalizer of an embodiment generates the comfort wind component by subtracting signals from each of two microphones of the second detector to generate a difference signal.

The system of an embodiment comprises modulating the difference signal by a gain to generate a modulated signal.

The gain of an embodiment comprises a static gain that provides an appropriate level of wind noise feedback in a loudspeaker.

The gain of an embodiment comprises a gating factor derived from a wind present metric output by the wind detector, wherein the wind present metric characterizes an instantaneous wind level derived from the second signal relative to a present wind threshold over which the wind noise negatively affects electronic operations in a host electronic system.

The system of an embodiment comprises filtering the modulated signal to provide the comfort wind component, the filtering comprising limiting an amount of low-frequency wind noise and high-frequency wind noise.

The embodiments described herein include a system comprising a first detector that receives a first signal and a second detector that receives a second signal. The system of an embodiment comprises a voice activity detector (VAD) coupled to the first detector. The VAD generates a VAD signal when the first signal corresponds to voiced speech. The system of an embodiment comprises a wind detector coupled to the second detector. The wind detector correlates signals received at the second detector and derives from the correlation a plurality of wind metrics that characterize wind noise that is acoustic disturbance corresponding to at least one of air flow and air pressure in the second detector. The wind detector uses the plurality of wind metrics to dynamically control mixing of the first signal and the second signal to generate an output signal for transmission.

The embodiments described herein include a system comprising: a first detector that receives a first signal and a second detector that receives a second signal; a voice activity detector (VAD) coupled to the first detector, the VAD generating a VAD signal when the first signal corresponds to voiced speech; and a wind detector coupled to the second detector, wherein the wind detector correlates signals received at the second detector and derives from the correlation a plurality of wind metrics that characterize wind noise that is acoustic disturbance corresponding to at least one of air flow and air pressure in the second detector, wherein the wind detector uses the plurality of wind metrics to dynamically control mixing of the first signal and the second signal to generate an output signal for transmission.

The embodiments described herein include a system comprising a first detector that receives a first signal and a second detector that receives a second signal. The system of an embodiment comprises a voice activity detector (VAD) coupled to the first detector. The VAD generates a VAD signal when the first signal corresponds to voiced speech. The system of an embodiment comprises a wind detector coupled to the second detector. The wind detector correlates signals received at the second detector and derives from the correlation a plurality of wind metrics that characterize wind noise that is acoustic disturbance corresponding to at least one of air flow and air pressure in the second detector. The wind detector controls a configuration of the second detector according to the plurality of wind metrics.

The embodiments described herein include a system comprising: a first detector that receives a first signal and a second detector that receives a second signal; a voice activity detector (VAD) coupled to the first detector, the VAD generating a VAD signal when the first signal corresponds to voiced speech; and a wind detector coupled to the second detector, wherein the wind detector correlates signals received at the second detector and derives from the correlation a plurality of wind metrics that characterize wind noise that is acoustic disturbance corresponding to at least one of air flow and air pressure in the second detector, wherein the wind detector controls a configuration of the second detector according to the plurality of wind metrics.

The embodiments described herein include a method comprising receiving a first signal at a first detector and a second signal at a second detector. The method of an embodiment comprises determining a correlation between signals received at the second detector and deriving from the correlation a plurality of wind metrics that characterize wind noise that is acoustic disturbance corresponding to at least one of air flow and air pressure in the second detector. The method of an embodiment comprises controlling a configuration of the second detector according to the plurality of wind metrics. The method of an embodiment comprises generating an output signal for transmission by dynamically mixing the first signal and the second signal according to the plurality of wind metrics.

The embodiments described herein include a method comprising: receiving a first signal at a first detector and a second signal at a second detector; determining a correlation between signals received at the second detector and deriving from the correlation a plurality of wind metrics that characterize wind noise that is acoustic disturbance corresponding to at least one of air flow and air pressure in the second detector; controlling a configuration of the second detector according to the plurality of wind metrics; and generating an output signal for transmission by dynamically mixing the first signal and the second signal according to the plurality of wind metrics.

The first detector of an embodiment is a vibration sensor.

The first detector of an embodiment is a skin surface microphone (SSM).

The second detector of an embodiment is an acoustic sensor.

The second detector of an embodiment comprises two omnidirectional microphones.

The method of an embodiment comprises positioning the two omnidirectional microphones adjacent one another and separating the two omnidirectional microphones by a distance approximately in a range of 10 millimeters (mm) to 40 mm.

Determining the correlation of an embodiment comprises calculating energy of an adaptive filter error.

The method of an embodiment comprises applying the energy to a first exponential averaging filter and a second exponential averaging filter.

The method of an embodiment comprises deriving an instantaneous wind level from the energy, wherein the instantaneous wind level represents an instant wind level of the wind noise.

The plurality of wind metrics of an embodiment comprise a wind present metric that characterizes the instantaneous wind level relative to a present wind threshold over which the wind noise negatively affects electronic operations in a host electronic system.

The plurality of wind metrics of an embodiment comprise a wind mode metric that characterizes the instantaneous wind level relative to a wind high threshold over which the wind noise is considered to have a relatively high impact on audio intelligibility in a host electronic system.

The method of an embodiment comprises deriving a current wind level from the energy, wherein the current wind level represents an average current wind level of the wind noise.

The plurality of wind metrics of an embodiment comprise a wind index metric that characterizes the current wind level relative to a minimum wind threshold under which the wind noise is considered to have a negligible impact on noise suppression and audio intelligibility in a host electronic system.

The method of an embodiment comprises controlling a gain applied to the first signal in response to the plurality of wind metrics and a voice activity detection (VAD) signal.

The method of an embodiment comprises adjusting the gain when the plurality of wind metrics indicates no wind is present.

The plurality of wind metrics of an embodiment is a wind present metric that characterizes an instantaneous wind level derived from the second signal relative to a present wind threshold over which the wind noise negatively affects electronic operations in a host electronic system.

The method of an embodiment comprises adjusting the gain when the VAD signal indicates the first signal corresponds to voiced speech.

The method of an embodiment comprises adjusting the gain to match a first root mean square (RMS) of the first signal to a second RMS of a noise-suppressed speech signal.

The method of an embodiment comprises generating a VAD signal when the first signal corresponds to voiced speech, and using the VAD signal to noise gate the first signal.

The controlling of the configuration of the second detector of an embodiment according to the plurality of wind metrics comprises use of a wind mode metric that characterizes instantaneous wind level relative to a wind high threshold over which the wind noise is considered to have a relatively high impact on audio intelligibility in a host electronic system.

The controlling of the configuration of the second detector of an embodiment comprises, when the wind mode metric indicates instantaneous wind level exceeds the wind high threshold, generating a summed detector signal by summing signals from each of two microphones of the second detector.

The controlling of the configuration of the second detector of an embodiment comprises applying single-microphone noise suppression to the summed detector signal.

The controlling of the configuration of the second detector of an embodiment comprises separately processing signals from each of two microphones of the second detector when the wind mode metric indicates instantaneous wind level is below the wind high threshold.

The controlling of the configuration of the second detector of an embodiment comprises applying dual-microphone noise suppression to the signals from the two microphones.

Dynamically mixing the first signal and the second signal of an embodiment according to the plurality of wind metrics comprises dynamically adjusting a response of a first filter to which the first signal is applied and dynamically adjusting a response of a second filter to which the second signal is applied.

The first filter of an embodiment is a low-pass filter and the second filter of an embodiment is a high-pass filter.

The plurality of wind metrics of an embodiment is a wind index metric that characterizes a current wind level relative to a minimum wind threshold under which the wind noise is considered to have a negligible impact on noise suppression and audio intelligibility in a host electronic system, wherein the current wind level represents an average current wind level of the wind noise.

The method of an embodiment comprises estimating a wind frequency response of the wind noise from the wind index metric.

The method of an embodiment comprises generating a comfort wind component and adding the comfort wind component to receive and transmit audio, wherein the comfort wind component provides listener awareness of wind presence.

The method of an embodiment comprises generating the comfort wind component by subtracting signals from each of two microphones of the second detector to generate a difference signal.

The method of an embodiment comprises modulating the difference signal by a gain to generate a modulated signal.

The gain of an embodiment comprises a static gain that provides an appropriate level of wind noise feedback in a loudspeaker.

The gain of an embodiment comprises a gating factor derived from a wind present metric that characterizes an instantaneous wind level derived from the second signal relative to a present wind threshold over which the wind noise negatively affects electronic operations in a host electronic system.

The method of an embodiment comprises filtering the modulated signal to provide the comfort wind component, the filtering comprising limiting an amount of low-frequency wind noise and high-frequency wind noise reaching a receiver.

The embodiments described herein include a method comprising receiving a first signal at a first detector and a second signal at a second detector. The method of an embodiment comprises determining a correlation between signals received at the second detector and deriving from the correlation a plurality of wind metrics that characterize wind noise that is acoustic disturbance corresponding to at least one of air flow and air pressure in the second detector. The method of an embodiment comprises controlling a configuration of the second detector according to the plurality of wind metrics.

The embodiments described herein include a method comprising: receiving a first signal at a first detector and a second signal at a second detector; determining a correlation between signals received at the second detector and deriving from the correlation a plurality of wind metrics that characterize wind noise that is acoustic disturbance corresponding to at least one of air flow and air pressure in the second detector; and controlling a configuration of the second detector according to the plurality of wind metrics.

The embodiments described herein include a method comprising receiving a first signal at a first detector and a second signal at a second detector. The method of an embodiment comprises determining a correlation between signals received at the second detector and deriving from the correlation a plurality of wind metrics that characterize wind noise that is acoustic disturbance corresponding to at least one of air flow and air pressure in the second detector. The method of an embodiment comprises generating an output signal for transmission by dynamically mixing the first signal and the second signal according to the plurality of wind metrics.

The embodiments described herein include a method comprising: receiving a first signal at a first detector and a second signal at a second detector; determining a correlation between signals received at the second detector and deriving from the correlation a plurality of wind metrics that characterize wind noise that is acoustic disturbance corresponding to at least one of air flow and air pressure in the second detector; and generating an output signal for transmission by dynamically mixing the first signal and the second signal according to the plurality of wind metrics.

The systems and methods described herein include and/or run under and/or in association with a processing system. The processing system includes any collection of processor-based devices or computing devices operating together, or components of processing systems or devices, as is known in the art. For example, the processing system can include one or more of a portable computer, portable communication device operating in a communication network, and/or a network server. The portable computer can be any of a number and/or combination of devices selected from among personal computers, cellular telephones, personal digital assistants, portable computing devices, and portable communication devices, but is not so limited. The processing system can include components within a larger computer system.

The processing system of an embodiment includes at least one processor and at least one memory device or subsystem. The processing system can also include or be coupled to at least one database. The term "processor" as generally used herein refers to any logic processing unit, such as one or more central processing units (CPUs), digital signal processors (DSPs), application-specific integrated circuits (ASIC), etc. The processor and memory can be monolithically integrated onto a single chip, distributed among a number of chips or components of a host system, and/or provided by some combination of algorithms. The methods described herein can be implemented in one or more of software algorithm(s), programs, firmware, hardware, components, circuitry, in any combination.

System components embodying the systems and methods described herein can be located together or in separate locations. Consequently, system components embodying the systems and methods described herein can be components of a single system, multiple systems, and/or geographically separate systems. These components can also be subcomponents or subsystems of a single system, multiple systems, and/or geographically separate systems. These components can be coupled to one or more other components of a host system or a system coupled to the host system.

Communication paths couple the system components and include any medium for communicating or transferring files among the components. The communication paths include wireless connections, wired connections, and hybrid wireless/wired connections. The communication paths also include couplings or connections to networks including local area networks (LANs), metropolitan area networks (MANs), wide area networks (WANs), proprietary networks, interoffice or backend networks, and the Internet. Furthermore, the communication paths include removable fixed mediums like floppy disks, hard disk drives, and CD-ROM disks, as well as flash RAM, Universal Serial Bus (USB) connections, RS-232 connections, telephone lines, buses, and electronic mail messages.

Unless the context clearly requires otherwise, throughout the description, the words "comprise," "comprising," and the like are to be construed in an inclusive sense as opposed to an exclusive or exhaustive sense; that is to say, in a sense of "including, but not limited to." Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of embodiments is not intended to be exhaustive or to limit the systems and methods described to the precise form disclosed. While specific embodiments and examples are described herein for illustrative purposes, various equivalent modifications are possible within the scope of other systems and methods, as those skilled in the relevant art will recognize. The teachings provided herein can be applied to other processing systems and methods, not only for the systems and methods described above.

The elements and acts of the various embodiments described above can be combined to provide further embodiments. These and other changes can be made to the embodiments in light of the above detailed description.

In general, in the following claims, the terms used should not be construed to limit the embodiments described herein and corresponding systems and methods to the specific embodiments disclosed in the specification and the claims, but should be construed to include all systems and methods that operate under the claims. Accordingly, the embodiments described herein are not limited by the disclosure, but instead the scope is to be determined entirely by the claims.

While certain aspects of the embodiments described herein are presented below in certain claim forms, the inventors contemplate the various aspects of the embodiments and corresponding systems and methods in any number of claim forms. Accordingly, the inventors reserve the right to add additional claims after filing the application to pursue such additional claim forms for other aspects of the embodiments described herein.

What is claimed is:

1. A system comprising:

a first detector that receives a first signal and a second detector that receives a second signal and a third signal;

a voice activity detector (VAD) coupled to the first detector, the VAD generating a VAD signal when the first signal corresponds to voiced speech; and a wind detector coupled to the second detector, wherein the wind detector is configured to correlate the second signals and the third signal received at the second detector and to derive from the correlation a plurality of wind metrics comprising a first wind metric, a second wind metric, and a third wind metric that is associated with a wind noise that is an acoustic disturbance corresponding to at least one of air flow and air pressure in the second detector, the wind detector is further configured to determine a magnitude associated with the wind noise using the first wind metric, to determine whether to suspend an activity of the system using the second wind metric, and to use the third wind metric to determine a duration of time that the magnitude associated with the wind noise exceeds a threshold, wherein exceeding the threshold causes the system to switch from a first state to a second state, wherein the wind detector controls a configuration of the second detector according to the plurality of wind metrics, wherein the wind detector uses the plurality of wind metrics to dynamically control mixing of the first signal and the second signal to generate an output signal for transmission.

2. The system of claim 1, wherein the first detector is a vibration sensor.

3. The system of claim 2, wherein the first detector is a skin surface microphone (SSM).

4. The system of claim 2, wherein the second detector is an acoustic sensor.

5. The system of claim 4, wherein the second detector comprises two omnidirectional microphones.

6. The system of claim 5, wherein the two omnidirectional microphones are positioned adjacent one another and are separated by a distance approximately in a range of 10 millimeters (mm) to 40 mm.

7. The system of claim 1, wherein the wind detector comprises an adaptive filter coupled to the second detector, wherein the wind detector correlates signals by calculating energy of an adaptive filter error.

8. The system of claim 7, wherein the wind detector comprises a first exponential averaging filter and a second exponential averaging filter coupled to the adaptive filter, wherein the wind detector applies the energy to the first exponential averaging filter and the second exponential averaging filter.

9. The system of claim 8, wherein the wind detector generates an instantaneous wind level from the energy, wherein the instantaneous wind level represents an instant wind level of the wind noise.

10. The system of claim 9, wherein the plurality of wind metrics comprise a wind present metric that characterizes the instantaneous wind level relative to a present wind threshold over which the wind noise negatively affects electronic operations in a host electronic system.

11. The system of claim 9, wherein the plurality of wind metrics comprise a wind mode metric that characterizes the instantaneous wind level relative to a wind high threshold over which the wind noise is considered to have a relatively high impact on audio eligibility in a host electronic system.

12. The system of claim 8, wherein the wind detector generates a current wind level from the energy, wherein the current wind level represents an average current wind level of the wind noise.

13. The system of claim 12, wherein the plurality of wind metrics comprise a wind index metric that characterizes the current wind level relative to a minimum wind threshold under which the wind noise is considered to have a negligible impact on noise suppression and audio intelligibility in a host electronic system.

14. The system of claim 1, wherein the plurality of wind metrics comprise a wind mode metric that the wind detector generates to control the configuration of the second detector, wherein the wind mode metric characterizes instantaneous wind level relative to a wind high threshold over which the wind noise is considered to have a relatively high impact on audio intelligibility in a host electronic system.

15. The system of claim 14, wherein, in response to the wind mode metric indicating that instantaneous wind level exceeds the wind high threshold, the wind detector controls the configuration of the second detector by controlling generation of a summed detector signal by summing signals from each of two microphones of the second detector.

16. The system of claim 15, wherein the wind detector controls the configuration of the second detector by controlling application of single-microphone noise suppression to the summed detector signal.

17. The system of claim 14, wherein the wind detector controls the configuration of the second detector by controlling separate processing of signals from each of two microphones of the second detector when the wind mode metric indicates instantaneous wind level is below the wind high threshold.

18. The system of claim 17, wherein the wind detector controls the configuration of the second detector by controlling application of dual-microphone noise suppression to the signals from the two microphones.

19. The system of claim 1, comprising a gain controller coupled to the first detector and the wind detector.

20. The system of claim 19, wherein the gain controller controls gain applied to the first signal in response to the plurality of wind metrics and the VAD signal.

21. The system of claim 20, wherein the gain controller adjusts a gain applied to the first signal when the plurality of wind metrics indicates no wind is present.

22. The system of claim 20, wherein the plurality of wind metrics includes a wind present metric that characterizes art instantaneous wind level derived from the second signal relative to a present wind threshold over which the wind noise negatively affects electronic operations in a host electronic system.

23. The system of claim 20, comprising adjusting the gain to match a first root mean square (RMS) of the first signal to a second RMS of a noise-suppressed speech signal.

24. The system of claim 20, comprising generating a VAD signal when the first signal corresponds to voiced speech, and using the VAD signal to noise gate the first signal.

25. The system of claim 20, wherein the gain controller adjusts a gain applied to the first signal when the VAD signal indicates the first signal corresponds to voiced speech.

26. The system of claim 1, comprising a first filter coupled to the first detector and a second filter coupled to the second detector.

27. The system of claim 26, wherein the first filter is a low-pass filter and the second filter is a high-pass filter.

28. The system of claim 26, wherein the plurality of wind metrics dynamically control mixing of the first signal and the second signal.

29. The system of claim 28, wherein the plurality of wind metrics dynamically adjust a response of the first filter to which the first signal is applied and dynamically adjust a response of the second filter to which the second signal is applied.

30. The system of claim 29, wherein the plurality of wind metrics comprise a wind index metric that characterizes a current wind level relative to a minimum wind threshold under which the wind noise is considered to have a negligible impact on noise suppression and audio intelligibility in a host electronic system, wherein the current wind level represents an average current wind level of the wind noise.

31. The system of claim 30, comprising estimating a wind frequency response of the wind noise from the wind index metric.

32. The system of claim 1, comprising a comfort equalizer coupled to the second detector.

33. The system of claim 32, wherein the comfort equalizer generates a comfort wind component and adds the comfort wind component to audio signals, wherein the comfort wind component provides listener awareness of wind presence.

34. The system of claim 33, wherein the comfort equalizer is coupled to a transmitter, and adds the comfort wind component to audio signals processed for transmission.

35. The system of claim 33, wherein the comfort equalizer is coupled to a receiver, and adds the comfort wind component to audio signals processed for reception.

36. The system of claim 33, wherein the comfort equalizer generates the comfort wind component by subtracting signals from each of two microphones of the second detector to generate a difference signal.

37. The system of claim 36, comprising modulating the difference signal by a gain to generate a modulated signal.

38. The system of claim 37, wherein the gain comprises a static gain that provides an appropriate level of wind noise feedback in a loudspeaker.

39. The system of claim 38, wherein the gain comprises a gating, factor derived from a wind present metric output by the wind detector, wherein the wind present metric characterizes an instantaneous wind level derived from the second signal relative to a present wind threshold over which the wind noise negatively affects electronic operations in a host electronic system.

40. The system of claim 37, comprising filtering the modulated signal to provide the comfort wind component, the filtering comprising limiting an amount of low-frequency wind noise and high-frequency wind noise.

41. A system comprising:

a first detector that receives a first signal and a second detector that receives a second signal and a third signal;

a voice activity detector (VAD) coupled to the first detector, the VAD generating a VAD signal when the first signal corresponds to voiced speech; and a wind detector coupled to the second detector, wherein the wind detector is configured to correlate the second signal and the third signal received at the second detector and to derive from the correlation a plurality of wind metrics comprising a first wind metric, a second wind metric, and a third wind metric that is associated with a wind noise that is an acoustic disturbance corresponding to at least one of air flow and air pressure in the second detector, the wind detector is further configured to determine a magnitude associated with the wind noise using the first wind metric, to determine whether to suspend an activity of the system using the second wind metric, and to use the third wind metric to determine a duration of time that the magnitude associated with the wind noise exceeds a threshold using the third wind metric, wherein exceeding the threshold causes the system to switch from a first state to a second state, wherein the wind detector uses the plurality of wind metrics to dynamically control mixing of the first signal and the second signal to generate an output signal for transmission.

42. A system comprising:

a first detector that receives a first signal and a second detector that receives a second signal and a third signal;

a voice activity detector (VAD) coupled to the first detector, the VAD generating a VAD signal when the first signal corresponds to voiced speech; and a wind detector coupled to the second detector, wherein the wind detector is configured to correlate the second signal and the third signal received at the second detector and to derive from the correlation a plurality of wind metrics comprising a first wind metric, a second wind metric, and a third wind metric that is associated with a wind noise that is an acoustic disturbance corresponding to at least one of air flow and air pressure in the second detector, the wind detector is further configured to determine a magnitude associated with the wind noise using the first wind metric, to determine whether to suspend an activity of the system using the second wind metric, and to use the third wind metric to determine a duration of time that the magnitude associated with the wind noise exceeds a threshold, wherein exceeding the threshold causes the system to switch from a first state to a second state, wherein the wind detector controls a configuration of the second detector according to the plurality of wind metrics.

* * * * *